US012482866B2

(12) United States Patent
Lim et al.

(10) Patent No.: US 12,482,866 B2
(45) Date of Patent: Nov. 25, 2025

(54) BATTERY AND CURRENT COLLECTOR APPLIED THERETO, AND BATTERY PACK AND VEHICLE INCLUDING THE BATTERY

(71) Applicant: LG ENERGY SOLUTION, LTD., Seoul (KR)

(72) Inventors: Jae-Won Lim, Daejeon (KR); Hak-Kyun Kim, Daejeon (KR); Je-Jun Lee, Daejeon (KR); Ji-Min Jung, Daejeon (KR); Kwang-Su Hwangbo, Daejeon (KR); Do-Gyun Kim, Daejeon (KR); Geon-Woo Min, Daejeon (KR); Hae-Jin Lim, Daejeon (KR); Min-Ki Jo, Daejeon (KR); Su-Ji Choi, Daejeon (KR); Jae-Woong Kim, Daejeon (KR); Jong-Sik Park, Daejeon (KR); Yu-Sung Choe, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Bo-Hyun Kang, Daejeon (KR); Jin-Hak Kong, Daejeon (KR); Soon-O Lee, Daejeon (KR); Kyu-Hyun Choi, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/132,140

(22) Filed: Apr. 7, 2023

(65) Prior Publication Data
US 2023/0291015 A1 Sep. 14, 2023

Related U.S. Application Data

(63) Continuation of application No. 17/592,672, filed on Feb. 4, 2022.

(30) Foreign Application Priority Data

Feb. 19, 2021 (KR) .......................... 10-2021-0022881
Feb. 19, 2021 (KR) .......................... 10-2021-0022891
(Continued)

(51) Int. Cl.
*H01M 10/0587* (2010.01)
*H01M 4/64* (2006.01)
(Continued)

(52) U.S. Cl.
CPC ........ *H01M 10/0587* (2013.01); *H01M 4/64* (2013.01); *H01M 4/70* (2013.01);
(Continued)

(58) Field of Classification Search
CPC ........... H01M 10/0587; H01M 50/107; H01M 50/567; H01M 50/559; H01M 50/531;
(Continued)

(56) References Cited

U.S. PATENT DOCUMENTS 3,503,806 A 3/1970 Sugalski
3,761,314 A 9/1973 Cailley
(Continued)

FOREIGN PATENT DOCUMENTS

CN 1170782 A 1/1998
CN 1407642 A 4/2003
(Continued)

OTHER PUBLICATIONS

Musk (Screen captures from YouTube video clip entitled "Tesla Battery Day," uploaded on Sep. 22, 2020 by user "Tesla". Retrieved from Internet: <https://www.youtube.com/watch?v=I6T9xleZTds>, at 48 minutes 55 seconds) (Year: 2020).*
(Continued)

*Primary Examiner* — Tiffany Legette
*Assistant Examiner* — Paul Christian St Wyrough

US 12,482,866 B2

Page 2

(74) *Attorney, Agent, or Firm* — Birch, Stewart, Kolasch & Birch, LLP

(57) ABSTRACT

A battery includes an electrode assembly including a first electrode, a second electrode, and a separator between the first electrode and second electrode, a first portion including an active material extending between a pair of first sides, and a second portion extending between the pair of first sides and exposed beyond the separator, at least a part of the second portion includes an electrode tab; a battery housing having a first end with a first opening, a second end opposite the first end, and an inner surface, the battery housing accommodating the electrode assembly; a first current collector including a tab coupling portion coupled to the second portion of the first electrode and a housing coupling portion extending from the tab coupling portion and electrically coupled to the inner surface of the battery housing; and a cap covering the first opening of the battery housing.

25 Claims, 25 Drawing Sheets

(30) Foreign Application Priority Data

| Feb. 19, 2021 | (KR) | 10-2021-0022894 |
|---|---|---|
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.
| H01M 4/70 | (2006.01) |
|---|---|
| H01M 50/107 | (2021.01) |
| H01M 50/152 | (2021.01) |
| H01M 50/179 | (2021.01) |
| H01M 50/183 | (2021.01) |
| H01M 50/188 | (2021.01) |
| H01M 50/213 | (2021.01) |
| H01M 50/242 | (2021.01) |
| H01M 50/507 | (2021.01) |
| H01M 50/509 | (2021.01) |
| H01M 50/531 | (2021.01) |
| H01M 50/533 | (2021.01) |
| H01M 50/536 | (2021.01) |
| H01M 50/55 | (2021.01) |
| H01M 50/559 | (2021.01) |
| H01M 50/567 | (2021.01) |

(52) U.S. Cl.
CPC ....... *H01M 50/107* (2021.01); *H01M 50/152* (2021.01); *H01M 50/179* (2021.01); *H01M 50/183* (2021.01); *H01M 50/188* (2021.01); *H01M 50/213* (2021.01); *H01M 50/242* (2021.01); *H01M 50/507* (2021.01); *H01M 50/509* (2021.01); *H01M 50/531* (2021.01); *H01M 50/533* (2021.01); *H01M 50/536* (2021.01); *H01M 50/55* (2021.01); *H01M 50/559* (2021.01); *H01M 50/567* (2021.01); *H01M 2220/20* (2013.01)

(58) Field of Classification Search
CPC ............. H01M 50/152; H01M 50/242; H01M 50/533; H01M 50/509; H01M 50/507; H01M 50/183; H01M 50/179; H01M 50/213; H01M 50/536; H01M 4/64; H01M 4/70; H01M 2220/20
USPC .......................................................... 429/211
See application file for complete search history.

(56) References Cited

U.S. PATENT DOCUMENTS

| 4,049,883 | A | 9/1977 | Schenk et al. |
|---|---|---|---|
| 4,053,687 | A | 10/1977 | Coibion et al. |
| 4,322,484 | A | 3/1982 | Sugalski |
| 4,563,551 | A | 1/1986 | Black, III et al. |
| 5,576,113 | A | 11/1996 | Hirofumi et al. |
| 5,665,483 | A | 9/1997 | Saito et al. |
| 5,770,332 | A | 6/1998 | Narukawa et al. |
| 5,849,431 | A | 12/1998 | Kita et al. |
| 6,132,900 | A | 10/2000 | Yoshizawa et al. |
| 6,399,237 | B1 | 6/2002 | Souliac et al. |
| 6,451,473 | B1 | 9/2002 | Saito et al. |
| 6,653,017 | B2 | 11/2003 | Satoh et al. |
| 6,677,082 | B2 | 1/2004 | Thackeray et al. |
| 6,680,143 | B2 | 1/2004 | Thackeray et al. |
| 7,273,678 | B2 | 9/2007 | Akita et al. |
| 7,351,496 | B2 | 4/2008 | Nakanishi et al. |
| 8,007,549 | B2 | 8/2011 | Ligeois et al. |
| 8,580,425 | B2 | 11/2013 | Kim |
| 9,496,539 | B2 | 11/2016 | Tyler et al. |
| 9,496,557 | B2 | 11/2016 | Fuhr et al. |
| 10,840,555 | B2 | 11/2020 | Iwama et al. |
| 2001/0004505 | A1 | 6/2001 | Kim et al. |
| 2001/0051297 | A1 | 12/2001 | Nemoto et al. |
| 2001/0053477 | A1 | 12/2001 | Kitoh et al. |
| 2002/0061435 | A1 | 5/2002 | Hisai |
| 2002/0110729 | A1 | 8/2002 | Hozumi et al. |
| 2003/0035993 | A1 | 2/2003 | Enomoto et al. |
| 2003/0049536 | A1 | 3/2003 | Wiepen |
| 2003/0064285 | A1 | 4/2003 | Kawamura et al. |
| 2003/0104276 | A1 | 6/2003 | Mizuno et al. |
| 2004/0023108 | A1 | 2/2004 | Nakanishi et al. |
| 2004/0131930 | A1 | 7/2004 | Nakanishi et al. |
| 2005/0048365 | A1 | 3/2005 | Miyahisa et al. |
| 2005/0058184 | A1 | 3/2005 | Paul et al. |
| 2005/0118499 | A1 | 6/2005 | Kim |
| 2005/0142436 | A1 | 6/2005 | Arai et al. |
| 2005/0158620 | A1 | 7/2005 | Kim et al. |
| 2005/0181272 | A1 | 8/2005 | Kim |
| 2005/0214640 | A1 | 9/2005 | Kim |
| 2005/0238951 | A1 | 10/2005 | Yoo et al. |
| 2005/0260487 | A1 | 11/2005 | Kim et al. |

(56) References Cited

U.S. PATENT DOCUMENTS

| | | |
|---|---|---|
| 2005/0260489 A1 | 11/2005 | Kim |
| 2005/0287428 A1 | 12/2005 | Cheon et al. |
| 2005/0287432 A1 | 12/2005 | Cheon et al. |
| 2006/0024574 A1 | 2/2006 | Yim et al. |
| 2006/0063063 A1 | 3/2006 | Mori et al. |
| 2006/0204841 A1 | 9/2006 | Satoh et al. |
| 2008/0026293 A1 | 1/2008 | Marple et al. |
| 2008/0038629 A1 | 2/2008 | Okabe et al. |
| 2008/0057394 A1 | 3/2008 | Rigobert et al. |
| 2008/0145756 A1 | 6/2008 | Taniguichi |
| 2008/0182159 A1 | 7/2008 | Mitani et al. |
| 2008/0254354 A1 | 10/2008 | Adams |
| 2009/0011329 A1 | 1/2009 | Yoon |
| 2009/0104520 A1 | 4/2009 | Marple |
| 2009/0208830 A1 | 8/2009 | Okabe et al. |
| 2009/0208836 A1 | 8/2009 | Fuhr et al. |
| 2009/0239133 A1 | 9/2009 | Kosugi |
| 2009/0280406 A1 | 11/2009 | Kozuki |
| 2009/0311583 A1 | 12/2009 | Wu |
| 2010/0035140 A1 | 2/2010 | Miyahisa et al. |
| 2010/0081052 A1 | 4/2010 | Morishima et al. |
| 2010/0129716 A1 | 5/2010 | Kato et al. |
| 2010/0151317 A1 | 6/2010 | Kim et al. |
| 2010/0216001 A1 | 8/2010 | Byun et al. |
| 2010/0255358 A1 | 10/2010 | Yoneyama |
| 2010/0266893 A1 | 10/2010 | Martin et al. |
| 2010/0316897 A1 | 12/2010 | Kozuki et al. |
| 2010/0330414 A1 | 12/2010 | Mori |
| 2011/0027644 A1 | 2/2011 | Kiyama |
| 2011/0067227 A1 | 3/2011 | Sohn |
| 2011/0086610 A1 | 4/2011 | Baldwin et al. |
| 2011/0171508 A1 | 7/2011 | Kim |
| 2011/0256433 A1 | 10/2011 | Fuhr et al. |
| 2011/0274953 A1 | 11/2011 | Hato et al. |
| 2011/0281155 A1 | 11/2011 | Ito et al. |
| 2011/0300444 A1 | 12/2011 | Nakamura |
| 2012/0058375 A1 | 3/2012 | Tanaka et al. |
| 2012/0094169 A1 | 4/2012 | Kim et al. |
| 2012/0231641 A1 | 9/2012 | Sugai et al. |
| 2012/0297611 A1 | 11/2012 | Ma |
| 2012/0328932 A1 | 12/2012 | Guen et al. |
| 2013/0136977 A1 | 5/2013 | Masuda |
| 2013/0183556 A1 | 7/2013 | Kim |
| 2013/0209849 A1 | 8/2013 | Hattori et al. |
| 2013/0273401 A1 | 10/2013 | Lee et al. |
| 2013/0323574 A1 | 12/2013 | Tsunaki et al. |
| 2014/0079971 A1 | 3/2014 | Huang |
| 2014/0113185 A1 | 4/2014 | Mori et al. |
| 2014/0162097 A1 | 6/2014 | Fuhr et al. |
| 2014/0205868 A1 | 7/2014 | Phillips |
| 2014/0212695 A1 | 7/2014 | Lane et al. |
| 2014/0234676 A1 | 8/2014 | Tyler et al. |
| 2014/0255748 A1 | 9/2014 | Jan et al. |
| 2015/0104694 A1 | 4/2015 | Okuda et al. |
| 2015/0140379 A1 | 5/2015 | Yau |
| 2015/0155532 A1 | 6/2015 | Harayama et al. |
| 2016/0043373 A1 | 2/2016 | Arishima et al. |
| 2016/0099451 A1 | 4/2016 | Murai et al. |
| 2016/0141589 A1 | 5/2016 | Kang et al. |
| 2016/0155998 A1 | 6/2016 | Wakimoto et al. |
| 2016/0156037 A1 | 6/2016 | Mizuno |
| 2016/0181577 A1 | 6/2016 | Kajiwara et al. |
| 2016/0226056 A1 | 8/2016 | Masson et al. |
| 2016/0329542 A1 | 11/2016 | Tyler et al. |
| 2017/0018750 A1 | 1/2017 | Wininer |
| 2017/0047575 A1 | 2/2017 | Tsuji et al. |
| 2017/0062789 A1 | 3/2017 | Sim et al. |
| 2017/0149042 A1 | 5/2017 | Koo et al. |
| 2017/0187068 A1 | 6/2017 | Morisawa et al. |
| 2017/0200935 A1 | 7/2017 | Hong et al. |
| 2017/0256769 A1 | 9/2017 | Wynn et al. |
| 2017/0338462 A1 | 11/2017 | Imre |
| 2017/0372848 A1 | 12/2017 | Yoon et al. |
| 2018/0062123 A1 | 3/2018 | Ikeda et al. |
| 2018/0123143 A1 | 5/2018 | Sato et al. |
| 2018/0130995 A1 | 5/2018 | Nemoto et al. |
| 2018/0182560 A1 | 6/2018 | Khakhalev |
| 2018/0205044 A1 | 7/2018 | Urushihara |
| 2018/0219208 A1 | 8/2018 | Dewulf et al. |
| 2018/0247773 A1 | 8/2018 | Lee |
| 2018/0375162 A1 | 12/2018 | Wakimoto et al. |
| 2019/0006639 A1 | 1/2019 | Ito |
| 2019/0081294 A1 | 3/2019 | Capati et al. |
| 2019/0148683 A1 | 5/2019 | Kwon et al. |
| 2019/0221791 A1 | 7/2019 | Wakimoto |
| 2019/0252667 A1 | 8/2019 | Moriyama et al. |
| 2019/0280256 A1 | 9/2019 | Baik et al. |
| 2019/0296283 A1 | 9/2019 | Chen et al. |
| 2019/0341201 A1 | 11/2019 | Chami et al. |
| 2019/0379019 A1 | 12/2019 | Fukuda et al. |
| 2019/0379028 A1 | 12/2019 | Lim et al. |
| 2019/0386272 A1 | 12/2019 | Shin et al. |
| 2020/0044289 A1 | 2/2020 | Pasma et al. |
| 2020/0083492 A1 | 3/2020 | Koshiol et al. |
| 2020/0119328 A1 | 4/2020 | Zheng et al. |
| 2020/0127249 A1 | 4/2020 | Yoon et al. |
| 2020/0144581 A1 | 5/2020 | Thunot |
| 2020/0144676 A1* | 5/2020 | Tsuruta ............... H01M 50/538 |
| 2020/0203773 A1 | 6/2020 | Fujita et al. |
| 2020/0212374 A1 | 7/2020 | Gaugler |
| 2020/0235369 A1 | 7/2020 | Jeong et al. |
| 2020/0295341 A1 | 9/2020 | Kim et al. |
| 2020/0365838 A1 | 11/2020 | Chen |
| 2020/0373546 A1 | 11/2020 | Li et al. |
| 2020/0388856 A1 | 12/2020 | Hayashi |
| 2021/0039195 A1 | 2/2021 | Jost et al. |
| 2021/0075051 A1 | 3/2021 | Zhou |
| 2021/0167467 A1 | 6/2021 | Yang et al. |
| 2021/0210792 A1 | 7/2021 | Mukai et al. |
| 2021/0257652 A1 | 8/2021 | Ko et al. |
| 2021/0273298 A1 | 9/2021 | Babinot et al. |
| 2021/0278479 A1 | 9/2021 | Park et al. |
| 2021/0280835 A1 | 9/2021 | Peng et al. |
| 2021/0344033 A1 | 11/2021 | Park et al. |
| 2021/0376333 A1 | 12/2021 | Shiozaki et al. |
| 2022/0037712 A1 | 2/2022 | Kritzer et al. |
| 2022/0069335 A1 | 3/2022 | Kim |
| 2022/0123444 A1 | 4/2022 | Liu et al. |
| 2022/0271344 A1 | 8/2022 | Choi et al. |
| 2022/0271402 A1 | 8/2022 | Lim et al. |
| 2023/0091100 A1 | 3/2023 | Tsushima et al. |
| 2023/0123195 A1 | 4/2023 | Fang et al. |
| 2024/0356123 A1 | 10/2024 | Ko et al. |

FOREIGN PATENT DOCUMENTS

| | | | | |
|---|---|---|---|---|
| CN | 1426609 A | | 6/2003 | |
| CN | 1444303 A | | 9/2003 | |
| CN | 1495943 A | | 5/2004 | |
| CN | 2881364 Y | | 2/2005 | |
| CN | 1700495 A | | 11/2005 | |
| CN | 1832228 A | | 9/2006 | |
| CN | 1309105 C | | 4/2007 | |
| CN | 101010818 A | | 7/2007 | |
| CN | 101026248 A | | 8/2007 | |
| CN | 100349321 C | | 11/2007 | |
| CN | 101083317 A | | 12/2007 | |
| CN | 200990393 Y | | 12/2007 | |
| CN | 201066701 Y | | 5/2008 | |
| CN | 201117731 Y | | 9/2008 | |
| CN | 101288572 A | | 10/2008 | |
| CN | 100468827 C | | 3/2009 | |
| CN | 101404338 A | | 4/2009 | |
| CN | 101501884 A | | 8/2009 | |
| CN | 201466087 U | | 5/2010 | |
| CN | 201638890 U | | 11/2010 | |
| CN | 201725845 U | | 1/2011 | |
| CN | 201781028 U | | 3/2011 | |
| CN | 102217116 A | * | 10/2011 | ........ H01M 10/0525 |
| CN | 202423400 U | | 9/2012 | |
| CN | 103155222 A | | 6/2013 | |
| CN | 103280543 A | | 9/2013 | |
| CN | 103427063 A | | 12/2013 | |
| CN | 203553261 U | | 4/2014 | |

(56) References Cited

FOREIGN PATENT DOCUMENTS

| | | |
|---|---|---|
| CN | 103797611 A | 5/2014 |
| CN | 203987145 U | 11/2014 |
| CN | 104396044 A | 3/2015 |
| CN | 204230370 U | 3/2015 |
| CN | 204596910 U | 8/2015 |
| CN | 204885267 U | 12/2015 |
| CN | 105449291 A | 3/2016 |
| CN | 105655623 A | 6/2016 |
| CN | 106030855 A | 10/2016 |
| CN | 106159350 A | 11/2016 |
| CN | 205863251 U | 1/2017 |
| CN | 106463654 A | 2/2017 |
| CN | 206250283 U | 6/2017 |
| CN | 106935746 A | 7/2017 |
| CN | 107112597 A | 8/2017 |
| CN | 206461019 U | 9/2017 |
| CN | 206461044 U | 9/2017 |
| CN | 206471426 U | 9/2017 |
| CN | 104488113 B | 10/2017 |
| CN | 107275524 A | 10/2017 |
| CN | 206619636 U | 11/2017 |
| CN | 107431215 A | 12/2017 |
| CN | 107482156 A | 12/2017 |
| CN | 107851769 A | 3/2018 |
| CN | 207217654 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209133626 U | 7/2019 |
| CN | 209328958 U | 8/2019 |
| CN | 110247058 A | 9/2019 |
| CN | 110459705 A | 11/2019 |
| CN | 110476273 A | 11/2019 |
| CN | 110581235 A | 12/2019 |
| CN | 209822778 U | 12/2019 |
| CN | 209912959 U | 1/2020 |
| CN | 110870099 A | 3/2020 |
| CN | 111033807 A | 4/2020 |
| CN | 111446386 A | 7/2020 |
| CN | 211208547 U | 8/2020 |
| CN | 111668534 A | 9/2020 |
| CN | 11952525 A | 11/2020 |
| CN | 211879534 U | 11/2020 |
| CN | 212182379 U | 12/2020 |
| CN | 112310574 A | 2/2021 |
| CN | 112335075 A | 2/2021 |
| CN | 212907981 U | 4/2021 |
| CN | 112909445 A * | 6/2021 |
| CN | 113193165 A | 7/2021 |
| CN | 214378637 U | 10/2021 |
| CN | 215342666 U | 12/2021 |
| CN | 114865242 A | 8/2022 |
| CN | 217239523 U | 8/2022 |
| CN | 217239536 U | 8/2022 |
| CN | 109119674 B | 7/2024 |
| EP | 1 596 450 A2 | 11/2005 |
| EP | 2677592 A1 | 12/2013 |
| EP | 2 728 647 A1 | 5/2014 |
| EP | 2 876 338 A1 | 5/2015 |
| EP | 2 924 762 A2 | 9/2015 |
| EP | 2 160 777 B1 | 3/2019 |
| EP | 3 739 669 A1 | 11/2020 |
| EP | 3 748 728 A1 | 12/2020 |
| EP | 4 087 034 A1 | 11/2022 |
| EP | 4 290 630 A1 | 12/2023 |
| EP | 3 739 652 B1 | 3/2024 |
| EP | 4 336 649 A1 | 3/2024 |
| EP | 4 418 379 A1 | 8/2024 |
| EP | 4 421 970 A1 | 8/2024 |
| GB | 1191105 A | 5/1970 |
| GB | 1 332 944 A | 10/1973 |
| GB | 2564670 A | 1/2019 |
| JP | 62-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 8-180849 A | 7/1996 |
| JP | 10-83833 A | 3/1998 |
| JP | 10-106532 A | 4/1998 |
| JP | 10-214609 A | 8/1998 |
| JP | 10-228908 A | 8/1998 |
| JP | 11-67279 A | 3/1999 |
| JP | 11-144690 A | 5/1999 |
| JP | 11-176447 A | 7/1999 |
| JP | 11-219720 A | 8/1999 |
| JP | 11-297301 A | 10/1999 |
| JP | 2955135 B2 | 10/1999 |
| JP | 11-329398 A | 11/1999 |
| JP | 2000-243433 A | 9/2000 |
| JP | 2001-28274 A | 1/2001 |
| JP | 2001-43844 A | 2/2001 |
| JP | 2001-52756 A | 2/2001 |
| JP | 2001-148238 A | 5/2001 |
| JP | 2001-256954 A | 9/2001 |
| JP | 3252846 B2 | 2/2002 |
| JP | 2002-157991 A | 5/2002 |
| JP | 2002-289170 A | 10/2002 |
| JP | 2003-115285 A | 4/2003 |
| JP | 2004-14173 A | 1/2004 |
| JP | 2004-95487 A | 3/2004 |
| JP | 2004-253253 A | 9/2004 |
| JP | 3588264 B2 | 11/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-276840 A | 10/2005 |
| JP | 3718872 B2 | 11/2005 |
| JP | 2006-120606 A | 5/2006 |
| JP | 3906519 B2 | 1/2007 |
| JP | 2007-234486 A | 9/2007 |
| JP | 2007-335156 A | 12/2007 |
| JP | 2008-66302 A | 3/2008 |
| JP | 3751782 B2 | 3/2008 |
| JP | 2008-123848 A | 5/2008 |
| JP | 2008-192552 A | 8/2008 |
| JP | 2006-278016 A | 10/2008 |
| JP | 2008-243811 A | 10/2008 |
| JP | 2009-104925 A | 5/2009 |
| JP | 2009-110885 A | 5/2009 |
| JP | 2009-176449 A | 8/2009 |
| JP | 4346637 B2 | 10/2009 |
| JP | 2009-259452 A | 11/2009 |
| JP | 2009-289672 A | 12/2009 |
| JP | 2010-10117 A | 1/2010 |
| JP | 4401634 B2 | 1/2010 |
| JP | 2010-33940 A | 2/2010 |
| JP | 4430587 B2 | 3/2010 |
| JP | 2010-80392 A | 4/2010 |
| JP | 2010-529624 A | 8/2010 |
| JP | 2011-113845 A | 6/2011 |
| JP | 2011-159582 A | 8/2011 |
| JP | 2012-74359 A | 4/2012 |
| JP | 2012-510143 A | 4/2012 |
| JP | 2012-160658 A | 8/2012 |
| JP | 5019557 B2 | 9/2012 |
| JP | 5030379 B2 | 9/2012 |
| JP | 2012-190739 A | 10/2012 |
| JP | 5051410 B2 | 10/2012 |
| JP | 2013-246966 A | 12/2013 |
| JP | 5651536 B2 | 1/2015 |
| JP | 2015-106613 A | 6/2015 |
| JP | 5796623 B2 | 10/2015 |
| JP | 2015-222685 A | 12/2015 |
| JP | 2016-100323 A | 5/2016 |
| JP | 2016-115422 A | 6/2016 |
| JP | 5935878 B2 | 6/2016 |
| JP | 2016-195036 A | 11/2016 |
| JP | 2016-225014 A | 12/2016 |
| JP | 2017-143004 A | 8/2017 |

(56) References Cited

FOREIGN PATENT DOCUMENTS

| | | |
|---|---|---|
| JP | 2018-507544 A | 3/2018 |
| JP | 5877724 B2 | 3/2018 |
| JP | 2018-092776 A | 6/2018 |
| JP | 2018-163765 A | 10/2018 |
| JP | 6406836 B2 | 10/2018 |
| JP | 2019-46639 A | 3/2019 |
| JP | WO2019/194182 A1 | 10/2019 |
| JP | 2020-71898 A | 5/2020 |
| JP | 6735445 B2 | 8/2020 |
| JP | 2020-527841 A | 9/2020 |
| JP | 2020-202038 A | 12/2020 |
| KR | 2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-0612236 B1 | 8/2006 |
| KR | 10-2007-0033762 A | 3/2007 |
| KR | 10-2008-0047165 A | 5/2008 |
| KR | 10-2009-0003702 A | 1/2009 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-1446151 B1 | 10/2014 |
| KR | 10-2015-0134566 A | 12/2015 |
| KR | 10-2016-0043725 A | 4/2016 |
| KR | 10-2018-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-1807353 B1 | 12/2017 |
| KR | 10-2018-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0116156 A | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0020173 A | 2/2020 |
| KR | 10-2020-0037599 A | 4/2020 |
| KR | 10-2020-0039214 A | 4/2020 |
| KR | 10-2020-0041625 A | 4/2020 |
| KR | 10-2021-0006203 A | 1/2021 |
| TW | I679311 B | 12/2019 |
| WO | WO 01/59856 A1 | 8/2001 |
| WO | WO 2006/035980 A1 | 4/2006 |
| WO | WO 2006-085437 A1 | 8/2006 |
| WO | WO 2010/0146154 A2 | 12/2010 |
| WO | WO 2012/090599 A1 | 7/2012 |
| WO | WO 2013/024774 A1 | 2/2013 |
| WO | WO 2015/025388 A1 | 2/2015 |
| WO | WO 2016/088287 A1 | 6/2016 |
| WO | WO 2016/203708 A1 | 12/2016 |
| WO | WO 2017/223429 A1 | 12/2017 |
| WO | WO-2018117457 A1 * 6/2018 ............ H01M 10/04 |
| WO | WO 2018/134704 A1 | 7/2018 |
| WO | WO 2019/151662 A1 | 8/2019 |
| WO | WO 2020/060069 A1 | 3/2020 |
| WO | WO 2020/083278 A1 | 4/2020 |
| WO | WO 2020/110888 A1 | 6/2020 |
| WO | WO 2020/149350 A1 | 7/2020 |
| WO | WO 2020/159071 A1 | 8/2020 |
| WO | WO 2020/171426 A1 | 8/2020 |
| WO | WO 2021/020119 A1 | 2/2021 |
| WO | WO 2021/020237 A1 | 2/2021 |
| WO | WO 2022/061187 A1 | 3/2022 |

OTHER PUBLICATIONS

Kwon (WO 2018117457 A1) machine translation (Year: 2018).*
CN102217116A (translation) (Year: 2011).*
CN112909445A (machine translation) (Year: 2021).*
U.S. Office Action for U.S. Appl. No. 18/132,085, dated Jun. 14, 2023.
U.S. Office Action for U.S. Appl. No. 18/086,410, dated Jul. 24, 2023.
U.S. Office Action for U.S. Appl. No. 18/086,485, dated Aug. 15, 2023.
U.S. Office Action for U.S. Appl. No. 17/592,597, dated Jun. 21, 2023.
"Laser Welding vs. Arc (Tig) Welding of Medical Instruments," ACCUMET, Oct. 22, 2014, URL: <https://www.accumet.com/updates/consider_laser_welding_instead/>.
Ma et al., "Electro-Thermal Modeling of a Lithium-ion Battery System," SAE International Journal of Engines, vol. 3, No. 2, Oct. 25, 2010, p. 306 (abstract only).
U.S. Office Action for U.S. Appl. No. 17/579,380, dated Jul. 20, 2023.
Nigel, "Tesla 4680 Cell," Battery Design, Nov. 18, 2022, URL: <https://www.batterydesign.net/tesla-4680-cell/>.
U.S. Notice of Allowance for U.S. Appl. No. 18/131,751, dated Jan. 16, 2024.
U.S. Office Action dated Nov. 24, 2023 for U.S. Appl. No. 17/592,594.
European Communication pursuant to Rule 114(2) EPC for European Application No. 22742840.6, dated Feb. 5, 2024.
U.S. Advisory Action for U.S. Appl. No. 18/086,485, dated Nov. 3, 2023.
U.S. Office Action for U.S. Appl. No. 18/132,166, dated Oct. 2, 2023.
ASM Aerospace Specification Metals Inc., "Aluminum 5052-H19 Foil", 2001, https://asm.matweb.com/search/SpecificMaterial.asp?bassnum=ma5052h19, 2 pages.
Iowa State University, Center for Nondestructive Evaluation, NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.
U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch?v=I6T9xleZTds, 2 pages.
Automotive & Accessories Magazine, "The core topic of Tesia's "Battery Day": reducing battery manufacturing costs," Sep. 23, 2020, 6 pages.
Third Party Observation dated Feb. 26, 2024 for European Application No. 22152256.8.
Third Party Observation dated Feb. 26, 2024 for European Application No. 22152262.6.
European Search Report mailed in EP 22 15 2207 on Jul. 22, 2022 (9 pages).
European Search Report mailed in EP 22152223 on Jul. 29, 2022 (10 pages).
European Search Report mailed in EP 22152237 on Aug. 2, 2022 (11 pages).
European Search Report mailed in EP 22152245 on Jul. 28, 2022 (11 pages).
European Search Report mailed in EP 22152250 on Aug. 5, 2022 (12 pages).
Third Party Observation dated Apr. 17, 2024 for European Application No. 22742840.6.
Third Party Observation dated Apr. 18, 2024 for European Application No. 23214922.9.

(56) References Cited

OTHER PUBLICATIONS

Third Party Observation dated Apr. 19, 2024 for European Application No. 22742838.0.
Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
Full English Translation of Japanese Publication No. 2002-289170-A dated Oct. 4, 2002.
Third Party Observation dated Apr. 9, 2024 for European Application No. 22742833.1.
Partial Supplementary European Search Report for European Application No. 22742840.6, dated Jul. 15, 2024.
Third Party Observation for European Application No. 22881172.5, dated Jul. 22, 2024.
U.S. Office Action for U.S. Appl. No. 18/086,402, dated Jun. 12, 2024.
European Communication pursuant to Rule 114(2) EPC for European Application No. 22756569.4, dated Jun. 6, 2024.
European Communication pursuant to Rule 114(2) EPC for European Application No. 22756569.4, dated May 27, 2024.
European Communication pursuant to Rule 114(2) EPC for European Application No. 22756574.4, dated May 3, 2024.
European Communication pursuant to Rule 114(2) EPC for European Application No. 22756576.9, dated Apr. 16, 2024.
European Communication pursuant to Rule 114(2) EPC for European Application No. 22856151.0, dated Apr. 30, 2024.
European Communication pursuant to Rule 114(2) EPC for European Application No. 22881171.7, dated May 3, 2024.
European Communication pursuant to Rule 114(2) EPC for European Application No. 22883724.1, dated May 8, 2024.
European Communication pursuant to Rule 114(2) EPC for European Application No. 22895785.8, dated Apr. 16, 2024.
Third Party Observation for European Application No. 23215163.9, dated Jan. 17, 2025.
Notice of Opposition for European Application No. 22152223.8, dated Oct. 16, 2024.
U.S. Office Action for U.S. Appl. No. 17/592,576, dated Oct. 17, 2024.
U.S. Office Action for U.S. Appl. No. 17/592,608, dated Oct. 17, 2024.
Youtube, "Tesla battery production," Jan. 18, 2021, https://www.youtube.com/watch?v=zB8_HbrxUi8, 14 pages total.
Third Party Observation for U.S. Appl. No. 18/273,010, dated Oct. 22, 2024.
Third Party Observation for U.S. Appl. No. 18/277,848, dated Oct. 25, 2024.
U.S. Office Action for U.S. Appl. No. 18/086,402, dated Oct. 28, 2024.
Third Party Observation for European Application No. 23218081.0, dated Jan. 9, 2025.
Extended European Search Report for European Application No. 22742838.0, dated Jun. 18, 2025.
U.S. Office Action for U.S. Appl. No. 17/592,576, dated Mar. 31, 2025.
Extended European Search Report for European Application No. 22742833.1, dated Feb. 28, 2025.
Notice of Opposition for European Application No. 22152207.1, dated Mar. 11, 2025.
U.S. Appl. No. 63/081,244, filed Sep. 21, 2020.
U.S. Appl. No. 63/167,565, filed Mar. 29, 2021.
European Communication of a Notice of Opposition for European Application No. 22152245.1, dated Dec. 10, 2024.
European Communication pursuant to Article 94(3) EPC for European Application No. 23 215 214.0, dated Nov. 21, 2024.
U.S. Office Action for U.S. Appl. No. 17/592,672, dated Dec. 23, 2024.

* cited by examiner

FIG. 13e

| | Shape of current collector plate before sizing | Deformed shape of current collector plate after 1 mm sizing | Stress applied to J/R by current collector plate |
|---|---|---|---|
| 1 | | Raised welded portion: 0.72mm | 4.5MPa |
| 2 | | Raised welded portion: 0.99mm | 3.7MPa |
| 3 | | Raised height: 0.26mm Raised welded portion: 0.02mm | 2.0MPa |

BATTERY AND CURRENT COLLECTOR APPLIED THERETO, AND BATTERY PACK AND VEHICLE INCLUDING THE BATTERY

CROSS-REFERENCE TO RELATED APPLICATIONS

This application is a Continuation of U.S. application Ser. No. 17/592,672, filed on Feb. 4, 2022, which claims priority under 35 U.S.C. § 119(a) to Patent Application No. 10-2021-0022881, filed in the Republic of Korea on Feb. 19, 2021, Patent Application No. 10-2021-0022891, filed in the Republic of Korea on Feb. 19, 2021, Patent Application No. 10-2021-0022894, filed in the Republic of Korea on Feb. 19, 2021, Patent Application No. 10-2021-0022897, filed in the Republic of Korea on Feb. 19, 2021, Patent Application No. 10-2021-0024424, filed in the Republic of Korea on Feb. 23, 2021, Patent Application No. 10-2021-0030291, filed in the Republic of Korea on Mar. 8, 2021, Patent Application No. 10-2021-0030300, filed in the Republic of Korea on Mar. 8, 2021, Patent Application No. 10-2021-0046798, filed in the Republic of Korea on Apr. 9, 2021, Patent Application No. 10-2021-0058183, filed in the Republic of Korea on May 4, 2021, Patent Application No. 10-2021-0077046, filed in the Republic of Korea on Jun. 14, 2021, Patent Application No. 10-2021-0084326, filed in the Republic of Korea on Jun. 28, 2021, Patent Application No. 10-2021-0131205, filed in the Republic of Korea on Oct. 1, 2021, Patent Application No. 10-2021-0131207, filed in the Republic of Korea on Oct. 1, 2021, Patent Application No. 10-2021-0131208, filed in the Republic of Korea on Oct. 1, 2021, Patent Application No. 10-2021-0131215, filed in the Republic of Korea on Oct. 1, 2021, Patent Application No. 10-2021-0131225, filed in the Republic of Korea on Oct. 1, 2021, Patent Application No. 10-2021-0137001, filed in the Republic of Korea on Oct. 14, 2021, Patent Application No. 10-2021-0137856, filed in the Republic of Korea on Oct. 15, 2021, Patent Application No. 10-2021-0142196, filed in the Republic of Korea on Oct. 22, 2021, Patent Application No. 10-2021-0153472, filed in the Republic of Korea on Nov. 9, 2021, Patent Application No. 10-2021-0160823, filed in the Republic of Korea on Nov. 19, 2021, Patent Application No. 10-2021-0163809, filed in the Republic of Korea on Nov. 24, 2021, Patent Application No. 10-2021-0165866, filed in the Republic of Korea on Nov. 26, 2021, Patent Application No. 10-2021-0172446, filed in the Republic of Korea on Dec. 3, 2021, Patent Application No. 10-2021-0177091, filed in the Republic of Korea on Dec. 10, 2021, Patent Application No. 10-2021-0194572, filed in the Republic of Korea on Dec. 31, 2021, Patent Application No. 10-2021-0194593, filed in the Republic of Korea on Dec. 31, 2021, Patent Application No. 10-2021-0194610, filed in the Republic of Korea on Dec. 31, 2021, Patent Application No. 10-2021-0194611, filed in the Republic of Korea on Dec. 31, 2021, Patent Application No. 10-2021-0194612, filed in the Republic of Korea on Dec. 31, 2021, and Patent Application No. 10-2022-0001802, filed in the Republic of Korea on Jan. 5, 2022, where all of these applications are hereby expressly incorporated by reference in their entireties into the present application.

Also, Patent Application No. 10-2021-0007278, filed in the Republic of Korea on Jan. 19, 2021, is hereby expressly incorporated by reference in its entirety into the present application.

TECHNICAL FIELD

The present disclosure relates to a battery and a current collector applied thereto, and a battery pack and a vehicle including the battery.

BACKGROUND ART

A battery according to the related art generally has a structure in which a tab for connecting a jelly-roll to an external terminal is welded and connected to a foil of the jelly-roll. The battery having the above structure has a limited current path and has very high resistance of the jelly-roll itself.

Accordingly, a method of reducing the resistance by increasing the number of tabs for connecting the jelly-roll to the external terminal has been attempted, but there is a limitation in reducing the resistance to a desired level and sufficiently securing current paths only by increasing the number of tabs.

Therefore, it is demanded to develop a new jelly-roll structure for reducing self-resistance of the jelly-roll and to develop a current collector structure suitable for the new jelly-roll structure. In particular, the necessity for application of the jelly-roll and the current collector having a new structure is much required for a device, e.g., an electric vehicle, which needs a battery pack having high output/high capacity.

Also, there is a need to develop a battery having a structure in which a coupling force between a current collector and a battery housing is improved and maintained at an improved level, and a current collector applied to the battery.

In addition, there is a need to develop a battery having improved energy density, by minimizing a dead space in a battery housing when a current collector and the battery housing are coupled to each other.

As a battery has recently been applied to an electric vehicle, a form factor of the battery has increased. That is, a diameter and a height of a battery have increased when compared to a conventional battery having a form factor of 1865, 2170, or the like. An increase in a form factor leads to increased energy density, enhanced safety against thermal runaway, and improved cooling efficiency.

The energy density of a battery may be further increased when an unnecessary space in a battery housing is minimized along with an increase in a form factor. Accordingly, it is necessary to design an entire structure of a battery as a low-resistive structure so that a current collector minimizes the amount of heat generated during rapid charging while increasing the capacity of a battery.

DISCLOSURE

Technical Problem

The present disclosure is designed to solve the problems of the related art, and therefore the present disclosure is directed to providing a current collector having a structure suitable for an electrode assembly having a low-resistive structure, and a battery including the current collector.

The present disclosure is also directed to providing a current collector having a structure capable of improving a coupling force of a coupling portion between the current collector and a battery housing, and a battery including the current collector.

The present disclosure is also directed to providing a current collector having a structure capable of improving the energy density of a battery, and a battery including the current collector.

The present disclosure is also directed to providing a current collector having a structure capable of improving convenience in a welding process for electrical connection between a battery housing and the current collector and improving productivity when a battery is manufactured, and a battery including the current collector.

However, the technical purpose to be solved by the present disclosure are not limited to the above, and other objects not mentioned herein will be clearly understood by one of ordinary skill in the art from the following disclosure.

Technical Solution

A battery according to an embodiment of the present disclosure includes: an electrode assembly including a first electrode, a second electrode, and a separator between the first electrode and second electrode, wherein the first electrode, the second electrode, and the separator are wound about an axis, wherein the first electrode has a pair of first sides and a pair of second sides extending between the pair of first sides, a first portion including an active material extending between the pair of first sides, and a second portion extending between the pair of first sides and exposed beyond the separator, wherein at least a part of the second portion includes an electrode tab; a battery housing having a first end with a first opening, a second end with a second opening opposite the first end, and an inner surface, the battery housing accommodating the electrode assembly through the first opening formed at the first end; a first current collector comprising a tab coupling portion coupled to the second portion of the first electrode and a housing coupling portion extending from the tab coupling portion and electrically coupled to the inner surface of the battery housing; and a cap covering the first opening of the battery housing.

Preferably, the battery housing may include a beading portion formed on an end portion adjacent to the first opening at the first end and press-fitted inward.

Preferably, the battery housing may include a crimping portion formed at a position between the first opening at the first end and the beading portion, and extending and bent toward the first opening.

In particular, the housing coupling portion may be press-fixed by the crimping portion.

In an aspect of the present disclosure, the housing coupling portion may include: a contact portion coupled to the beading portion of the battery housing; and a connecting portion to connect the tab coupling portion to the contact portion.

Preferably, the connecting portion may be upwardly convex based on an imaginary straight line that connects an end portion of the contact portion to an end portion of the tab coupling portion.

In another aspect of the present disclosure, the connecting portion may be lifted upward above the beading portion.

Preferably, the connecting portion may include at least one bent part.

Preferably, the bent part may be located over an imaginary plane that passes through a center of the imaginary straight line that connects the end portion of the contact portion to the end portion of the tab coupling portion, and is parallel to a bottom surface of the battery housing.

In another aspect of the present disclosure, the at least one bent part may be bent at an obtuse angle so as not to overlap itself when viewed along a longitudinal axis of the battery housing.

In another aspect of the present disclosure, a boundary point between the contact portion and the connecting portion may be bent at an obtuse angle.

In another aspect of the present disclosure, an inclination of the connecting portion may be reduced stepwise or gradually toward the beading portion.

In another aspect of the present disclosure, an angle between the tab coupling portion and the connecting portion may range from 0° to 90°.

In another aspect of the present disclosure, the connecting portion may support the cap.

In another aspect of the present disclosure, the tab coupling portion and the contact portion may be located at a same height.

In another aspect of the present disclosure, the contact portion may include a flat surface coupled to a top surface of the beading portion facing the opening portion.

In another aspect of the present disclosure, the beading portion may include: a beading portion top surface located over an innermost point that is press-fitted inward; and a beading portion bottom surface located under the innermost point that is press-fitted inward.

Preferably, the tab coupling portion may be located at a lower position than the beading portion bottom surface.

In another aspect of the present disclosure, at least one of the beading portion top surface and the beading portion bottom surface may be inclined at a certain angle with respect to a bottom surface of the battery housing.

In this case, the contact portion may be mounted on an inclined top surface of the beading portion.

In another aspect of the present disclosure, at least one of the beading portion top surface and the beading portion bottom surface may be parallel to a bottom surface of the battery housing in at least a region.

In another aspect of the present disclosure, the beading portion top surface and the beading portion bottom surface may be asymmetric with respect to an imaginary reference plane that passes through the innermost point of the beading portion to be parallel to a bottom surface of the battery housing.

Preferably, the contact portion may be mounted on a flat top surface of the beading portion.

In another aspect of the present disclosure, a press-fitting depth of the beading portion PD satisfies the following formula:

$$PD \geq R_{1,min} + R_{2,min} + W_{bead,min}$$

wherein $R_{1,min}$ is a minimum value of a radius of curvature of the beading portion, $W_{bead,min}$ is a minimum value of a welding bead width, and $R_{2,min}$ is a minimum value of a radius of curvature at a boundary region between the beading portion and the inner surface of the battery housing.

Preferably, a press-fitting depth of the beading portion may range from 0.2 mm to 10 mm.

In another aspect of the present disclosure, a press-fitting depth of the beading portion PD and a maximum value of the press-fitting depth $PD_{max}$ satisfies the following formula:

$$(R_{1,min} + W_{bead,min})/PD_{max} \leq OV/PD \leq (PD_{max} - R_{2,min})/PD_{max}$$

wherein OV is an overlap length that is a shortest distance from an end portion of the contact portion to a vertical line that passes through an innermost point of the beading portion, $R_{1,min}$ is a minimum value of a radius of curvature of the beading portion, $W_{bead,min}$ is a minimum value of a welding bead width, and $R_{2,min}$ is a minimum value of a radius of curvature at a boundary region between the beading portion and the inner surface of the battery housing.

In another aspect of the present disclosure, the contact portion may be welded to the beading portion.

Preferably, the contact portion may be welded to a flat top surface of the beading portion.

More preferably, a welding region between the contact portion and the beading portion may be narrower than the flat top surface of the beading portion.

In another aspect of the present disclosure, a press-fitting depth of the beading portion PD and a maximum value of the press-fitting depth $PD_{max}$ satisfies the following formula:

$$(OV_{min}-0.5*W_{bead,min})/PD_{max} \leq W/PD \leq (OV_{max}-0.5*W_{bead,min})/PD_{max}$$

W is a distance from an innermost point of the beading portion to a central point of an outermost welding bead in a radial direction, OV is an overlap length that is a shortest distance from an end portion of the contact portion to a vertical line that passes through the innermost point of the beading portion, $OV_{min}$ is a minimum value of the overlap length OV, $OV_{max}$ is a maximum value of the overlap length OV, and $W_{bead,min}$ is a minimum value of a welding bead width.

In another aspect of the present disclosure, at least one welding bead may be formed between the beading portion and the contact portion.

Preferably, the at least one welding bead may form a welding pattern having a straight line shape extending in a circumferential direction.

In another aspect of the present disclosure, at least one welding bead may be formed between the beading portion and the contact portion, wherein the at least one welding bead forms a welding pattern having an arc shape extending in a circumferential direction.

In another aspect of the present disclosure, a welding bead formed between the beading portion and the contact portion may form a welding pattern, wherein the welding pattern has a linear shape in which spot welding is connected.

In another aspect of the present disclosure, a plurality of welding beads are formed between the beading portion and the contact portion.

In another aspect of the present disclosure, a width of a welding bead formed between the beading portion and the contact portion may be equal to or greater than 0.1 mm.

In another aspect of the present disclosure, the second portion of the first electrode and the tab coupling portion may be welded in a radial direction of the electrode assembly.

In another aspect of the present disclosure, the tab coupling portion may be welded to the second portion of the first electrode while being parallel to a bottom surface of the battery housing.

In another aspect of the present disclosure, a plurality of welding beads formed between the second portion of the first electrode and the tab coupling portion may form a welding pattern having a straight line shape extending in the radial direction of the electrode assembly.

In another aspect of the present disclosure, a welding bead formed between the second portion of the first electrode and the tab coupling portion may form a welding pattern, wherein the welding pattern has a linear shape in which spot welding is connected.

In another aspect of the present disclosure, a width of a welding bead formed between the second portion of the first electrode and the tab coupling portion may be equal to or greater than 0.1 mm.

In another aspect of the present disclosure, at least a part of the second portion of the first electrode may include a plurality of segments divided in a winding direction of the electrode assembly.

Preferably, the plurality of segments may be bent in a radial direction of the electrode assembly to form a bent surface.

Preferably, the plurality of segments may overlap in multiple layers in the radial direction of the electrode assembly to form the bent surface.

More preferably, the bent surface may include a stack number increasing section in which the number of overlapping layers of the segments is sequentially increased to a maximum value from an outer circumference to a core of the electrode assembly and a stack number uniform section from a radius point at which the number of overlapping layers is the maximum value to a radius point at which an innermost segment exists.

Preferably, the tab coupling portion may be coupled to the bent surface to overlap the stack number uniform section.

More preferably, the number of overlapping layers in the stack number uniform section may be 10 or more.

More preferably, the tab coupling portion may be welded to the bent surface, and a welding region of the tab coupling portion may overlap the stack number uniform section by at least 50% in the radial direction of the electrode assembly.

In another aspect of the present disclosure, the first current collector may include a collector hole at a central portion of the first current collector.

Preferably, a diameter of the collector hole of the first current collector may be equal to or greater than a diameter of a winding central hole formed in a core of the electrode assembly.

In another aspect of the present disclosure, the battery may include a sealing gasket provided between the battery housing and the cap.

Preferably, the contact portion may be located between the sealing gasket and the beading portion.

More preferably, a thickness of the sealing gasket may vary in a circumferential direction.

Preferably, a thickness of the sealing gasket may be alternately increased and decreased in a circumferential direction.

In an aspect of the present disclosure, the sealing gasket may have a same compressibility in a region where the sealing gasket contacts the contact portion and in a region where the sealing gasket does not contact the contact portion.

In another aspect of the present disclosure, a compressibility of the sealing gasket in a region where the sealing gasket does not contact the contact portion may be less than a compressibility of the sealing gasket in a region where the sealing gasket contacts the contact portion.

Preferably, a thickness of the sealing gasket in a region where the sealing gasket does not contact the contact portion may be greater than a thickness of the sealing gasket in a region where the sealing gasket contacts the contact portion.

In another aspect of the present disclosure, the first current collector may have a leg structure where the tab coupling portion and the housing coupling portion are connected to each other and extending in a radial direction.

Preferably, a plurality of leg structures may be provided.

Preferably, the leg structures may be arranged in a radial shape, a cross shape, or a combined shape thereof based on a central portion of the first current collector.

In another aspect of the present disclosure, a plurality of the housing coupling portions may be provided, and wherein the plurality of housing coupling portions are connected to one another and integrally formed.

In another aspect of the present disclosure, the connecting portion may include at least one bending portion in which an extension direction is changed at least once.

Preferably, a protruding outermost point of the bending portion may be spaced apart by a certain interval from an innermost point of the beading portion.

In another aspect of the present disclosure, an angle between the contact portion and the connecting portion may be an acute angle due to the bending portion.

In another aspect of the present disclosure, the connecting portion may be elastically biased upward by the bending portion.

In another aspect of the present disclosure, a circumferential length of the contact portion may be the same as a circumferential length of the tab coupling portion.

In another aspect of the present disclosure, a circumferential length of the contact portion may be the same as a circumferential length of the connecting portion.

In another aspect of the present disclosure, a circumferential length of the contact portion may be greater than a circumferential length of the tab coupling portion.

In another aspect of the present disclosure, a circumferential length of the contact portion may be greater than a circumferential length of the connecting portion.

In another aspect of the present disclosure, the contact portion may have an arc shape extending in a circumferential direction along the beading portion of the battery housing.

In another aspect of the present disclosure, the contact portion may have an arc shape extending in opposite directions to each other along a circumferential direction, from an intersection point of the connecting portion and the contact portion.

In another aspect of the present disclosure, a sum of lengths of the contact portions extending in the circumferential direction may correspond to a length of an inner circumference of the battery housing.

In another aspect of the present disclosure, the connecting portion may have an arc shape extending in the circumferential direction along the contact portion.

In another aspect of the present disclosure, a boundary region between the tab coupling portion and the housing coupling portion may be bent such that an end portion of the housing coupling portion faces towards the beading portion.

In another aspect of the present disclosure, a connected portion between the contact portion and the connecting portion may be bent.

In another aspect of the present disclosure, a connected portion between the contact portion and the connecting portion may have a complementary shape corresponding to an inner surface of the beading portion.

In another aspect of the present disclosure, a connected portion between the contact portion and the connecting portion may be coupled to the beading portion while having a shape matching an inner surface of the beading portion.

In another aspect of the present disclosure, a boundary region between the tab coupling portion and the housing coupling portion may be located farther inward than an innermost point of the beading portion formed on the battery housing.

Preferably, when viewed along a longitudinal axis of the battery housing, the tab coupling portion may not overlap the beading portion.

In another aspect of the present disclosure, the second electrode may include has a pair of third sides and a pair of fourth sides extending between the pair of third sides, a third portion including an active material layer extending between the pair of third sides, and a fourth portion extending between the pair of third sides, and the fourth portion is exposed beyond the separator, at least a part of the fourth portion includes an electrode tab, and wherein the battery may further include a terminal provided opposite to the first opening at the first end of the battery housing and electrically connected to the fourth portion.

Preferably, the battery may further include a second current collector between the fourth portion of the second electrode and the terminal, the second current collector including a tab coupling portion coupled to the fourth portion of the second electrode and a terminal coupling portion coupled to the terminal.

Preferably, the terminal coupling portion may cover a winding central hole of the electrode assembly.

Preferably, a longest radius from a center of the terminal coupling portion of the second current collector to an end of the tab coupling portion of the second current collector may be greater than a longest radius from a central portion of the first current collector to an end of the tab coupling portion of the first current collector.

In another aspect of the present disclosure, the tab coupling portion of the second current collector may be coupled to a bent end portion of the fourth portion of the second electrode.

Preferably, the battery includes a welding region coupling the tab coupling portion of the second current collector to the bent end portion of the fourth portion of the second electrode, wherein a distance from a center of the terminal coupling portion of the second current collector to the welding region of the second current collector is same as, or deviates by 5% or less, from a distance from a central portion of the first current collector to a welding region on the tab coupling portion of the current collector.

Preferably, the welding region of the second current collector may have a length greater than a length of the welding region on the tab coupling portion of the first current collector.

In another aspect of the present disclosure, one or more holes for injecting an electrolytic solution may be formed in the tab coupling portion.

In another aspect of the present disclosure, a form factor ratio obtained by dividing a diameter of the battery by a height may be greater than 0.4.

In another aspect of the present disclosure, resistance measured between a positive electrode and a negative electrode may be equal to or less than 4 mohm.

A battery pack according to an embodiment of the present disclosure includes a plurality of batteries according to an embodiment of the present disclosure as described above.

Preferably, a plurality of batteries may be arranged in a certain number of columns, wherein a terminal and an outer surface of the second end of a battery housing of each of the plurality of batteries are positioned upward.

In an aspect of the present disclosure, the battery pack may further include a plurality of bus bars connecting the plurality of batteries in series and in parallel, wherein each of the plurality of bus bars is located on adjacent batteries among the plurality of batteries, wherein each of the plurality of bus bars includes: a body portion extending between the adjacent batteries; a plurality of first bus bar terminals extending in a first side direction of the body portion and electrically coupled to terminals of the adjacent batteries located in the first side direction; and a plurality of second bus bar terminals extending in a second side direction of the body portion opposite the first direction and electrically connected to an outer surface of the second end of the battery housing of each of the adjacent batteries located in the second side direction.

A vehicle according to an embodiment of the present disclosure includes the battery pack according to an embodiment of the present disclosure.

A current collector according to an embodiment of the present disclosure includes: at least one tab coupling portion to be coupled to a portion of an electrode of an electrode assembly; and at least one housing coupling portion extending from the tab coupling portion and electrically coupled to a beading portion of a battery housing.

A battery according to another embodiment of the present disclosure includes: an electrode assembly including a first electrode, a second electrode, and a separator between the first electrode and the second electrode, wherein the first electrode, the second electrode, and the separator are wound about an axis, wherein the first electrode has a pair of first sides and a pair of second sides extending between the pair of first sides, a first portion including an active material layer extending between the pair of first sides, and a second portion extending between the pair of first sides and exposed beyond the separator, wherein at least a part of the second portion includes an electrode tab; a battery housing in which the electrode assembly is accommodated through a first opening formed at a first end; a first current collector electrically connected to the second portion of the first electrode and an inner surface of the battery housing; and a sealing gasket located between the first opening of the battery housing and the first current collector, wherein a portion of the first current collector contacting the inner surface of the battery housing is located between the inner surface of the battery housing and the sealing gasket.

Preferably, the battery housing may include a beading portion formed on an end portion adjacent to the first opening at the first end and press-fitted inward.

In another aspect of the present disclosure, an extension direction of a welding pattern formed between the second portion of the first electrode and the tab coupling portion and an extension direction of a welding pattern formed between the beading portion and the contact portion may be perpendicular to each other.

In another aspect of the present disclosure, an innermost point of the beading portion may be located farther inward in a radial direction than a distal point of the crimping portion.

In another aspect of the present disclosure, the sealing gasket may surround the cap, wherein a radial length of a portion of the sealing gasket covering a bottom surface of the cap is less than a radial length of a portion of the sealing gasket covering a top surface of the cap.

In another aspect of the present disclosure, a total radial length of the tab coupling portion T satisfies the following formula:

$$JR-2*F \leq T < JR$$

wherein JR is an outer diameter of the electrode assembly, and F is a height of an outermost segment of the electrode assembly.

In another aspect of the present disclosure, a minimum value of a distance from the innermost point of the beading portion to the central point of the outermost welding bead in the radial direction W1 and a distance from the innermost point of the beading portion to the central point of an outermost welding bead in the radial direction W satisfy the following formula:

$$W1 = R1 + 0.5*W_{bead,min}, \text{ and}$$

$$W = OV - 0.5*W_{bead,min}$$

wherein OV is the overlap length, and R1 is a radius of curvature of the beading portion.

In another aspect of the present disclosure, the beading portion may have a flat section parallel to a bottom surface of the battery housing in at least a region, and when the overlap length is OV and a radius of curvature of the beading portion is R1, a length of the flat section of the beading portion contacting the first current collector may be OV−R1.

Preferably, a width in the radial direction of a welding pattern formed between the beading portion and the contact portion may be equal to or greater than $W_{bead,min}$ and equal to or less than OV−R1.

In another aspect of the present disclosure, a ratio of the width in the radial direction of the welding pattern to a length of the flat section may range from 10% to 40%.

In another aspect of the present disclosure, a ratio of an area where the first current collector does not contact atop surface of the electrode assembly to an area of a circle having an outer diameter of the electrode assembly may be equal to or greater than 30% and less than 100%.

More preferably, a ratio of an area where the first current collector does not contact a top surface of the electrode assembly to an area of a circle having an outer diameter of the electrode assembly may be equal to or greater than 60% and less than 100%.

In another aspect of the present disclosure, a diameter of the circular hole of the first current collector may be less than a diameter of a winding central hole formed in a core of the electrode assembly.

Preferably, a diameter of the circular hole of the first current collector is equal to or greater than 0.5*R3 and less than R3, wherein R3 is a diameter of the winding central hole.

More preferably, a diameter of the circular hole of the first current collector is equal to or greater than 0.7*R3 and less than R3, wherein R3 is a diameter of the winding central hole.

Advantageous Effects

According to the present disclosure, resistance may be greatly reduced in electrical connection between an electrode assembly and a battery housing.

Also, according to the present disclosure, a coupling force of a coupling portion between a current collector and a battery housing may be improved.

In addition, according to the present disclosure, the energy density of a battery may be improved.

Also, according to the present disclosure, when a battery is manufactured, convenience in a welding process for electrical connection between a battery housing and a current collector may be improved, and thus, productivity may be improved.

However, effects obtainable from the present disclosure may be non-limited by the above-mentioned effect. Other unmentioned effects may be clearly understood from the following description by one of ordinary skill in the art to which the present disclosure pertains.

DESCRIPTION OF DRAWINGS

The accompanying drawings illustrate embodiments of the present disclosure and together with the foregoing disclosure, serve to provide further understanding of the technical features of the present disclosure, and thus, the present disclosure is not construed as being limited to the drawing.

FIG. 4b is a view for describing an embodiment where a bending portion is omitted in the current collector of FIG. 4a.

FIG. 8a is a view for describing a welding region between a current collector and a first uncoated portion and a welding region between the current collector and a beading portion of FIG. 4a.

FIG. 13e is a view for describing a change in a current collector after a sizing process according to a shape of the current collector before a sizing process.

DETAILED DESCRIPTION OF THE EMBODIMENTS

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description provided herein are just examples for the purpose of illustrations only, not intended to limit the scope of the disclosure, so it should be understood that other equivalents and modifications could be made thereto without departing from the scope of the disclosure.

In addition, in order to help the understanding of the present disclosure, the accompanying drawings are not drawn to scale, but dimensions of some components may be exaggerated. Also, the same reference signs may be assigned to the same components in different embodiments.

When it is explained that two objects are identical, this means that these objects are 'substantially identical'. Accordingly, the substantially identical objects may include deviations considered low in the art, for example, deviations within 5%. Also, when it is explained that certain parameters are uniform in a certain region, this may mean that the parameters are uniform in terms of an average.

Figure 1A:
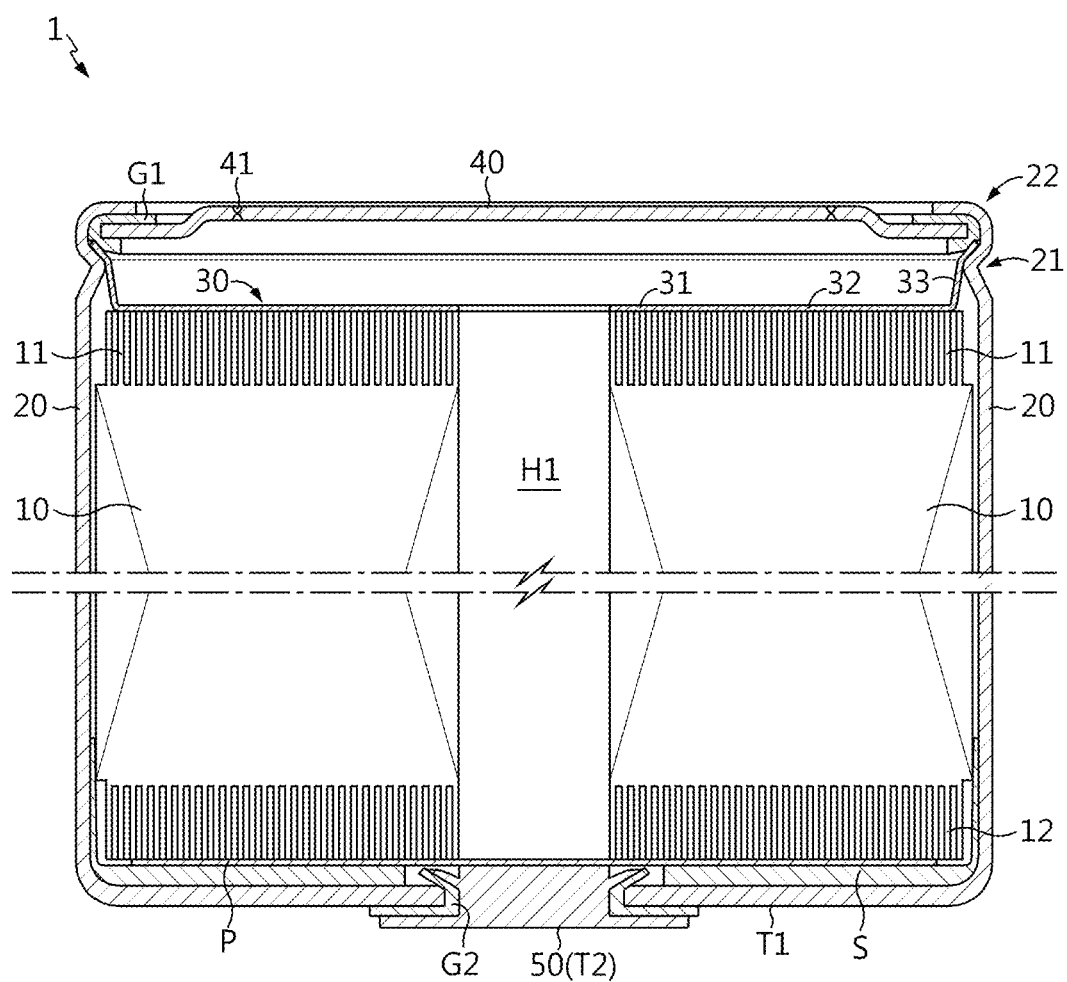
FIG. 1a is a longitudinal sectional view illustrating a part of a battery, according to an embodiment of the present disclosure.

Referring to FIG. 1a, a battery 1 according to an embodiment of the present disclosure includes an electrode assembly 10, a battery housing 20, a current collector (first current collector) 30, and a cap 40. The battery 1 may further include a terminal 50 and/or a sealing gasket G1 and/or an insulating gasket G2 and/or a current collector (second current collector) P and/or an insulator S. The terminal 50 may be provided opposite to an opening portion, and may be electrically connected to a second uncoated portion 12.

The electrode assembly 10 includes a first uncoated portion 11 and the second uncoated portion 12. In more detail, the electrode assembly may be manufactured by winding a stack formed by sequentially stacking a first electrode, a separator, a second electrode, and a separator at least once. That is, the electrode assembly 10 applied to the present disclosure may be a rolled electrode assembly. In this case, an additional separator may be provided on an outer circumferential surface of the electrode assembly 10 for insulating from the battery housing 20. The electrode assembly 10 may have a rolled structure well known in the related art without limitation.

The electrode assembly 10 may be a rolled electrode assembly having a structure in which a first electrode current collector and a second electrode current collector each having a sheet shape and a separator located between the first and second electrode current collectors are wound in one direction. The first electrode may include the first uncoated portion 11 that is not coated with an active material layer and is exposed to the outside of the separator at a long side end thereof. The second electrode may include the second uncoated portion 12 that is not coated with an active material layer and is exposed to the outside of the separator at a long side end thereof. At least a part of the first uncoated portion 11 may be used as an electrode tab by itself. At least a part of the second uncoated portion 12 itself may be used as an electrode tab by itself.

In detail, the first electrode includes a first electrode current collector and a first electrode active material coated on one surface or both surfaces of the first electrode current collector. An uncoated portion on which the first electrode active material is not coated exists at one end in a width direction of the first electrode current collector (direction parallel to a height direction of the battery 1 of FIG. 1a). The uncoated portion functions as a first electrode tab. The first uncoated portion 11 is provided in an upper portion of the electrode assembly 10 accommodated in the battery housing 20 in a height direction (direction parallel to a height direction of the battery 1 of FIG. 1a). The first uncoated portion 11 may be, for example, a negative electrode tab.

The second electrode includes a second electrode current collector and a second electrode active material coated on one surface or both surfaces of the electrode current collector. An uncoated portion on which the second electrode active material is not coated exists at the other end in a width direction of the second electrode current collector (direction parallel to the height direction of the battery 1 of FIG. 1a). The uncoated portion functions as a second electrode tab. The second uncoated portion 12 is provided on a lower portion in a height direction of the electrode assembly 10 accommodated in the battery housing 20. The second uncoated portion 12 may be, for example, a positive electrode tab.

In the present disclosure, a positive electrode active material coated on a positive electrode plate and a negative electrode active material coated on a negative electrode plate may be any type of active material, provided that the active material is well known in the art.

In an example, the positive active electrode active material may include an alkali metal compound expressed by a general chemical formula $A[A_xM_y]O_{2+z}$ (A includes at least one of Li, Na, and K; M includes at least one element selected from Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; and stoichiometric coefficients x, y, and z are selected so that the compound remains electrically neutral).

In another embodiment, the positive electrode active material may be an alkali metal compound $xLiM^1O_2(1x)Li_2M^2O_3$ ($M^1$ includes at least one element having an average oxide state of 3; $M^2$ includes at least one element having an average oxidation state of 4; and $0 \leq x \leq 1$) disclosed in U.S. Pat. Nos. 6,677,082, 6,680,143, etc.

In another example, the positive electrode active material may be lithium metal phosphate expressed by a general chemical formula $Li_aM^1{}_xFe_{1-x}M^2{}_yP_{1-y}M^3{}_zO_{4-z}$ ($M^1$ includes at least one element selected from Ti, Si, Mn, Co, Fe, V, Cr, Mo, Ni, Nd, Al, Mg, and Al; $M^2$ includes at least one element selected from Ti, Si, Mn, Co, Fe, V, Cr, Mo, Ni, Nd, Al, Mg, Al, As, Sb, Si, Ge, V, and S; $M^3$ includes an element of a halogen group selectively containing F; $0<a \leq 2$, $0 \leq x \leq 1$, $0 \leq y<1$, $0 \leq z<1$; and stoichiometric coefficients a, x, y, and z are selected so that the compound remains electrically neutral), or $Li_3M_2(PO_4)_3$ [M includes at least one element selected from Ti, Si, Mn, Fe, Co, V, Cr, Mo, Ni, Al, Mg, and Al].

Preferably, the positive electrode active material may include primary particles and/or secondary particles in which the primary particles are aggregated.

In an example, the negative electrode active material may use a carbon material, lithium metal or lithium metal compounds, silicon or silicon compounds, tin or tin compounds, etc. Metal oxide such as $TiO_2$ or $SnO_2$ having a potential of less than 2 V may be also used as the negative electrode active material. As the carbon material, low crystalline carbon and high crystalline carbon may be used.

The separator may include a porous polymer film, for example, made of a polyolefin-based polymer such as an ethylene homopolymer, a propylene homopolymer, an ethylene/butene copolymer, an ethylene/hexene copolymer, or an ethylene/methacrylate copolymer, in a single or stack structure thereof. In another example, the separator may be a common porous non-woven fabric, for example, a non-woven fabric made of glass fiber having a high melt point or polyethylene terephthalate fiber.

At least one surface of the separator may include a coating layer of inorganic particles. Otherwise, the separator itself may be made of a coating layer of inorganic particles. The inorganic particles included in the coating layer may be coupled to a binder so that an interstitial volume exists between adjacent inorganic particles.

The inorganic particles may include an inorganic material having a dielectric constant of 5 or more. In a non-limiting example, the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3-PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO, and $Y_2O_3$.

An electrolyte may be a salt having a structure such as $A^+B^-$. Here, $A^+$ includes an alkali metal cation such as $Li^+$, $Na^+$, or $K^+$ or a combination thereof. In addition, $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^{--}$, $BC_4O_8^{--}$, $(CF_3)_2PF_4^{--}$, $(CF_3)_3PF_3^{--}$, $(CF_3)_4PF_2^{--}$, $(CF_3)_5PF^{--}$, $(CF_3)_6P^{--}$, $CF_3SO_3^{--}$, $C_4F_9SO_3^{--}$, $CF_3CF_2SO_3^{--}$, $(CF_3SO_2)_2N^{--}$, $(FSO_2)_2N^{--}$, $CF_3CF_2(CF_3)_2CO^{--}$, $(CF_3SO_2)_2CH^{--}$, $(SF_5)_3C^{--}$, $(CF_3SO_2)_3C^{--}$, $CF_3(CF_2)_7SO_3^{--}$, $CF_3CO_2^{--}$, $CH_3CO_2^{--}$, $SCN^{--}$, and $(CF_3CF_2SO_2)_2N^{--}$.

The electrolyte may also be dissolved in an organic solvent. The organic solvent may use propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The battery housing 20 is a receiving body of a substantially cylindrical shape having an opening portion at one side thereof, and includes a metal material having conductivity. A side surface of the battery housing 20 and a bottom surface of the battery housing 20, opposite to the opening portion, are generally integrally formed with each other.

That is, the battery housing 20 is generally formed so that an upper end in a height direction is opened and a lower end except for a central portion is closed. The bottom surface of the battery housing 20 may have a substantially flat shape. The battery housing 20 may receive the electrode assembly 10 through the opening portion formed at one side in the height direction thereof. The battery housing 20 may also receive the electrolyte through the opening portion.

The battery housing 20 may include a beading portion 21 that is formed on an end portion adjacent to the opening portion and is press-fitted inward. The battery housing 20 may include a crimping portion 22 that is formed at a position between the opening portion and the beading portion 21 and extends and is bent toward the opening portion.

In detail, the battery housing 20 may include the beading portion 21 formed on an upper end portion thereof. The battery housing 20 may further include the crimping portion 22 formed above the beading portion 21. The beading portion 21 is formed by press-fitting an outer circumference of the battery housing 20 to a certain depth. The beading portion 21 is formed over the electrode assembly 10. An inner diameter of the battery housing 20 at a region where the beading portion 21 is formed is less than a diameter of the electrode assembly 10.

Figure 2:
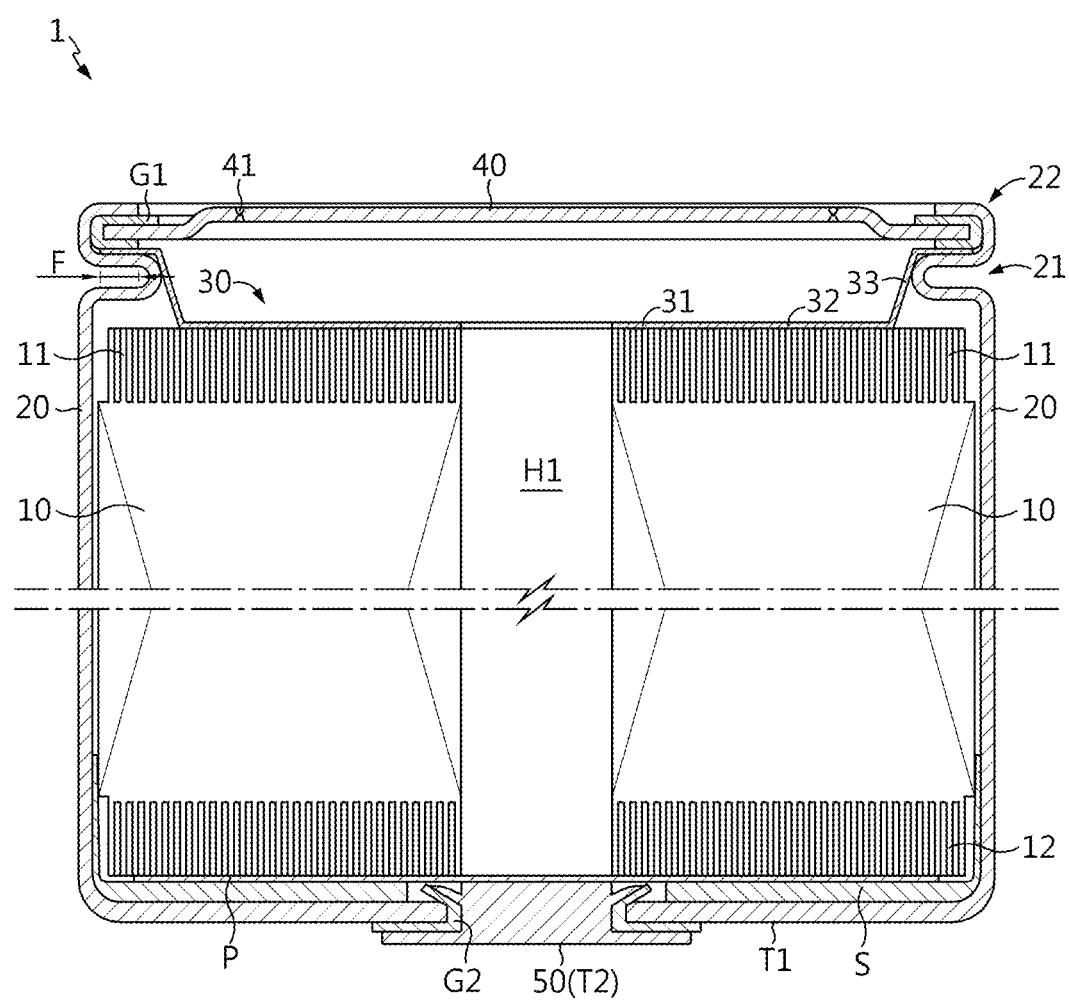
FIG. 2 is a longitudinal sectional view illustrating a part of a battery, according to another embodiment of the present disclosure.
Figure 3:
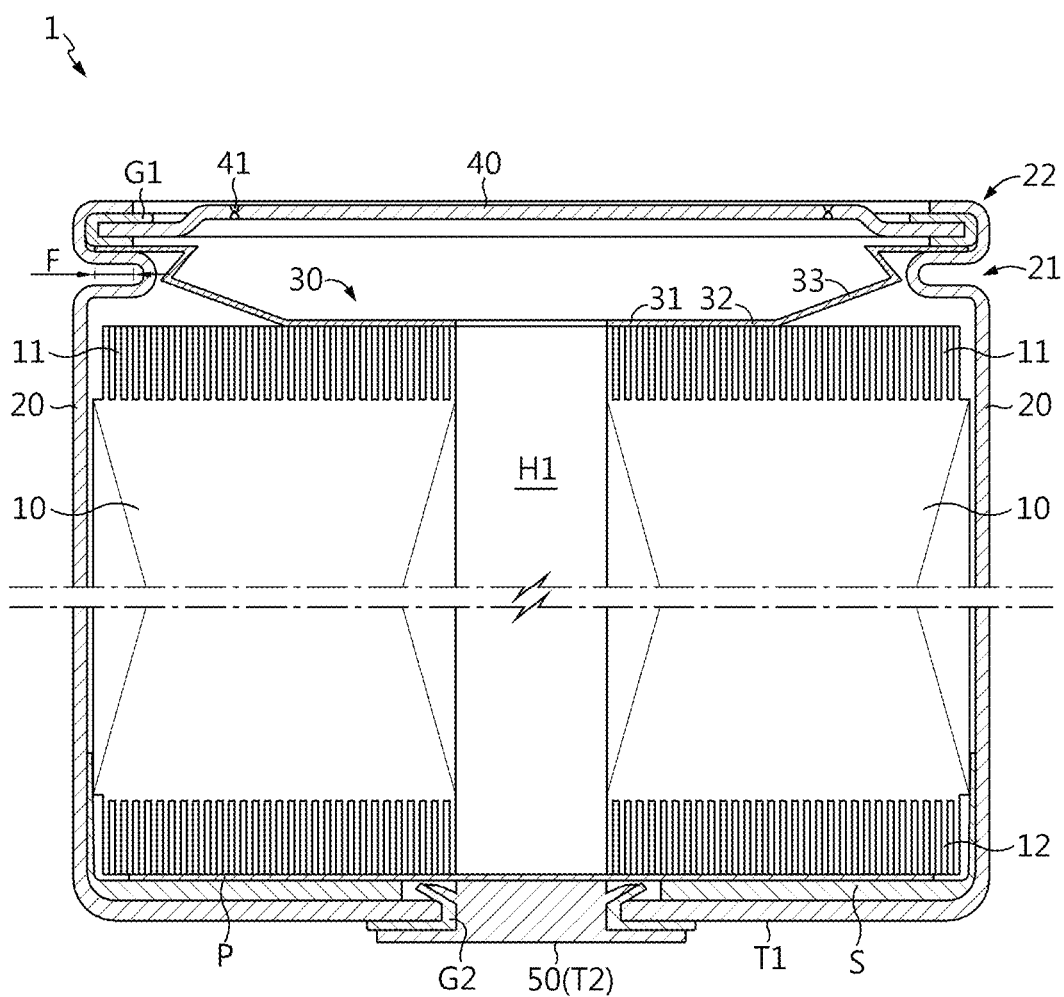
FIG. 3 is a longitudinal sectional view illustrating a part of a battery, according to another embodiment of the present disclosure.

The beading portion 21 provides a support surface on which the cap 40 may be mounted. Also, the beading portion 21 may provide a support surface on which at least a part of a circumferential edge of the current collector 30 described below may be mounted and coupled. That is, on a top surface of the beading portion 21, at least a part of a circumferential edge of the current collector 30 of the present disclosure and/or a circumferential edge of the cap 40 of the present disclosure may be mounted. As shown in FIGS. 2 and 3, in order to stably support at least a part of the circumferential edge of the current collector 30 and/or the circumferential edge of the cap 40, at least a part of the top surface of the beading portion 21 may extend in a direction substantially parallel to the bottom surface of the battery housing 20, that is, a direction substantially perpendicular to a sidewall of the battery housing 20.

The beading portion 21 may include a beading portion top surface located over an innermost point that is press-fitted inward; and a beading portion bottom surface located under the innermost point that is press-fitted inward.

For example, a press-fitting depth PD of the beading portion 21 may range from about 0.2 mm to about 10 mm. For a minimum value of the press-fitting depth PD of the beading portion 21, a radius of curvature R1 of the beading portion 21, a welding bead width $W_{bead}$, and a radius of curvature R2 at a boundary region between the beading portion 21 and an inner surface of the battery housing 20 should be considered together. For example, referring to FIG. 11, in order to enable welding, an additional space in addition to the radius of curvature R1 of the beading portion 21 and the radius of curvature R2 at the boundary region between the beading portion 21 and the inner surface of the battery housing 20 is required. This is because, when the press-fitting depth PD is R1+R2, a flat section F does not exist in the beading portion. Furthermore, in order to enable welding, an additionally required space should be equal to or greater than a minimum width $W_{bead,min}$ of a welding bead BD. Accordingly, the minimum value of the press-fitting depth PD satisfies the following relation.

$$PD \geq R_{1,min} + R_{2,min} + W_{bead,min}$$

For example, minimum values of $R_{1,min}$ and $R_{2,min}$ may each be about 0.05 mm, and $W_{bead,min}$ may be about 0.1 mm. In this case, the minimum value of the press-fitting depth PD may be equal to or greater than about 0.2 mm.

In another aspect, a maximum value of the press-fitting depth PD of the beading portion 21 may vary according to a material and a thickness of the battery housing 20. In an example, when a material of the battery housing 20 is a steel material and a maximum thickness of the battery housing 20 is about 1 mm, the maximum value of the press-fitting depth PD of the beading portion 21 may be about 10 mm. Accordingly, in an embodiment, the press-fitting depth PD of the beading portion 21 may have a value between about 0.2 mm and about 10 mm.

In another aspect of the present disclosure, as shown in FIG. 1a, at least one of the beading portion top surface and the beading portion bottom surface may be inclined at a certain angle with respect to the bottom surface of the battery housing 20. Alternatively, as shown in FIGS. 2 and 3, at least one of the beading portion top surface and the beading portion bottom surface may include a section parallel to the bottom surface of the battery housing 20 in at least a region. That is, the beading portion top surface and the beading portion bottom surface may include the flat section F (see FIG. 3) in at least a part.

The crimping portion 22 is formed over the beading portion 21. The crimping portion 22 extends and is bent to surround a circumferential edge of the cap 40 located over the beading portion 21. Due to this bent shape of the crimping portion 22, the cap 40 is fixed to the beading portion 21.

In another aspect, an innermost point of the beading portion 21 may be located more inside in a radial direction than a distal point of the crimping portion 22. For example, referring to FIG. 2, the distal point of the crimping portion 22 may be located more outside in the radial direction than the innermost point of the beading portion 21. According to this structure, the flat beading portion 21 may be maintained even after a sizing process. For example, if the innermost point of the beading portion 21 is located more outside in the radial direction than the distal point of the crimping portion 22, a radial length of a top surface of the crimping portion 22 would be greater than a radial length of the beading portion 21. In this case, the area of the top surface of the crimping portion 22 to which pressure is applied in the sizing process may be increased, and thus, the beading portion 21 may not be flat after the sizing process. Accordingly, in the present disclosure, it is preferable that the innermost point of the beading portion 21 is located more inside than a distal end of the crimping portion 22 in the radial direction.

Also, the crimping portion 22 may be omitted, and the cap 40 may be fixed while covering the opening portion of the battery housing 20 through another fixing structure. For example, a battery in which a beading portion is omitted is disclosed in Patent Application Publication No. KR 10-2019-0030016 A of the present applicant, which is herein incorporated by reference, and such a structure may be applied to the present disclosure.

The current collector (first current collector) 30 according to an embodiment of the present disclosure will now be described with reference to FIGS. 3 and 4a.

First, referring to FIG. 3, the current collector 30 according to an embodiment of the present disclosure is accommodated in the battery housing 20, and is electrically connected to the electrode assembly 10 and is also electrically connected to the battery housing 20. That is, the current collector 30 electrically connects the electrode assembly 10 to the battery housing 20. Preferably, the current collector 30 may be electrically coupled to the first uncoated portion 11 and the beading portion 21 of the battery housing 20. At least one tab coupling portion 32 of the current collector 30 may be located at a lower position than the beading portion bottom surface.

The current collector 30 includes the tab coupling portion 32 coupled to the first uncoated portion 11, and a housing coupling portion 33 extending from the tab coupling portion 32 and electrically coupled to the beading portion 21 on an inner surface of the battery housing 20. A boundary region between the tab coupling portion 32 and the housing coupling portion 33 may be bent so that an end portion of the housing coupling portion 33 faces the beading portion 21. That is, referring to FIG. 2 or the like, the boundary region between the tab coupling portion 32 and the housing coupling portion 33 may be bent upward.

Optionally, the current collector 30 may further include a central portion 31, in a core region of the current collector 30. The central portion 31 may have a substantially circular shape. The central portion 31 may be selectively coupled to the first uncoated portion 11. In this case, the housing coupling portion 33 may be press-fixed by the crimping portion 22.

The current collector 30 may have at least one leg structure extending in the radial direction in a state where the tab coupling portion 32 and the housing coupling portion 33 are connected to each other. Preferably, a plurality of leg structures may be provided. For example, referring to FIGS. 4a through 6, the current collector 30 may include four leg structures. When a plurality of leg structures are provided, a plurality of housing coupling portions 33 may also be provided. In this case, the plurality of housing coupling portions 33 may be connected to one another and may be integrally formed. The leg structures may be arranged in a radial shape, a cross shape, or a combined shape about the central portion 31.

The central portion 31 and at least one tab coupling portion 32 may be located over the electrode assembly 10, and when the beading portion 21 is formed on the battery housing 20, the central portion 31 and the at least one tab coupling portion 32 may be located under the beading portion 21. One or more holes for injecting an electrolytic solution may be formed in the tab coupling portion 32.

When a total radial length of the tab coupling portion 32 is T, an outer diameter of the electrode assembly 10 is JR, and a height of an outermost segment 11a of the electrode assembly is F, the following relation may be satisfied.

$$JR-2*F \leq T < JR$$

Preferably, the total radial length T of the tab coupling portion 32 may be equal to or greater than a length obtained by subtracting the height of the segment 11a located at the outermost side from the outer diameter of the electrode assembly 10 twice. When the relation is satisfied, the tab coupling portion 32 covers an end portion of the segment 11a located at the outermost side. That is, the current collector 30 may have an outer diameter covering an end portion of the segment 11a that is bent at a last winding turn of the first electrode. In this case, welding may be performed in a state where the segments 11a that form a bent surface 102 coupled to the tab coupling portion 32 are uniformly pressed by the current collector 30, and even after the welding, a close stacked state of the segments 11a may be maintained well. The close stacked state refers to a state where there is substantially no gap between the segments as shown in FIG. 1c. The close stacked state contributes to lower the resistance of the battery 1 to a level suitable for rapid charging (e.g., 4 mohm) or less.

In another aspect, the total radial length T of the tab coupling portion 32 may be less than an outer diameter JR of the electrode assembly 10. If the total radial length T of the tab coupling portion 32 is greater than the outer diameter JR of the electrode assembly 10, a dead space in the battery housing 20 may be increased, thereby adversely affecting the energy density of the battery 1. Accordingly, it is preferable that the total radial length T is less than the outer diameter JR of the electrode assembly 10.

The central portion 31 includes a circular current collector hole H2 formed at a position corresponding to a winding central hole H1 formed at a central portion of the electrode assembly 10. The winding central hole H1 and the current collector hole H2 communicating with each other may function as paths for irradiating a laser welding beam or inserting a welding rod for welding between the terminal 50 and the current collector (second current collector) P or welding between the terminal 50 and a lead tabor paths for irradiating a laser welding beam.

Figure 7:
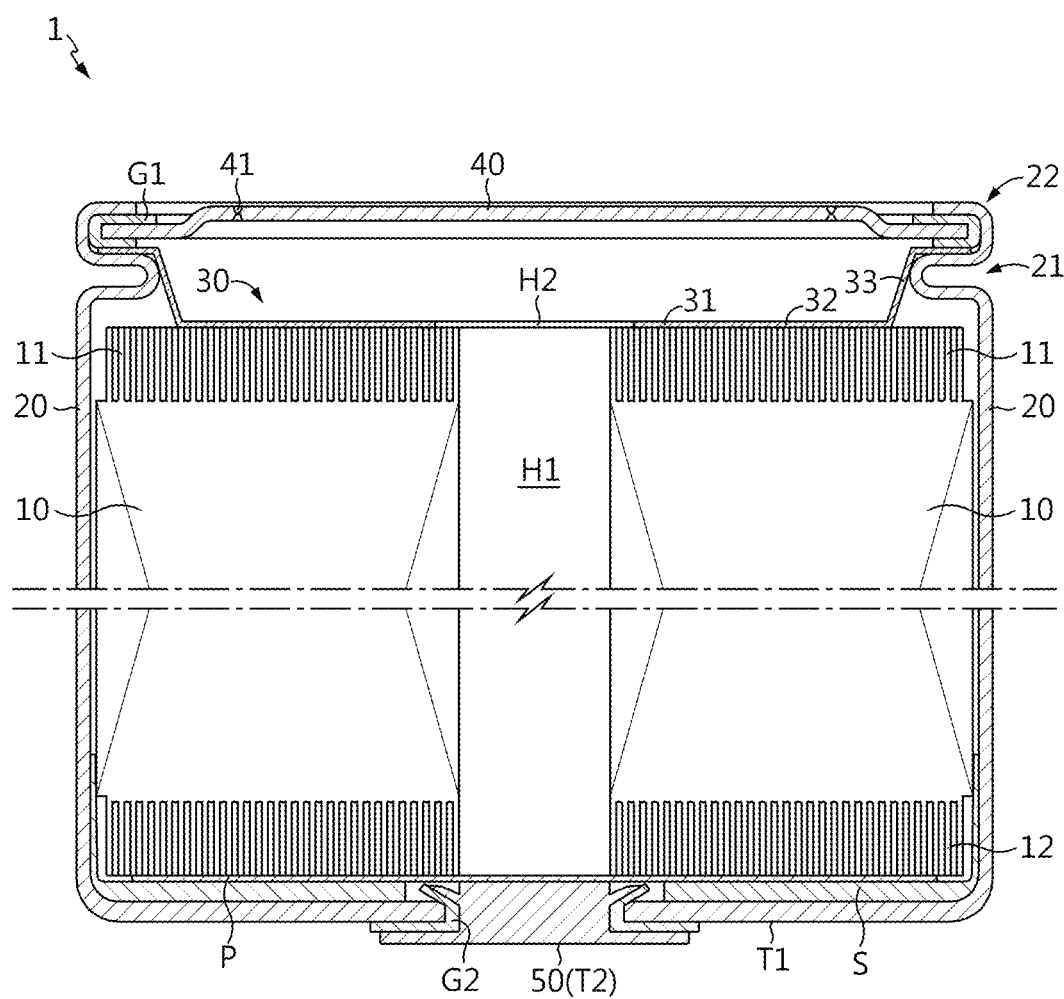
FIG. 7 is a view for describing a relationship between a current collector hole and a winding hole.

FIG. 7 is a view for describing a relationship between a current collector hole and a winding hole.

Referring to FIG. 7, a diameter of the current collector hole H2 may be equal to or greater than a diameter of the winding central hole H1 formed in a core of the electrode assembly 10. For example, the reason why the diameter of the current collector hole H2 is set to be greater than the diameter of the winding central hole H1 formed in the core of the electrode assembly 10 is that it is necessary to secure a space according to the insertion of a welding guide, when the laser welding beam is irradiated or the welding rod is inserted for welding between the terminal 50 and the current collector (second current collector) P or welding between the terminal 50 and the lead tab. When the diameter of the current collector hole H2 is excessively less than the diameter of the winding central hole H1, the winding central hole H1 may be covered and may act as an interference factor during continuous resistance welding (CRW).

Unlike the embodiment, according to another embodiment of the present disclosure, the diameter of the current collector H2 may be less than the diameter of the winding central hole H1 formed in the core of the electrode assembly 10. For example, when the diameter of the winding central hole H1 is R3, the diameter of the current collector hole H2 may be equal to or greater than 0.5*R3 and less than R3, and preferably, may be equal to or greater than 0.7*R3 and less than R3.

In general, when gas is discharged from a winding central portion during venting, due to strong pressure, a separator or an uncoated portion at the center of winding may be separated from a top surface of the electrode assembly 10. In this case, when the diameter of the current collector hole H2 is less than the diameter of the winding central hole H1 formed in the core of the electrode assembly 10, the separator or the uncoated portion at the center of winding may be prevented from being separated from the top surface of the electrode assembly 10. However, when the diameter of the current collector hole H2 is excessively small, the injection of an electrolytic solution may be degraded, and a space for welding between the second current collector P and the terminal 50 is required, and thus, it is preferable that the diameter of the current collector hole H2 is equal to or greater than 0.5*R3 and it is more preferable that the diameter of the current collector hole H2 is equal to or greater than 0.7*R3.

In another aspect, the central portion 31 may have a substantially circular plate shape. For example, referring to FIG. 4a, the central portion 31 may have an annular plate shape at the center of which the current collector hole H2 is formed.

The at least one tab coupling portion 32 may extend substantially radially from the central portion 31 of the current collector 30 to a sidewall of the battery housing 20. For example, a plurality of tab coupling portions 32 may be provided. For example, referring to FIG. 4a, the plurality of tab coupling portions 32 may be spaced apart from one another along a circumference of the central portion 31. As such, because the battery 1 of the present disclosure includes the plurality of tab coupling portions 32, a coupling area with the first uncoated portion 11 may be increased. Accordingly, a coupling force between the first uncoated portion 11 and the tab coupling portion 32 may be secured and electrical resistance may be reduced.

The tab coupling portion 32 may be welded to the first uncoated portion 11. Examples of a welding method include, but are not limited to, laser welding, resistance welding, and ultrasonic welding. The tab coupling portion 32 may be welded to the first uncoated portion 11 while being parallel to the bottom surface of the battery housing 20. The first uncoated portion 11 and the tab coupling portion 32 may be welded in the radial direction of the electrode assembly 10.

Figure 1B:
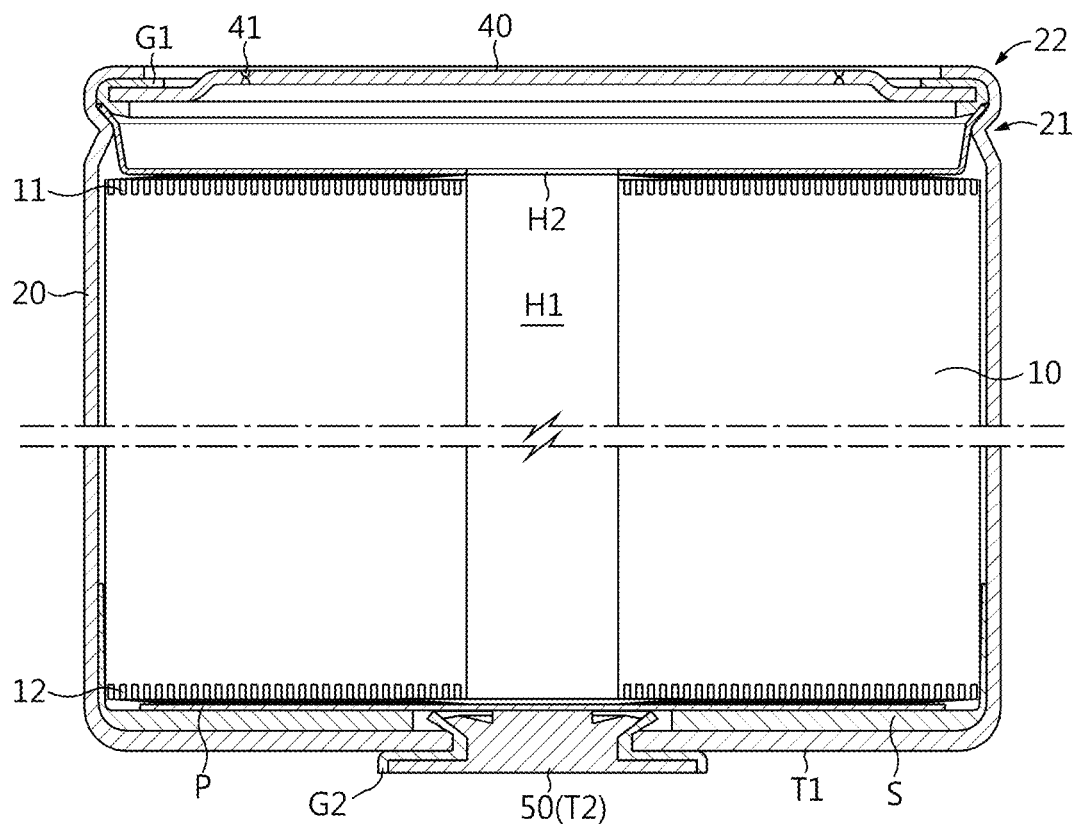
FIG. 1b is a longitudinal sectional view illustrating a part of a battery, according to another embodiment of the present disclosure.
Figure 1C:
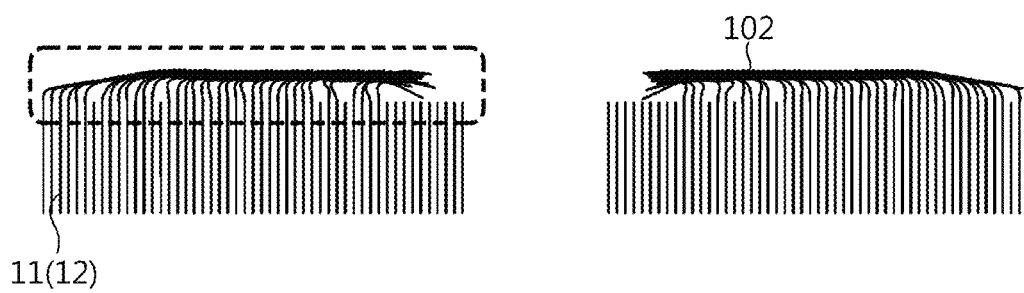
FIG. 1c is an enlarged view illustrating an upper portion of an electrode assembly of FIG. 1b.
Figure 1D:
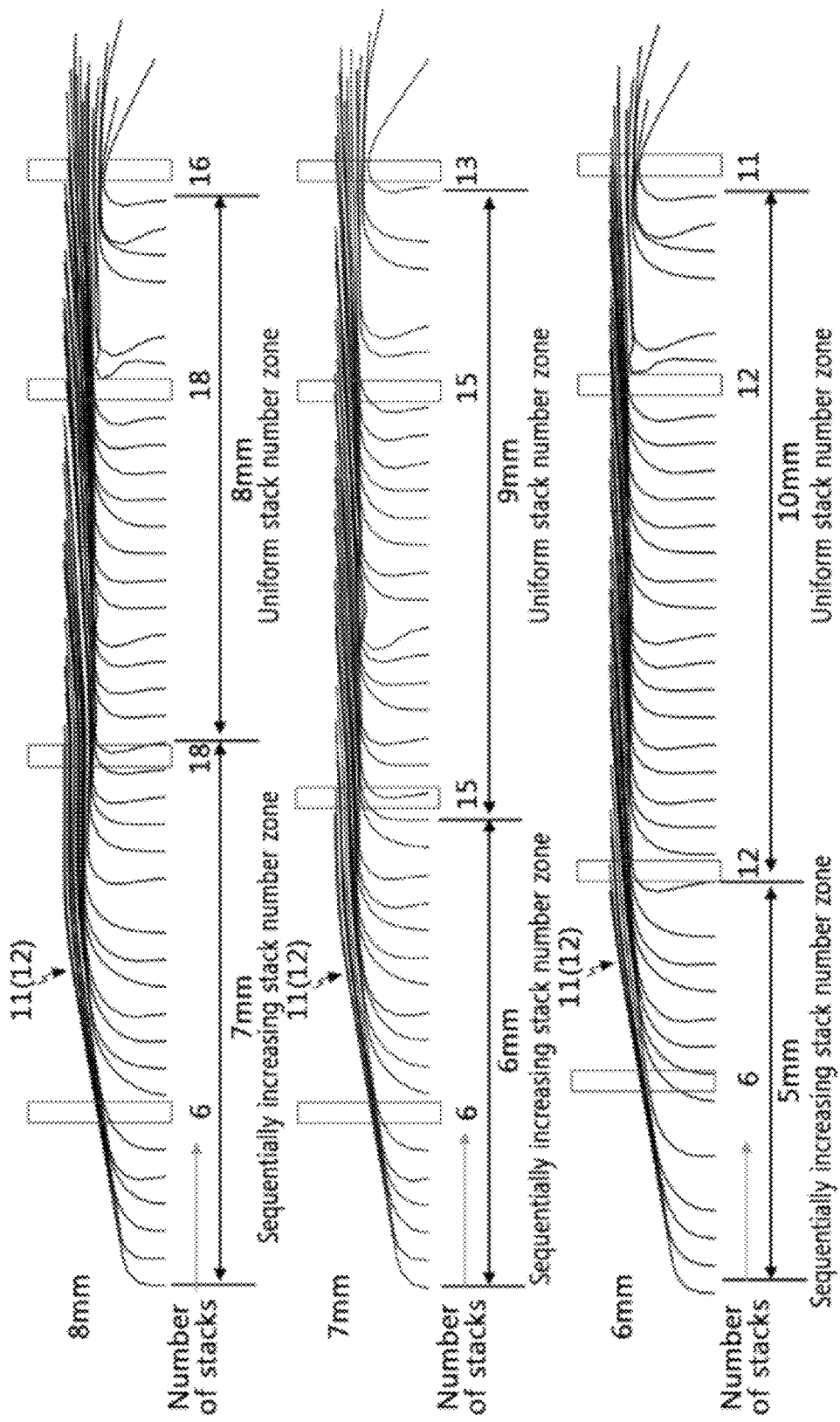
FIG. 1d is an enlarged view illustrating an upper portion of a first uncoated portion of FIG. 1c.

FIG. 1b is a longitudinal sectional view illustrating a part of a battery, according to another embodiment of the present disclosure. FIG. 1c is an enlarged view illustrating an upper portion of the electrode assembly 10 of FIG. 1b. FIG. 1d is an enlarged view illustrating an upper portion of the first uncoated portion 11 of FIG. 1c.

Referring to FIG. 1b, in a state where the tab coupling portion 32 is mounted on an end portion of the first uncoated portion 11, welding may be performed on a certain region. Alternatively, at least a part of the first uncoated portion 11 may include a plurality of segments 11a in a winding direction of the electrode assembly 10. The plurality of segments 11a may be bent in a radial direction of the electrode assembly 10 to form the bent surface 102. The radial direction of the electrode assembly refers to a direction toward a core or an outer circumference. For example, as shown in FIG. 1b, at least a part of the first uncoated portion 11 may include a plurality of segments 11a divided in the winding direction of the electrode assembly 10. The plurality of segments 11a may be bent toward the core of the electrode assembly 10. Referring to FIGS. 1c and 1d, the plurality of segments 11a may overlap in multiple layers in the radial direction of the electrode assembly 10. The bent surface 102 may include a stack number increasing section in which the number of overlapping layers of the segments 11a is sequentially increased to a maximum value from the outer circumference of the electrode assembly 10 to the core and a stack number uniform section from a radius point at which the number of overlapping layers is the maximum value to a radius point at which an innermost segment exists.

In this case, in a state where the tab coupling portion 32 is mounted on the bent surface 102 of the first uncoated portion 11, welding may be performed on a certain region. That is, the tab coupling portion 32 may be coupled to a region where the plurality of segments 11a overlap in multiple layers. For example, the tab coupling portion 32 may be coupled to the bent surface to overlap the stack number uniform section. Referring to FIG. 1d, welding between the tab coupling portion 32 and the first uncoated portion 11 may be performed on a region of the bent surface 102 of the first uncoated portion 11 where the number of overlapping layers of the first uncoated portion 11 is 10 or more. A radial ratio of a section in which the number of overlapping layers is 10 or more may be designed to be 25% or more based on a radius of the electrode assembly excluding the core, by adjusting a length of the first uncoated portion 11.

When the current collector 30 is welded to the bent surface 102 of the first uncoated portion 11, it is preferable to increase an output of a laser in order to sufficiently secure welding strength. When the output of the laser is increased, the laser may pass through a region where the first uncoated portion 11 overlaps and may penetrate into the electrode assembly 10, thereby damaging the separator or the active material layer. Accordingly, in order to prevent penetration of the laser, it is preferable to increase the number of overlapping layers of the first uncoated portion 11 to a certain level or more. In order to increase the number of overlapping layers of the first uncoated portion 11, a height of the segment 11a should be increased. However, when the height of the segment 11a is increased, a swell may occur in the first uncoated portion 11 in a process of manufacturing the first electrode current collector. Accordingly, it is preferable that the height of the segment 11a is adjusted to an appropriate level.

As described above, when a radial length ratio of the segment of the uncoated portion in which the number of overlapping layers is 10 or more is designed to be 25% or more based on a radius of the electrode assembly and the current collector 30 and a region where the segment of the uncoated portion overlaps in 10 or more layers are laser welded, even when an output of a laser is increased, the overlapping portion of the uncoated portion may sufficiently mask the laser, thereby preventing damage to the separator and the active material layer due to the laser.

Preferably, the output of the laser may be appropriately adjusted in a range of about 250 W to about 320 W or in a range of about 40% to about 90% of a maximum laser output specification, but the present disclosure is not limited thereto. When the output of the laser satisfies the numerical range, welding strength may be sufficiently increased. In an embodiment, welding strength may be increased to be 2 kgf/cm$^2$ or more, and more particularly, to 4 kgf/cm$^2$ or more. The welding strength may be set to 8 kgf/cm$^2$ or less, and more particularly, set to 6 kgf/cm$^2$ or less. The welding strength is defined as a tensile force per unit area (kgf/cm$^2$) of the current collector 30 when the current collector begins to be separated from the bent surface region. In detail, a tensile force is applied to the current collector after welding of the current collector is completed, and a magnitude thereof is gradually increased. When the tensile force is increased, the uncoated portion begins to be separated from a welding interface. In this case, a value obtained by dividing the tensile force applied to the current collector by the area of the current collector is the welding strength.

FIG. 1d is a partial cross-sectional view illustrating a bent surface region where, in an electrode assembly having a radius of 22 mm and a core radius of 4 mm and included in a battery having a form factor of 4680, the first uncoated portion 11 of the first electrode current collector divided into a plurality of segments is bent from an outer circumference to a core to overlap in 10 or more layers. In FIG. 1d, an electrode assembly region and a core region with no segments are not shown. A height of the segments starts from 3 mm and is increased by 1 mm whenever a radius of the electrode assembly is increased by 1 mm. After reaching a length 6 mm, 7 mm, or 8 mm in FIG. 1d, the height of the segments remains substantially the same.

Referring to FIG. 1d it is found that the number of overlapping layers of the first uncoated portion 11 is gradually increased from the outer circumference to the core, and as the length of the first uncoated portion 11 is increased, a maximum value of the number of overlapping layers is increased.

For example, when the length of the first uncoated portion 11 is 8 mm, the number of overlapping layers of the first uncoated portion 11 divided into a plurality of segments is increased to 18 in an interval from the outer circumference to 7 mm, is maintained at the maximum value of 18 in an interval further 8 mm toward the core, and is reduced by 1 or 2 in a radius interval adjacent to the core. The height of the segment is increased stepwise from 3 mm to 8 mm in a radius interval from 7 mm to 12 mm. In the present disclosure, the stack number uniform section is defined as a radius interval from a radius point at which the number of overlapping layers reaches a maximum value to a point at which an innermost segment is located as shown in FIG. 1d. Accordingly, a ratio of the stack number uniform section in which the segments 11a of the first uncoated portion 11 overlap in 10 or more layers is 44.4% (8/18) with respect to the radius of the electrode assembly excluding the core (4 mm).

In another example, when the length of the first uncoated portion 11 is 7 mm, the number of overlapping layers of the first uncoated portion 11 divided into a plurality of segments is increased to 15 in an interval from the outer circumference of the electrode assembly to 6 mm, is maintained at the maximum value of 15 in an interval further 9 mm toward the core, and is reduced by 1 or 2 in a radius interval adjacent to the core. The height of the segment is increased stepwise from 3 mm to 7 mm in a radius interval from 7 mm to 11 mm. Accordingly, a ratio of the stack number uniform section in which the segments 11a of the first uncoated portion 11 overlap in 10 or more layers is 50% (9/18) with respect to the radius of the electrode assembly excluding the core (4 mm).

In another example, when the length of the first uncoated portion 11 is 6 mm, the number of overlapping layers of the first uncoated portion 11 divided into a plurality of segments is increased to 12 in an interval from the outer circumference of the electrode assembly to 5 mm, is maintained at the maximum value of 12 in an interval further 10 mm toward the core, and is reduced by 1 or 2 in a radius interval adjacent to the core. The height of the segment is increased from 3 mm to 6 mm in a radius interval from 7 mm to 10 mm. Accordingly, a ratio of the stack number uniform section in which the segments 11a of the first uncoated portion 11 overlap in 10 or more layers is 55.6% (10/18) with respect to the radius of the electrode assembly excluding the core (4 mm).

According to an embodiment, it is found that a length of a section in which the number of overlapping layers is sequentially increased is increased from 5 mm to 7 mm as a length of the first uncoated portion 11 is increased, and in particular, a condition that a ratio of the stack number uniform section in which the number of overlapping layers is 10 or more is 25% or more based on a radius of an electrode assembly excluding a core is satisfied.

In the present disclosure, the stack number uniform section may be increased or decreased by a radius of the core, a minimum value and a maximum value of a height of the segment in a segment height variable interval, and a height increment of the segment in a radial direction of the electrode assembly. Accordingly, it is obvious to one of ordinary skill in the art that the ratio is designed to be 25% or more by adjusting factors affecting the ratio of the stack number uniform section. In an example, when both the minimum value and the maximum value of the height of the segment are increased in the segment height variable interval, the number of stacked layers may be increased and the ratio of the stack number uniform section may be reduced to about 25%.

The stack number uniform section is a region where a current collector may be welded. Accordingly, when the ratio of the stack number uniform section is adjusted to be 25% or more, the welding strength of the current collector may be secured within a desirable range and it may be advantageous in terms of the resistance of a welding interface.

In another aspect of the present disclosure, when the first uncoated portion 11 has such a bent shape, a space occupied by the first uncoated portion 11 may be reduced, thereby improving energy density. Also, because a coupling area between the first uncoated portion 11 and the current collector 30 is increased, a coupling force may be improved and resistance may be reduced.

FIGS. 8a through 10 are views for describing a welding region between the current collector 30 and the first uncoated portion 11.

Referring to FIGS. 8a through 10, a welding bead BD may be formed in a welding region between the first uncoated portion 11 and the tab coupling portion 32. The welding bead BD refers to a substantially circular welding portion formed when spot welding is performed at a specific point. For example, in FIG. 11, the welding bead BD having a substantially circular shape formed as a result of spot welding is illustrated. When a plurality of welding beads BD are connected, a specific welding pattern may be formed. For example, referring to FIG. 8a, the plurality of welding beads BD may be gathered to form a substantially linear welding pattern. In an embodiment, the plurality of welding beads BD formed between the first uncoated portion 11 and the tab coupling portion 32 may form a welding pattern extending in a radial direction of the electrode assembly 10. Preferably, the welding beads BD formed between the first uncoated portion 11 and the tab coupling portion 32 may form a linear welding pattern extending in the radial direction of the electrode assembly 10. For example, a welding pattern formed between the first uncoated portion 11 and the tab coupling portion 32 may have a linear shape in which spot welding is connected. A width of the welding bead BD formed between the first uncoated portion 11 and the tab coupling portion 32 may be equal to or greater than about 0.1 mm. This is because, when laser technology is considered, a minimum width of the welding bead BD is equal to or greater than about 0.1 mm.

A longitudinal end portion of the tab coupling portion 32 may be located more inside than an innermost point of the beading portion 21 formed on the battery housing 20. In more detail, a boundary region between the tab coupling portion 32 and the housing coupling portion 33 may be located more inside in a direction toward the winding central hole H1 than the innermost point of the beading portion 21 formed on the battery housing 20. According to this structure, damage to a coupling portion between components which may occur when the current collector 30 is excessively bent in order to locate an end portion of the housing coupling portion 33 on the beading portion 21 may be prevented. In other words, when viewed along a longitudinal axis of the battery housing 20, the at least one tab coupling portion 32 may not overlap the beading portion 21.

In order to secure a coupling force and reduce electrical resistance by increasing a coupling area between the current collector 30 and the electrode assembly 10, not only the tab coupling portion 32 but also the central portion 31 may be coupled to the first uncoated portion 11. An end portion of the first uncoated portion 11 may be bent to be parallel to the tab coupling portion 32. As such, when the end portion of the first uncoated portion 11 is bent and coupled to the tab coupling portion 32 to be parallel to the tab coupling portion 32, a coupling area may be increased, a coupling force may be improved, and electrical resistance may be reduced. Also, a total height of the electrode assembly 10 may be minimized and energy density may be improved.

The at least one housing coupling portion 33 may extend from an end portion of the tab coupling portion 32 and may be coupled to the beading portion 21 on an inner surface of the battery housing 20. For example, the at least one housing coupling portion 33 may extend from the end portion of the tab coupling portion 32 to a sidewall of the battery housing 20. A plurality of housing coupling portions 33 may be provided. For example, referring to FIG. 4a, the plurality of housing coupling portions 33 may be spaced apart from one another along a circumference of the central portion 31. Referring to FIG. 1a, the plurality of housing coupling portions 33 may be coupled to the beading portion 21 on the inner surface of the battery housing 20. As shown in FIGS. 2 and 3, when a top surface of the beading portion 21 extends in a direction substantially parallel to a bottom surface of the battery housing 20, that is, a direction substantially perpendicular to the sidewall of the battery housing 20, and the housing coupling portion 33 also extends in the same direction, the housing coupling portion 33 may stably contact the beading portion 21. Also, as such, when the housing coupling portion 33 stably contacts the beading portion 21, welding between two components may be smoothly performed, and thus, a coupling force between the two components may be improved and an increase in resistance at a coupling portion may be minimized. Also, due to such a structure in which the current collector 30 is coupled to the beading portion 21 of the battery housing 20, not an inner surface of a cylindrical portion of the battery housing 20, a distance between the current collector 30 and the beading portion 21 may be reduced. Accordingly, a dead space inside the battery housing 20 may be minimized and the energy density of the battery 1 may be improved.

Figure 4A:
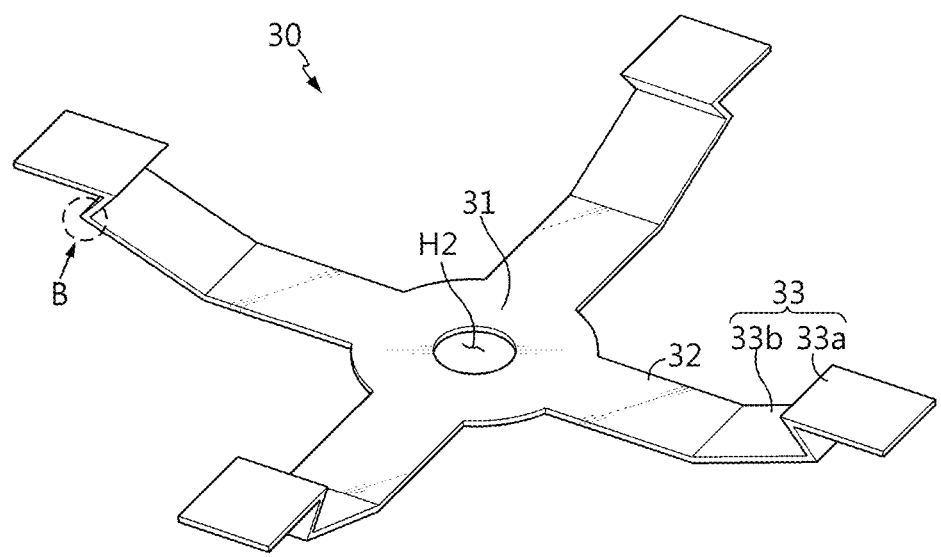
FIG. 4a is a view for describing a current collector included in the battery of FIG. 3.
Figure 4B:
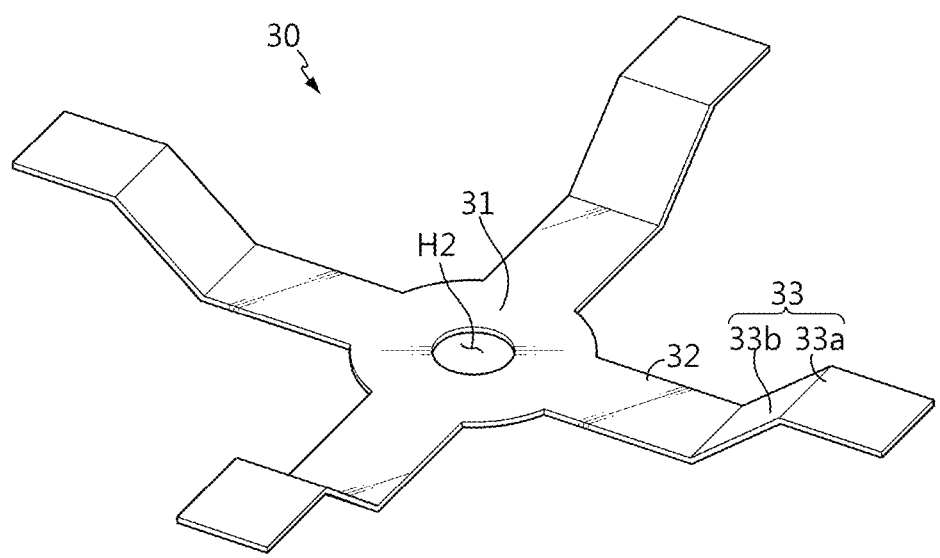

Referring to FIGS. 3 and 4a, the housing coupling portion 33 includes a contact portion 33a that is coupled to the beading portion 21 on an inner surface of the battery housing 20 and a connecting portion 33b that connects the tab coupling portion 32 to the contact portion 33a.

The contact portion 33a is coupled to the inner surface of the battery housing 20. When the beading portion 21 is formed on the battery housing 20, the contact portion 33a may be coupled to the beading portion 21 as described above. In this case, as described above, for stable contact and coupling, the beading portion 21 and the contact portion 33a may extend in a direction substantially parallel to a bottom surface of the battery housing 20, that is, a direction substantially perpendicular to a sidewall of the battery housing 20. The contact portion 33a may have a flat surface coupled to a top surface of the beading portion 21 facing the opening portion. That is, the contact portion 33a includes at least a flat portion substantially parallel to the bottom surface of the battery housing 20.

Figure 13A:
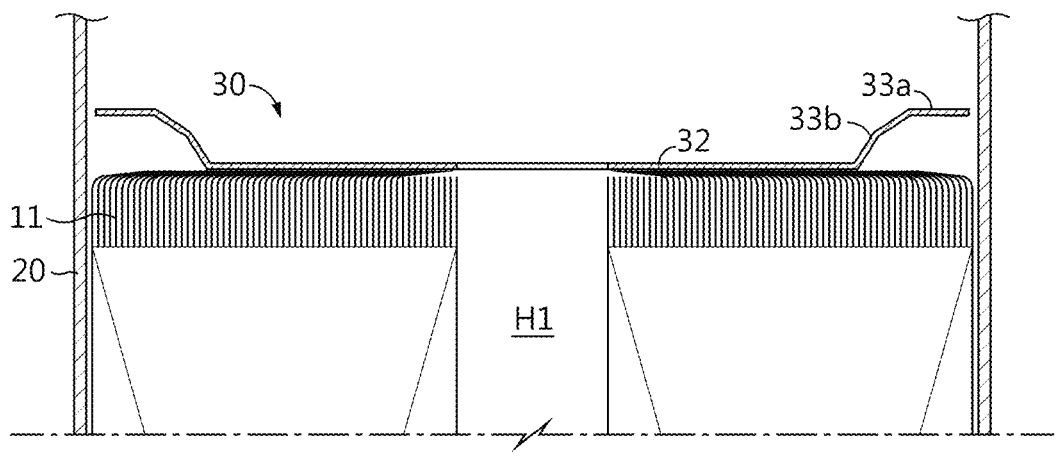
FIG. 13a is a view for describing a welding process of a current collector.
Figure 13B:
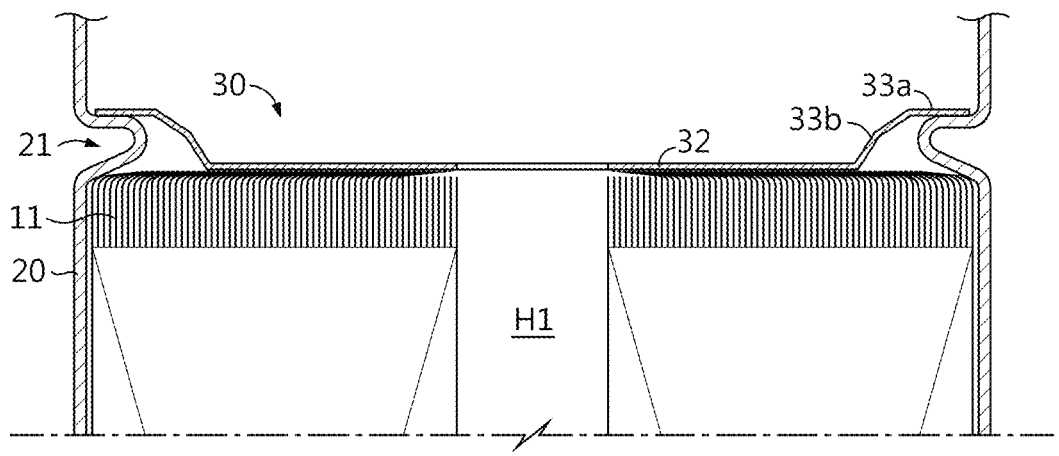
FIG. 13b is a view for describing a beading process of a battery housing.
Figure 13C:
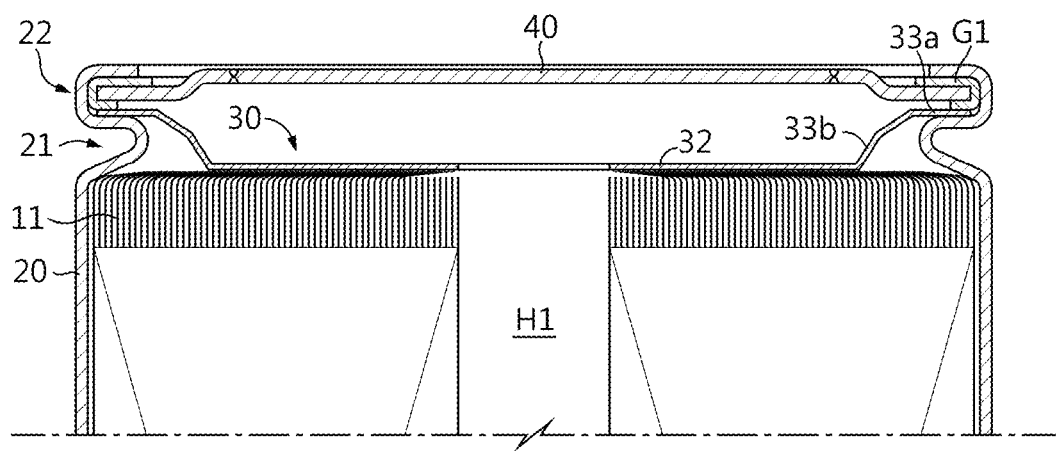
FIG. 13c is a view for describing a crimping process of a battery housing.
Figure 13D:
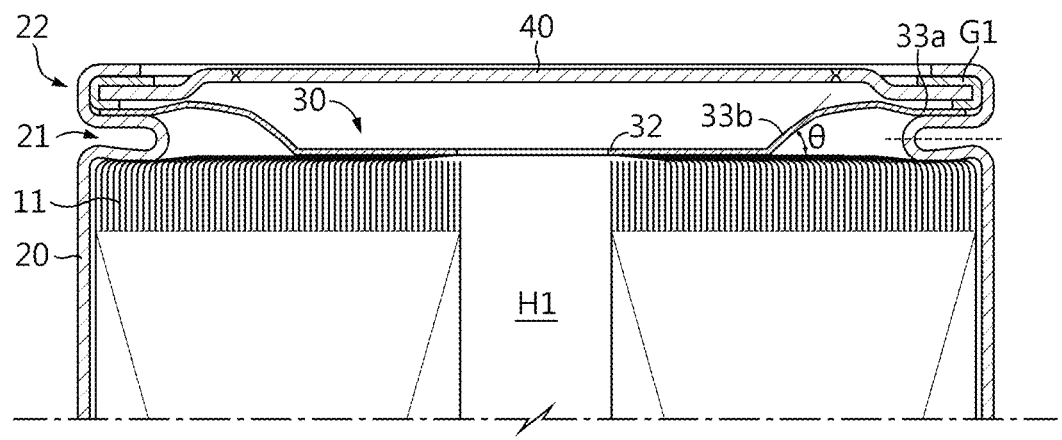
FIG. 13d is a view for describing a sizing process of a battery housing.
Figure 13F:
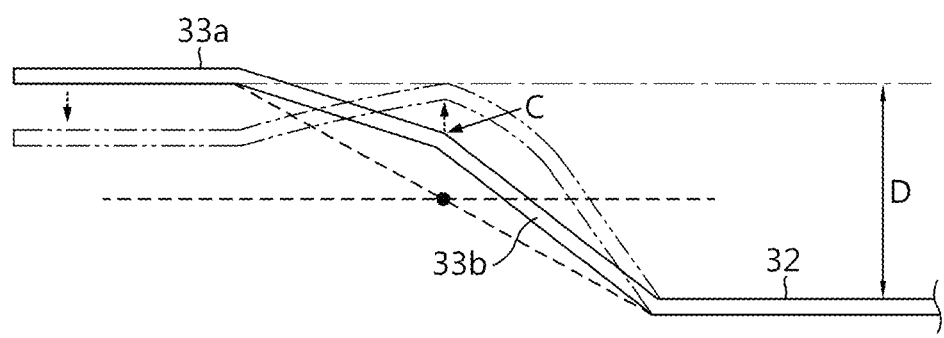
FIG. 13f is a view for describing a shape of a current collector for maintaining a welding region even after a sizing process.

In an embodiment of the present disclosure, referring to FIG. 13f, the connecting portion 33b may have an upwardly convex structure. For example, the connecting portion 33b may have an upwardly convex curved shape. Alternatively, as shown in FIG. 13f, the connecting portion 33b may include at least one bent part C. Preferably, when viewed along a longitudinal axis of the battery housing, the at least one bent part C may be bent at an obtuse angle so as not to overlap. More preferably, a boundary point between the contact portion 33a and the connecting portion 33b may be bent at an obtuse angle. That is, as shown in FIG. 13f, an inclination of the connecting portion 33b may be reduced stepwise or gradually toward the beading portion.

In another embodiment of the present disclosure, referring to FIG. 4a, the connecting portion 33b may include at least one bending portion B whose extension direction is changed at least once between the central portion 31 and the contact portion 33a. That is, the connecting portion 33b may have a structure that may be contracted and extended within a certain range, for example, a spring-like structure or a bellows-like structure. The connecting portion 33b may be elastically biased upward by the bending portion B. According to this structure of the connecting portion 33b, even when there is a height distribution of the electrode assembly 10 within a certain range, the contact portion 33a may be in close contact with the beading portion 21 in a process of accommodating the electrode assembly 10 to which the current collector 30 is coupled in the battery housing 20. Also, according to this structure of the connecting portion 33b, a shape may be more stably achieved during a sizing process.

In another embodiment of the present disclosure, as shown in FIGS. 2 and 3, a connected portion between the contact portion 33a and the connecting portion 33b may be bent. Alternatively, as shown in FIG. 1a, a connected portion between the contact portion 33a and the connecting portion 33b may have a complementary shape corresponding to an inner surface of the beading portion 21. In particular, the connected portion between the contact portion 33a and the connecting portion 33b may be coupled to the beading portion 21 with no gap while having a shape matching the inner surface of the beading portion 21. According to this structure, the beading portion 21 may effectively support the current collector 30. Also, according to this structure, unnecessary interference between the beading portion 21 and the connecting portion 33b may be prevented. Accordingly, stable coupling between the contact portion 33a and the beading portion 21 may be effectively maintained.

According to another aspect of the present disclosure, a protruding outermost point of the bending portion B may be spaced by a certain interval from an innermost point of the beading portion 21. For example, referring to FIG. 3, the bending portion B may not contact the beading portion 21. According to this structure, unnecessary interference between the beading portion 21 and the connecting portion 33*b* may be prevented. Accordingly, stable coupling between the contact portion 33*a* and the beading portion 21 may be effectively maintained.

According to another aspect of the present disclosure, due to the bending portion B, an angle between the contact portion 33*a* and the connecting portion 33*b* may be an acute angle. For example, referring to FIGS. 2, 4*b*, and 8*b*, the connecting portion 33*b* does not include a bending portion. Accordingly, an angle between the contact portion 33*a* and the connecting portion 33*b* may be an obtuse angle. In contrast, referring to FIGS. 3 and 4*a*, the connecting portion 33*b* includes a bending portion. Accordingly, an angle between the contact portion 33*a* and the connecting portion 33*b* may be an acute angle. According to this structure, because an angle between the contact portion 33*a* and the connecting portion 33*b* is an acute angle, interference between the beading portion 21 and the connecting portion 33*b* may be prevented. Accordingly, stable coupling between the contact portion 33*a* and the beading portion 21 may be maintained. Although one bending portion B is provided in the drawings of the present disclosure, the present disclosure is not limited thereto and a plurality of bending portions B may be provided.

It is preferable that a vertical distance between the contact portion 33*a* and the central portion 31 in a state where an external force is not applied to the current collector 30 and thus there is no deformation is equal to a vertical distance between a top surface of the beading portion 21 and the central portion 31 when the electrode assembly 10 to which the current collector 30 is coupled is mounted in the battery housing 20 or is smaller within a range in which the connecting portion 33*b* is stretchable. In a case where the connecting portion 33*b* is configured to satisfy the above condition, when the electrode assembly 10 to which the current collector 30 is coupled is mounted in the battery housing 20, the contact portion 33*a* may naturally be in close contact with the beading portion 21.

In addition, according to such a contractible and stretchable structure of the connecting portion 33*b*, even when vibration and/or impact occurs during the use of the battery 1 and thus the electrode assembly 10 vertically moves, impact according to the movement of the electrode assembly 10 may be reduced, within a certain range.

In another aspect of the present disclosure, the connecting portion 33*b* may have an upwardly convex curved shape. For example, the connecting portion 33*b* may protrude toward a winding center of the electrode assembly 10. A shape of the connecting portion 33*b* is determined to prevent damage to a coupling portion between the current collector (first current collector) 30 and the electrode assembly 10 and/or a coupling portion between the current collector (first current collector) 30 and the battery housing 20 during a sizing process.

FIGS. 13*a* through 13*d* are views for describing a process of manufacturing the battery 1 of the present disclosure.

FIG. 13*a* is a view for describing a welding process of the current collector 30. After the current collector 30 is placed on the electrode assembly 10 that is accommodated in the battery housing 20, a process of welding the current collector 30 and the first uncoated portion 11 of the electrode assembly 10 which protrudes upward is illustrated. In this case, the tab coupling portion 32 of the current collector 30 is welded to a bent surface formed by the plurality of segments 11*a* of the first uncoated portion 11.

Next, FIG. 13*b* is a view for describing a beading process of the battery housing 20. In a state where the current collector 30 is welded to the electrode assembly 10, a beading knife may move toward the inside of the battery housing 20. Accordingly, the beading portion 21 formed by press-fitting a part of the battery housing 20 into the battery housing 20 is provided on a side surface of the battery housing 20. Because the beading portion 21 is located under than the contact portion 33*a* of the current collector 30, an inner surface of the beading portion 21 and the contact portion 33*a* may be welded to each other.

Next, FIG. 13*c* is a view for describing a crimping process of the battery housing 20. The contact portion 33*a* of the current collector 30 may be placed on a top surface of the beading portion 21. The cap 40 whose end portion is surrounded by the sealing gasket G1 may be placed on atop surface of the contact portion 33*a*. Next, the battery housing 20 is bent to surround a circumferential edge of the cap 40, and fixes the cap 40 and the current collector 30. Due to this bent shape of the crimping portion 22, the cap 40 and the current collector 30 are fixed to the beading portion 21.

Next, FIG. 13*d* is a view for describing a sizing process of the battery housing 20. A sizing process is a compression process for reducing a height of the beading portion 21 of the battery housing 20 in order to reduce a total height of the battery 1, when the battery 1 is manufactured. According to the sizing process, because the battery housing 20 is compressed in a longitudinal direction, a part of the electrode assembly 10 may be compressed by the beading portion 21. In another aspect, according to the sizing process, because the battery housing 20 is compressed in the longitudinal direction (vertical direction), the current collector 30 may be vertically bent under pressure. That is, the tab coupling portion 32 may be bent upward, and thus, welding between the tab coupling portion 32 and the first uncoated portion 11 may be likely to be damaged. Accordingly, there is a demand for a shape of the current collector 30 in which a welding region between the tab coupling portion 32 and the first uncoated portion 11 is not damaged even after the sizing process.

For example, when the connecting portion 33*b* has an upwardly convex shape as shown in FIG. 13*f*, upward lifting of the tab coupling portion 32 may be suppressed as much as possible as shown in FIG. 13*d*. That is, when the battery housing 20 of FIG. 13*c* is vertically compressed, the current collector 30 of the present disclosure vertically receives stress. However, because the connecting portion 33*b* of the current collector 30 of the present disclosure has an upwardly convex shape, stress applied to the tab coupling portion 32 may be minimized. Accordingly, the tab coupling portion 32 may not be bent upward, and good welding with the first uncoated portion 11 may be maintained.

Figure 13G:
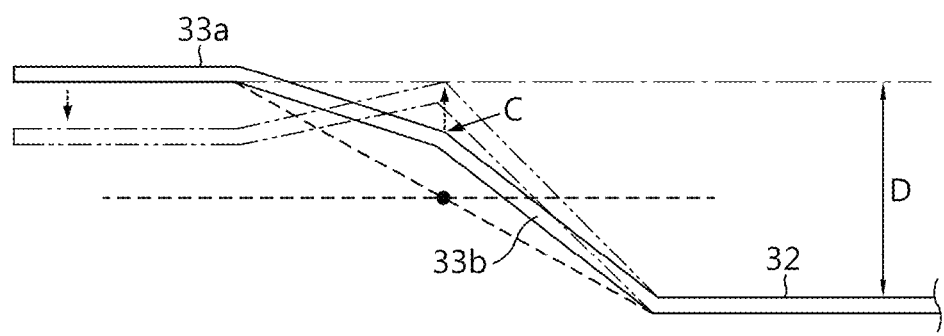
FIG. 13g is a view for describing a shape of a current collector for maintaining a welding region even after a sizing process.

In more detail, referring to FIGS. 13*f* and 13*g*, the connecting portion 33*b* before a sizing process may have an upwardly convex shape based on an imaginary straight line that connects an end portion of the contact portion 33*a* to an end portion of the tab coupling portion 32. For example, at least one bent part C having an obtuse angle may be provided on the connecting portion 33*b*. The bent part C may be located over an imaginary plane that passes through the center of the imaginary straight line that connects the end portion of the contact portion 33*a* to the end portion of the tab coupling portion 32, and is parallel to a bottom surface of the battery housing 20. Preferably, a length of the connecting portion 33*b* between the tab coupling portion 32 and the bent part C may be greater than a length of the connecting portion 33b between the contact portion 33a and the bent part C.

According to this structure, during the sizing process of receiving pressure in a vertical direction, the contact portion 33a moves downward in an arrow direction and the connecting portion 33b is uplifted upward in an arrow direction (see dashed line). In more detail, the connecting portion 33b is uplifted upward to be over the beading portion 21. That is, a profile of the housing coupling portion 33 is changed before and after the sizing process as shown in FIG. 13f. A degree to which the connecting portion 33b is uplifted upward varies according to a change in a height of the battery housing 20 during the sizing process. Unlike in the drawing, a position of the bent part C may move upward only up to a height of the contact portion 33a. As such, because the connecting portion 33b may absorb most of stress due to the upward movement of the connecting portion 33b, stress applied to a welding region between the tab coupling portion 32 and the first uncoated portion 11 is relatively small. Accordingly, according to the present disclosure, a phenomenon where the tab coupling portion 32 is lifted upward may be prevented. Also, according to the above structure, because a length of the connecting portion 33b between the tab coupling portion 32 and the bent part C is greater than a length of the connecting portion 33b between the contact portion 33a and the bent part C, the insertion of the current collector 30 into the battery housing 20 may be facilitated and stress distribution may be effectively achieved.

In another embodiment of the present disclosure, referring to FIG. 13g, a profile of the battery collector plate 30 after a sizing process may be deformed to be different from that in FIG. 13f. For example, in FIG. 13f, the connecting portion 33b may be deformed into an upwardly convex curved shape after the sizing process, whereas in FIG. 13g, the connecting portion 33b may be deformed into a straight line shape that is bent at the bent part C. In more detail, in FIG. 13g, after the sizing process, the connecting portion 33b may be deformed to be upwardly convex while each of a part of the connecting portion 33b between the tab coupling portion 32 and the bent part C and a part of the connecting portion 33b between the contact portion 33a and the bent part C maintains a straight line shape.

As a result of examining a shape of the current collector 30 capable of preventing distortion and/or lifting of the current collector 30, the present inventors have found that, when the connecting portion 33b has an upwardly convex structure, damage to welding between the tab coupling portion 32 and the first uncoated portion 11 is significantly reduced.

FIG. 13e is a view illustrating a degree of damage to a welding region of the current collector 30 after a sizing process according to a shape of the current collector 30 before a sizing process.

Referring to FIG. 13e, Experimental Example 1 is an experimental example in which the connecting portion 33b before sizing had a straight line shape. Experimental Example 2 is an experimental example in which the connecting portion 33b before sizing was convex downward. Experimental Example 3 is an experimental example in which the connecting portion 33b before sizing was convex upward. As a result of performing a 1 mm-sizing process for Experimental Examples 1 through 3, in Experimental Example 1 in which the connecting portion 33b had a straight line shape, a welding region with the tab coupling portion 32 was lifted by about 0.72 mm. In Experimental Example 2 in which the connecting portion 33b was convex downward, a welding region with the tab coupling portion was lifted by about 0.99 mm. That is, it was found that when the connecting portion 33b was convex downward, a lifting phenomenon was increased compared to when the connecting portion 33b had a straight line shape. In Experimental Example 3 in which the connecting portion 33b was convex upward, a welding region with the tab coupling portion 32 was lifted by about 0.02 mm. It means that a lifting phenomenon was significantly reduced compared to Experimental Examples 1 and 2. That is, in Experimental Example 3 in which the connecting portion 33b was convex upward, it was found that damage to a welding region between the tab coupling portion and the first uncoated portion was minimized. This is because a degree of lifting of the current collector 30 is affected by stress applied by the current collector 30 to the electrode assembly 10. That is, in Experimental Example 1 in which the connecting portion 33b had a straight line shape and Experimental Example 2 in which the connecting portion 33b was convex downward, because stress applied to a welding portion between the current collector 30 and the electrode assembly 10 in a sizing process was about 4.5 MPa and about 3.7 MPa which were very large, it was found that a lifting phenomenon of the current collector 30 was severe. In contrast, in Experimental Example 3 in which the connecting portion 33b was convex upward, because stress applied to a welding portion between the current collector 30 and the electrode assembly 10 in a sizing process was about 2.0 MPa which was lower than those in Experimental Examples 1 and 2, it was found that a lifting phenomenon of the current collector 30 was relatively small.

Accordingly, preferably, as shown in FIG. 13f, a gradient of the connecting portion 33b may not be constant and a gradient of an upper portion may be less than a gradient of a lower portion based on a certain point (e.g., the bent part C). The certain point may be located above a middle point of the connecting portion 33b. Alternatively, the connecting portion 33b may have an upwardly convex shape based on an imaginary straight line that connects the tab coupling portion 32 to the contact portion 33a. The convex shape may be a shape in which a straight line and a straight line are connected, a curved shape, or a combined shape thereof. In an example, as shown in FIG. 13f, the connecting portion 33b may include at least one bent part C based on the certain point. Preferably, the at least one bent part C may be bent at an obtuse angle so as not to overlap, when viewed along a longitudinal axis of the battery housing 20. In another modified example, an inclination of the connecting portion 33b may be reduced stepwise or gradually toward the beading portion 21.

In another aspect of the present disclosure, referring to FIG. 13d, an angle θ between the tab coupling portion 32 and the connecting portion 33b may range from, for example, 0° to 90°. For example, when a height of an upper end of the electrode assembly 10 is increased to correspond to a height of the beading portion 21 in a sizing process, the tab coupling portion 32 and the contact portion 33a may be located at the same height. That is, in this case, the angle θ between the tab coupling portion 32 and the connecting portion 33b is 0°. Even when the sizing process is performed, it is not preferable that the contact portion 33a is located under the tab coupling portion 32. This is because, in this case, the first uncoated portion 11 may be excessively pressed by the beading portion 21 to be damaged. Accordingly, it is preferable that the angle θ between the tab coupling portion 32 and the connecting portion 33b is equal to or greater than 0°. In another aspect, the angle θ between the tab coupling portion 32 and the connecting portion 33b may be increased up to 90° according to a shape in which a length, a thickness, or a gradient of the connecting portion 33b is changed stepwise or gradually. However, in order to avoid contact with the cap 40, it is not preferable that the angle θ exceeds 90°.

In another aspect of the present disclosure, the connecting portion 33b may support the cap 40. For example, the connecting portion 33b may be bent upward due to a sizing process. In this case, the connecting portion 33b that is bent upward may contact the cap 40. In this case, the connecting portion 33b may support the cap 40 upward. Accordingly, the current collector 30 may be firmly fixed in a vertical direction due to the sizing process. Accordingly, even when vibration and/or impact occurs during the use of the battery 1, because the current collector 30 fixes the electrode assembly 10 in the vertical direction, unnecessary vertical movement of the electrode assembly 10 inside the battery housing 20 may be prevented.

In another aspect of the present disclosure, a beading portion top surface and a beading portion bottom surface may be asymmetric with respect to an imaginary reference plane that passes through an innermost point of the beading portion 21 to be parallel to a bottom surface of the battery housing. For example, referring to FIG. 13d, because the battery housing 20 is compressed in the vertical direction due to the sizing process, the beading portion 21 is also compressed in the vertical direction. Accordingly, the beading portion top surface and the beading portion bottom surface may be asymmetric with respect to the imaginary reference plane that passes through the innermost point of the beading portion 21.

In another aspect of the present disclosure, a press-fitting depth of the beading portion 21 may be defined as PD. For example, referring to FIG. 11, a distance from an inner surface of the battery housing 20 to an innermost point of the beading portion 21 may be defined as the press-fitting depth PD. Meanwhile, a shortest distance from an end portion of the contact portion 33a to a vertical line that passes through the innermost point of the beading portion 21 may be defined as an overlap length OV. That is, referring to FIG. 11, when the beading portion 21 is projected in a vertical direction, the overlap length OV refers to a radial length of a region where the projection and the current collector 30 overlap each other. In this case, the battery 1 of the present disclosure may satisfy the following relation.

$$(R_{1,min}+W_{bead,min})/PD_{max} \leq OV/PD \leq (PD_{max}-R_{2,min})/PD_{max}$$

Figure 11:
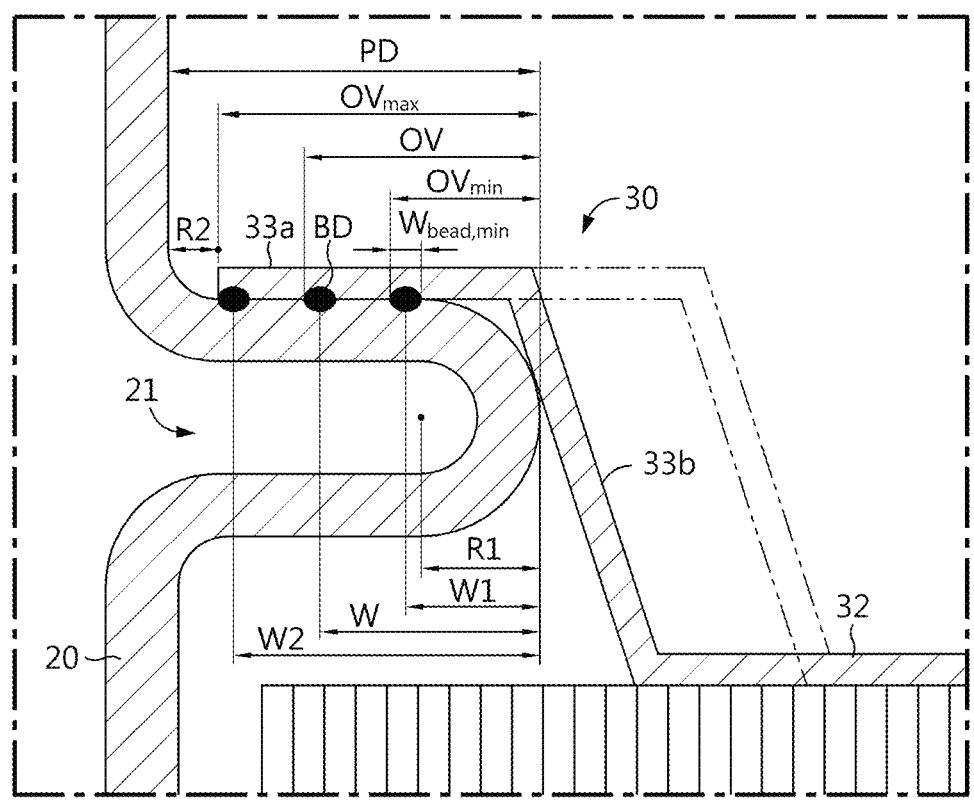
FIG. 11 is a view for describing a position, a length, and a width of a welding bead formed in a welding region between a contact portion and a beading portion.

In order for the contact portion 33a of the current collector 30 to be weldably placed on the beading portion 21, it is preferable that the ratio is equal to or greater than $(R_{1,min}+W_{bead,min})/PD_{max}$. Referring to FIG. 11, in order for the contact portion 33a of the current collector 30 to be weldably placed on the beading portion 21, a region that is overlapped more than the radius of curvature R1 of the beading portion 21 is required. For example, when the contact portion 33a overlaps only by the radius of curvature R1 of the beading portion 21, the flat section F does not exist, and thus, the contact portion 33a may contact the beading portion 21 at only one contact point. That is, the contact portion 33a may not be stably placed on the beading portion 21. Accordingly, the contact portion 33a requires a region that is additionally overlapped in addition to the radius of curvature R1 of the beading portion 21. In this case, it is preferable that a length of the region that is additionally overlapped is equal to or greater than the welding bead width $W_{bead}$. That is, the contact portion 33a and the beading portion 21 may substantially overlap in the region that is additionally overlapped, and welding may be performed in this region. Accordingly, when the length of the region that is additionally overlapped is equal to or greater than the welding bead width $W_{bead}$, stable welding may be performed without departing from the overlapped region. That is, a minimum overlap length required for the contact portion 33a to be weldably placed on the beading portion 21 is $R_{1,min}+W_{bead,min}$.

In another aspect, in order for the contact portion 33a of the current collector 30 to be weldably placed on the beading portion 21, it is preferable that the ratio is equal to or less than $(PD_{max}-R_{2,min})/PD_{max}$. Referring to FIG. 11, there is the radius of curvature R2 at a boundary region between the beading portion 21 and an inner surface of the battery housing 20. Accordingly, when the contact portion 33a of the current collector 30 moves to the boundary region between the inner surface of the battery housing 20 and the beading portion 21 at which the radius of curvature R2 is formed, the contact portion 33a is lifted without being closely attached to the beading portion 21 due to the radius of curvature R2. Accordingly, a maximum overlap length required for the contact portion 33a to be closely placed on the beading portion 21 is $PD_{max}-R_{2,min}$.

In an example, a maximum value $PD_{max}$ of the press-fitting depth PD of the beading portion 21 may be about 10 mm, minimum values $R_{1,min}$ and $R_{2,min}$ may each be about 0.05 mm, and $W_{bead,min}$ may be about 0.1 mm. In this case, a ratio of the overlap length OV to the press-fitting depth PD of the beading portion 21 may range from about 1.5% to about 99.5%. In order for the contact portion 33a of the current collector 30 to be weldably placed on the beading portion 21, it is preferable that the ratio is equal to or greater than about 1.5%. A lower limit of the OV/PD ratio may be determined from the maximum value $PD_{max}$ of the press-fitting depth of the beading portion, the minimum value $R_{1,min}$ of the radius of curvature R1, and a minimum width of the contact portion 33a that should contact a top surface of the beading portion 21 for welding of the contact portion 33a, that is, a length of the minimum width $W_{bead,min}$ of the welding bead BD. In detail, in an example, the maximum value $PD_{max}$ of the press-fitting depth may be 10 mm, the minimum contact width of the contact portion 33a required for welding of the contact portion 33a, that is, a length of the minimum width $W_{bead,min}$ of the welding bead BD may be 0.1 mm, and the minimum value $R_{1,min}$ of the radius of curvature R1 may be 0.05 mm. In this condition, because a minimum value of the overlap length OV is 0.15 mm (=0.1 mm+0.05 mm) and $PD_{max}$ is 10 mm, a lower limit of the OV/PD ratio is 1.5%. Meanwhile, a point at which the contact portion 33a of the current collector 30 may contact with a maximum width on a flat portion of the beading portion top surface is a point spaced by the radius of curvature R2 from an inner surface of the battery housing. Accordingly, when an end portion of the contact portion 33a is located at the point, the overlap length OV is maximized. An upper limit of the OV/PD ratio may be determined from the maximum value of the press-fitting depth and the minimum value $R_{2,min}$ of the radius of curvature R2. In detail, the maximum value of the press-fitting depth may be 10 mm, and the minimum value of the radius of curvature R2 may be 0.05 mm. In this condition, because the maximum value of the overlap length OV is 9.95 mm (=10 mm−0.05 mm) and $PD_{max}$ is 10 mm, an upper limit of the OV/PD ratio is 99.5%.

In another aspect of the present disclosure, a welding position where the beading portion 21 and the contact portion 33a are welded may be defined as W. In more detail, the welding position W may refer to a distance from an innermost point of the beading portion 21 to a central point of an outermost welding bead BD in a radial direction. In this case, the welding position W and the press-fitting depth PD may satisfy the following relation.

$$(OV_{min}-0.5*W_{bead,min})/PD_{max} \leq W/PD \leq (OV_{max}-0.5*W_{bead,min})/PD_{max}$$

The welding position W of the beading portion 21 and the contact portion 33a may be determined from an overlap length of the contact portion 33a and the beading portion 21 and the minimum width $W_{bead,min}$ of the welding bead BD. The welding position W is a central point of the welding bead BD.

Referring to FIG. 11, a welding position when the contact portion 33a is minimally placed on the beading portion 21 may be defined as W1. An overlap length in this case is $OV_{min}$ as described above. Because welding may be stably performed when the welding bead BD is formed within an overlapped region, the welding bead BD should be completely included in the overlapped region. Accordingly, the welding position W1 should be a point spaced apart by at least $0.5*W_{bead,min}$ from $OV_{min}$ toward the inside of the beading portion 21. Accordingly. W1 may satisfy the following relation.

$$W1 = OV_{min} - 0.5 * W_{bead,min} =$$
$$R_{1,min} + W_{bead,min} - 0.5 * W_{bead,min} = R_{1,min} + 0.5 * W_{bead,min}$$

Because a PD value should be maximized in order to minimize W1/PD, a minimum value of W/PD is $(OV_{min}-0.5*W_{bead,min})/PD_{max}$.

In another aspect, referring to FIG. 11, a welding position when the contact portion 33a is maximally placed on the beading portion 21 may be defined as W2. An overlap length in this case is $OV_{max}$ as described above. Because welding may be stably performed when the welding bead is formed within an overlapped region, the welding bead BD should be completely included in the overlapped region. Accordingly, the welding position W2 should be a point spaced apart by at least $0.5*W_{bead,min}$ from $OV_{max}$ toward the inside of the beading portion 21. Accordingly, W2 may satisfy the following relation.

$$W2 = OV_{max} - 0.5 * W_{bead,min} = PD_{max} - R_{2,min} - R_{2,min} - 0.5 * W_{bead,min}$$

In order maximize W2/PD, $\{1-(R2,min+0.5*W_{bead,min})/PD\}$ that is a value obtained by dividing $(PD_{max}-R_{2,min}-0.5*W_{bead,min})$ by PD should be maximized. That is, when a PD value is maximized, a W2/PD value is also maximized. Accordingly, a maximum value of W/PD is $(OV_{min}-0.5*W_{bead,min})/PD_{max}$.

In an example, a minimum width required to weld the contact portion 33a to the beading portion 21 may be 0.1 mm. That is, 0.1 mm corresponds to a minimum width of the welding bead BD that may be formed by using laser welding. Accordingly, the welding position W1 when the contact portion 33a minimally contacts a top surface of the beading portion 21 corresponds to a point spaced apart by $(R_{1,min}+0.5*0.1$ mm) from an innermost point of the beading portion 21. $R_{1,min}$ that is a minimum value of the radius of curvature R1 is, for example, 0.05 mm. When a laser is irradiated to the point, the welding bead BD having a width of 0.1 mm is formed on a contact surface between the contact portion 33a and the beading portion 21. A width of the welding bead BD corresponds to a minimum contact width of the contact portion 33a. The welding position W1 based on the press-fitting depth PD of the beading portion 21 is a point spaced apart by 0.1 mm from the innermost point of the beading portion 21.

When the contact portion 33a maximally contacts the top surface of the beading portion 21, an end portion of the contact portion 33a is located at a point spaced apart by a radius of curvature from an inner surface of the battery housing. $R_{2,min}$ that is a minimum value of the radius of curvature R2 is, for example, 0.05 mm. In this case, the welding position W2 which may be closest to an end of the contact portion 33a is a point spaced apart by 0.05 mm from the end of the contact portion 33a. When a laser is irradiated to the point, the welding bead having a minimum width of 0.1 mm may be formed to contact the end of the contact portion 33a. The welding position W2 when the contact portion 33a maximally contacts the top surface of the beading portion 21 is a point spaced apart by $(PD-R_{2,min}-0.05$ mm) from the innermost point of the beading portion 21. In an example, when $R_{2,min}$ is 0.05 mm, a maximum value of the welding position W2 is a point spaced apart by PD−0.1 mm from the innermost point of the beading portion 21.

As described above, when $R_{1,min}$ and $R_{2,min}$ are each 0.05 mm, the welding position W of the contact portion 33a based on the press-fitting depth PD may be set within a range of (0.1 mm) to (PD−0.1 mm) based on the innermost point of the beading portion 21. Because a ratio of the welding position W1 based on the press-fitting depth PD is a value when the press-fitting depth PD is maximized, a minimum value (%) of W1/PD is 1% (=100*0.1 mm/10 mm). Also, because a maximum value of W1/PD of the welding position W2 based on the press-fitting depth PD is a value when the press-fitting depth PD is maximized, a maximum value (%) of W2/PD is 99% (=100*(10 mm−0.1 mm)/10 mm). For short, a welding position region based on the press-fitting depth PD may be a region that is equal to or greater than 1% and equal to or less than 99% based on the press-fitting depth PD.

Referring to FIG. 11, a distance from an innermost point of the beading portion 21 when the overlap length is OV to a central point of the outermost welding bead BD in a radial direction may be defined as W. In this case, the battery 1 may satisfy the following relation.

$$W = OV - 0.5 * W_{bead,min}$$

In another aspect, the beading portion 21 may include the flat section F parallel to a bottom surface of the battery housing 20 in at least a region, and a length of the flat section F of the beading portion 21 contacting the current collector 30 may be OV−R1. That is, referring to FIG. 11, the flat section F corresponds to a length obtained by subtracting the radius of curvature R1 of the beading portion 21 from the overlap length OV.

In another aspect of the present disclosure, when the overlap length is OV, a radial width length of a welding pattern which is a set of the welding beads BD formed between the beading portion 21 and the contact portion 33a may be equal to or greater than $W_{bead,min}$ and equal to or less than OV−R1.

Referring to FIG. 11, because a minimum width of the welding bead BD is $W_{bead,min}$, a minimum value of a radial width length of the welding pattern which is formed between the beading portion 21 and the contact portion 33a should be at least $W_{bead,min}$. A plurality of welding beads BD may be formed over the entire flat section F of the beading portion 21. In this case, the plurality of welding beads BD may form a certain welding pattern. Referring to FIG. 11, a maximum value of the radial width length of the welding pattern which is formed between the beading portion 21 and the contact portion 33a may satisfy the following relation.

Maximum value of the radial width length of the welding which is formed between the beading portion 21 and the contact portion 33a =

$W - W1$ + minimum width of the welding bead $BD$ =

$[(OV - 0.5 * W_{bead,min}) - (R1 + 0.5 * W_{bead,min})] + W_{bead,min} = OV - R1$ In another aspect of the present disclosure, a ratio of the radial width length of the welding pattern to a length of the flat section F may range from about 10% to about 40%. Preferably, the ratio may range from about 20% to about 30%. When the ratio satisfies the range, welding strength may be increased as a welding area is increased. Accordingly, the battery 1 according to the present disclosure may secure high impact resistance.

In another aspect of the present disclosure, a ratio of the area where the current collector 30 does not contact a top surface of the electrode assembly 10 to the area of a circle having an outer diameter of the electrode assembly 10 as a diameter may be defined as an aperture ratio of the current collector 30. The aperture ratio may be calculated as follows.

Aperture ratio (%) =

1 − (area where the current collector contacts the top surface of the electrode assembly)/(area of the circle having the outer diameter of the electrode assembly as the diameter) =

(area where the current collector does not contact the top surface of the electrode assembly)/(area of the circle having the outer diameter of the electrode assembly as the diameter)

Figure 8A:
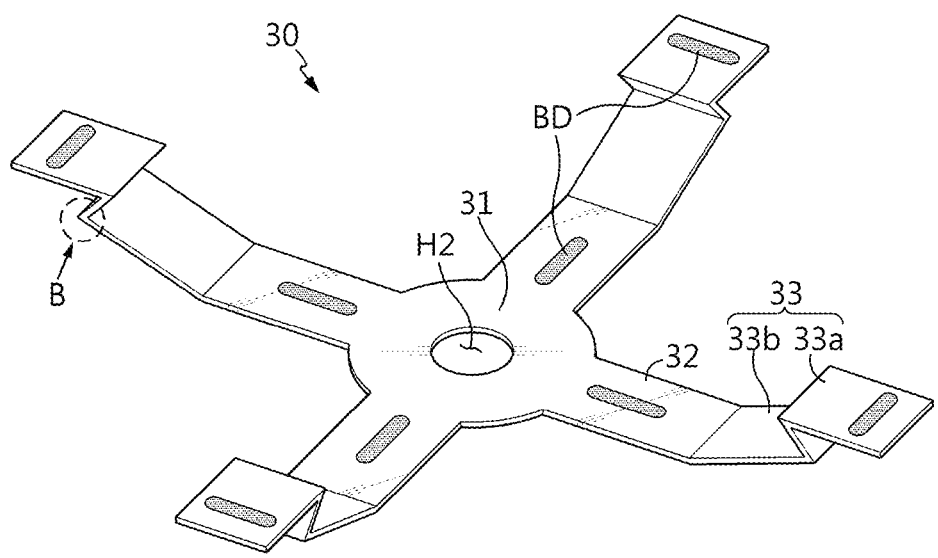

The aperture ratio of the current collector 30 may be, for example, equal to or greater than about 30% and less than 10%, and more particularly, may be equal to or greater than about 60% and less than 100%. Assuming that the current collector 30 of FIG. 8a is placed on and coupled to the electrode assembly 10, a region where the current collector 30 contacts the electrode assembly 10 may be the central portion 31 and the tab coupling portion 32. That is, a ratio of the area where the current collector 30 contacts the electrode assembly 10 to the area of a circle having an outer diameter of the electrode assembly 10 as a diameter may be equal to or less than about 70%, and more particularly, may be equal to or less than about 40%. When an aperture ratio of the current collector 30 is within the range, an electrolytic solution may be smoothly penetrated into the electrode assembly 10 through an opening region of the current collector 30 having the current collector hole H2 during injection of the electrolytic solution. That is, when the aperture ratio of the current collector 30 is within the range, the electrolytic solution may be penetrated into the electrode assembly 10 through the opening region of the current collector 30 and the winding central hole H1 formed in the electrode assembly 10, and in particular, because there is a fine gap between overlapped surfaces of the segments 11a and between adjacent segments 11a, the electrolytic solution may be smoothly penetrated into the electrode assembly 10 due to capillary action through the gap.

Figure 5:
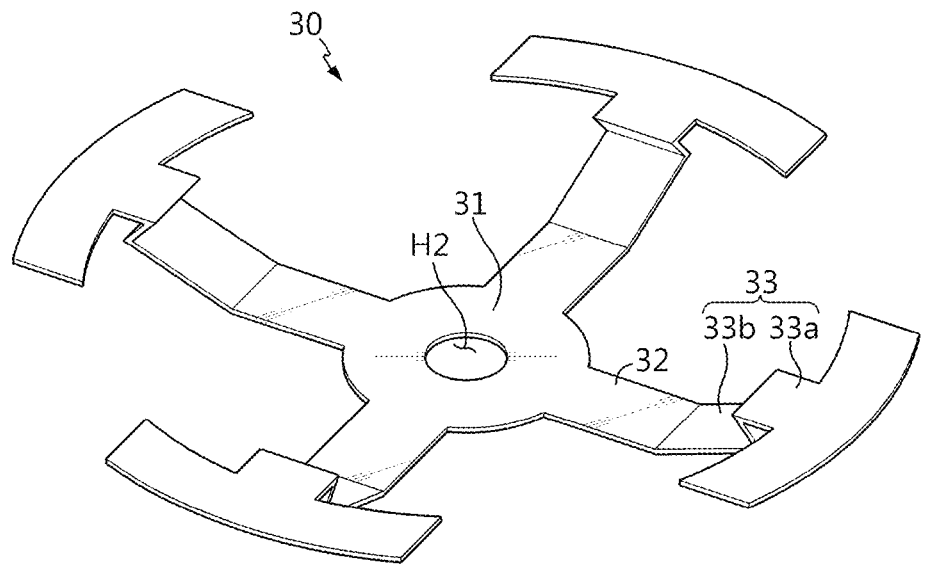
FIG. 5 is a view for describing a current collector according to another embodiment of the present disclosure.

Next, referring to FIG. 5, the current collector 30 according to another embodiment of the present disclosure is illustrated. The current collector 30 according to another embodiment of the present disclosure is only different in a shape of the contact portion 33a from the current collector 30 of FIG. 4a, and thus, other structures of the current collector 30 described above may be substantially the same.

Referring to FIG. 5, at least a part of the contact portion 33a may extend along an inner circumferential surface of the battery housing 20. For example, the contact portion 33a may have an arc shape that extends along the beading portion of the battery housing 20. Also, in order to maximize a contact area, the current collector 30 may be configured so that a sum of an extending length of the contact portion 33a of at least one housing coupling portion 33 is substantially the same as an inner circumference of the battery housing 20. In this embodiment, a coupling area is maximized, and thus, a coupling force may be improved and electrical resistance may be reduced.

Figure 6:
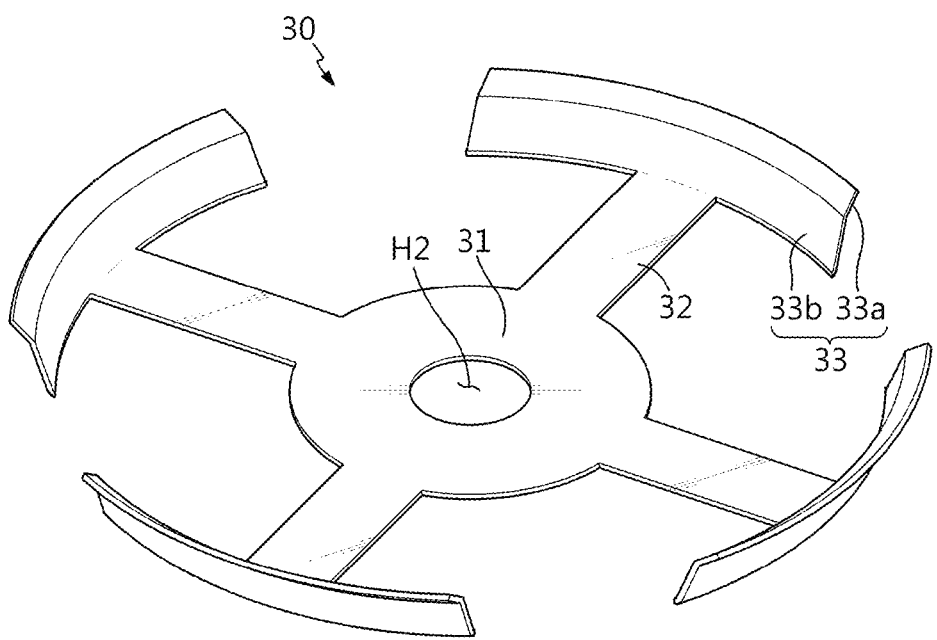
FIG. 6 is a view for describing a current collector, according to another embodiment of the present disclosure.

Next, referring to FIG. 6, the current collector 30 according to another embodiment of the present disclosure is illustrated. The current collector 30 according to another embodiment of the present disclosure is only different in shapes of the contact portion 33a and the connecting portion 33b from the current collector 30 of FIG. 5, and thus, other structures of the current collector 30 described above may be substantially the same.

Referring to FIG. 6, at least a part of the connecting portion 33b may extend along an inner circumferential surface of the battery housing 20. In detail, the contact portion 33a may have an arc shape that extends along the beading portion of the battery housing 20, and the connecting portion 33b may have an arc shape that extends along the contact portion 33a. According to this structure, because the area of the current collector 30 is additionally increased when compared to the current collector 30 of FIG. 5, the effect of reducing electrical resistance may be maximized.

Referring to FIG. 6, the current collector 30 may not include the bending portion B, unlike the current collector 30 of FIGS. 4a and 5. When the current collector 30 does not include the bending portion B, raw materials required to manufacture the current collector 30 may be reduced. Accordingly, manufacturing costs of the current collector 30 may be reduced.

Referring to FIG. 1a, the cap 40 covers the opening portion formed on a side of the battery housing 20. The cap 40 may be fixed by the crimping portion 22 formed on an upper end of the battery housing 20. In this case, in order to improve a fixing force and improve the sealing property of the battery housing 20, the sealing gasket G1 may be located between the battery housing 20 and the cap 40. However, in the present disclosure, the cap 40 is not a component that should function as a passage of current. Accordingly, as long as the battery housing 20 and the cap 40 may be firmly fixed and the sealing property of the opening portion of the battery housing 20 may be secured through the application of another structure well known in the related art, the application of the sealing gasket G1 is not essential.

Assuming that the sealing gasket G1 is applied, the sealing gasket G1 that is located between the opening portion of the battery housing 20 and the current collector 30 may be configured so that a portion of the current collector 30 contacting the beading portion 21 is located between the beading portion 21 and the sealing gasket G1. The sealing gasket G1 may have a substantially annular shape surrounding the cap 40. The sealing gasket G1 may simultaneously cover a top surface, a bottom surface, and a side surface of the cap 40. A radial length of a portion of the sealing gasket G1 covering the bottom surface of the cap 40 may be equal to or less than a radial length of a portion of the sealing gasket G1 covering the top surface of the cap 40. When a radial length of a portion of the sealing gasket G1 covering the bottom surface of the cap 40 is excessively large, the sealing gasket G1 may press the current collector 30 in a process of vertically compressing the battery housing 20 during a sizing process, thereby damaging the current collector 30 or the battery housing 20. In particular, when a radial length of a portion of the sealing gasket G1 covering the bottom surface of the cap 40 is excessively large, the sealing gasket G1 may excessively press the connecting portion 33b in a process of vertically compressing the battery housing 20 during a sizing process, thereby deforming the connecting portion 33b or damaging a part of the connecting portion 33b. Accordingly, it is necessary to keep a radial length of a portion of the sealing gasket G1 covering the bottom surface of the cap 40 to a certain level.

In contrast, a portion of the sealing gasket G1 covering the top surface of the cap 40 does not interfere with the current collector 30 due to its structural and positional characteristics. In another aspect, the battery housing 20 and the cap 40 do not necessarily need to be insulated from each other. That is, because a portion of the sealing gasket G1 covering the top surface of the cap 40 needs only a sealing function and does not need insulation or other separate functions, there are relatively few restrictions on its length.

For example, as shown in FIG. 1a, a radial length of a portion of the sealing gasket G1 covering the bottom surface of the cap 40 may be the same as a radial length of a portion of the sealing gasket G1 covering the top surface of the cap 40. Alternatively, as shown in FIGS. 2 and 3, a radial length of a portion of the sealing gasket G1 covering the bottom surface of the cap 40 may be less than a radial length of a portion of the sealing gasket G1 covering the top surface of the cap 40.

The contact portion 33a may be located and fixed between the beading portion 21 of the battery housing 20 and the sealing gasket G1. That is, the contact portion 33a may be fixed due to a crimping force of the crimping portion 22 in a state where the contact portion 33a is located between the beading portion 21 of the battery housing 20 and the sealing gasket G1.

In this case, a thickness of the sealing gasket G1 may vary according to a circumferential direction. For example, a thickness of the sealing gasket G1 may be alternately increased and decreased in the circumferential direction.

In an example, the sealing gasket G1 may have the same compressibility in a region where the sealing gasket G1 contacts the contact portion 33a and in a region where the sealing gasket G1 does not contact the contact portion 33a. That is, in an uncompressed state, the sealing gasket G1 may be configured so that a thickness of the sealing gasket G1 varies in the circumferential direction.

In another example, the sealing gasket G1 may be configured so that a compressibility in a region where the sealing gasket G1 does not contact the contact portion 33a is less than that in a region where the sealing gasket G1 contacts the contact portion 33a. That is, in an uncompressed state, the sealing gasket G1 may be configured to have a constant thickness in the circumferential direction, and may be configured so that a thickness varies only in a certain region when compressed due to a crimping force later.

In another example, the sealing gasket G1 may be configured so that a thickness in a region where the sealing gasket G1 does not contact the contact portion 33a is greater than that in a region where the sealing gasket G1 contacts the contact portion 33a. That is the sealing gasket G1 may have a relatively high compressibility in a region where the sealing gasket G1 contacts the contact portion 33a.

In another aspect, a welding portion may be formed between the beading portion 21 of the battery housing 20 and the contact portion 33a of the current collector. For example, the fixing of the contact portion 33a may not be reliable only with a crimping force. In addition, when the sealing gasket G1 is contracted by heat or the crimping portion 22 is deformed by external impact, a coupling force between the current collector and the battery housing 20 is likely to be reduced. Accordingly, the current collector 30 may be fixed to the battery housing 20 through welding in a state where the contact portion 33a is placed on the beading portion 21 of the battery housing 20. Next, the cap 40 surrounded by the sealing gasket G1 may be placed on an upper end of the contact portion 33a and the crimping portion 22 may be formed, to complete a manufacturing process of the battery 1. In this case, examples of the welding method may include, but are not limited to, laser welding, resistance welding, and ultrasonic welding. As such, according to a structure in which the contact portion 33a is located between the beading portion 21 and the sealing gasket G1 and the contact portion 33a is coupled to the beading portion 21 through welding, a coupling force of a welding portion may be increased and surface adhesion may be ensured even with wobble for a long time. Accordingly, safety problems such as cycle fading may be minimized.

FIGS. 8a through 10 are views for describing a welding region between the contact portion 33a and the beading portion 21.

Referring to FIGS. 8a through 10, the welding bead BD may be formed in a welding region between the contact portion 33a and the beading portion 21. For example, when a beading portion top surface and a beading portion bottom surface are inclined at a certain angle with respect to a bottom surface of the battery housing 20 as shown in FIG. 1a, the contact portion 33a may be mounted on an inclined top surface of the beading portion 21. Alternatively, as shown in FIGS. 2 and 3, when each of the beading portion top surface and the beading portion bottom surface includes the flat section F parallel to the bottom surface of the battery housing 20 in at least a region, the contact portion 33a may be mounted on a flat top surface of the beading portion 21. Next, the contact portion 33a may be welded to the beading portion 21.

FIG. 11 is a view for describing a position, a length, and a width of the welding bead BD formed in a welding region between the contact portion 33a and the beading portion 21.

Referring to FIG. 11, the contact portion 33a may be welded to a flat top surface of the beading portion 21.

Referring to 8a through 10, when a plurality of welding beads BD may be gathered, a certain welding pattern may be formed. For example, referring to FIG. 8a, a plurality of welding beads BD may be gathered to form a welding pattern having a substantially straight line shape. For example, a welding pattern formed between the beading portion 21 and the contact portion 33a may have a linear shape in which spot welding is connected. A width of the welding bead BD formed between the beading portion 21 and the contact portion 33a may be equal to or greater than about 0.1 mm. This is because, when laser technology is considered, a minimum width of the welding bead BD is equal to or greater than about 0.1 mm.

At least one welding bead BD may be formed between the beading portion 21 and the contact portion 33a. For example, a plurality of welding beads BD may be formed in a circumferential direction between the beading portion 21 and the contact portion 33a. In particular, a plurality of welding beads BD formed between the beading portion 21 and the contact portion 33a may be formed in the same contact portion 33a. For example, the plurality of welding beads BD formed in the same contact portion 33a may be symmetrically formed in the same contact portion 33a. The plurality of welding beads BD formed in the same contact portion 33a may be formed at an interval of a certain angle, for example, 30°. In detail, the plurality of welding beads BD formed in the same contact portion 33a may be located within a circumferential angle range of 30° or less based on the center of a circle formed by the beading portion 21 in the same contact portion 33a.

The welding beads BD formed between the beading portion 21 and the contact portion 33a may form a welding pattern having a straight line shape extending in the circumferential direction. Alternatively, the welding beads BD formed between the beading portion 21 and the contact portion 33a may form a welding pattern having an arc shape extending in the circumferential direction. According to an embodiment of the present disclosure, a circumferential length of the contact portion 33a may be the same as a circumferential length of the tab coupling portion 32. Also, a circumferential length of the contact portion 33a may be the same as a circumferential length of the connecting portion 33b. For example, as shown in FIG. 4a, the tab coupling portion 32, the connecting portion 33b, and the contact portion 33a may extend to have the same width.

Figure 8B:
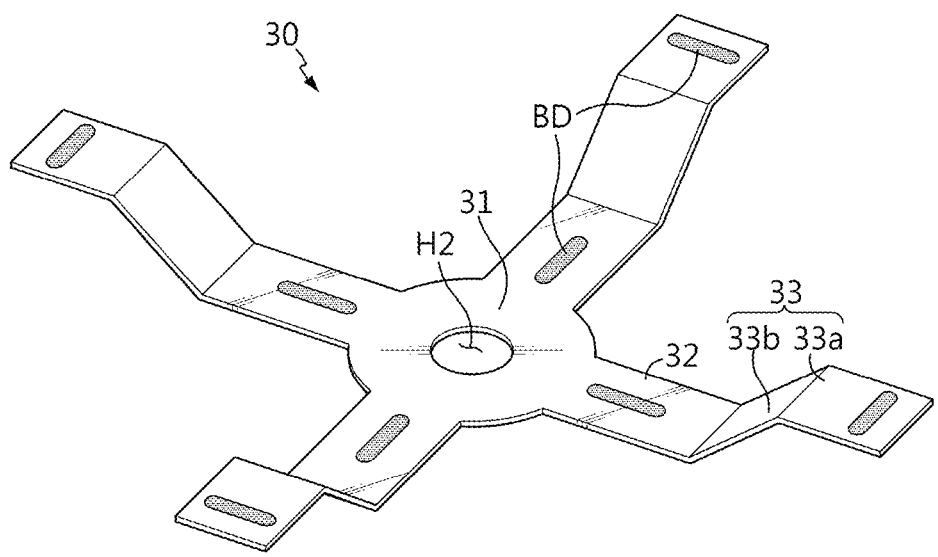
FIG. 8b is a view for describing a welding region between a current collector and a first uncoated portion and a welding region between the current collector and a beading portion of FIG. 4b.
Figure 9:
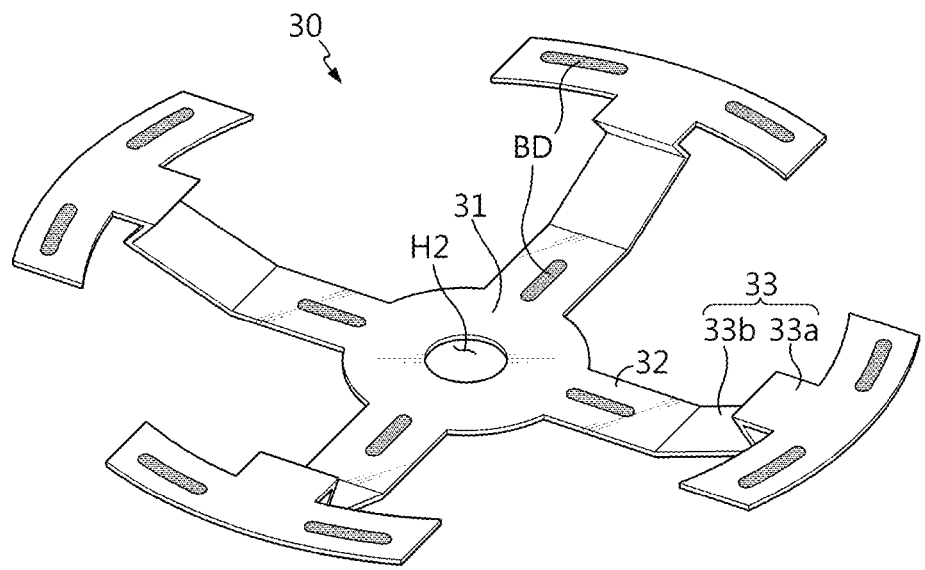
FIG. 9 is a view for describing a welding region between a current collector and a first uncoated portion and a welding region between the current collector and a beading portion of FIG. 5.
Figure 10:
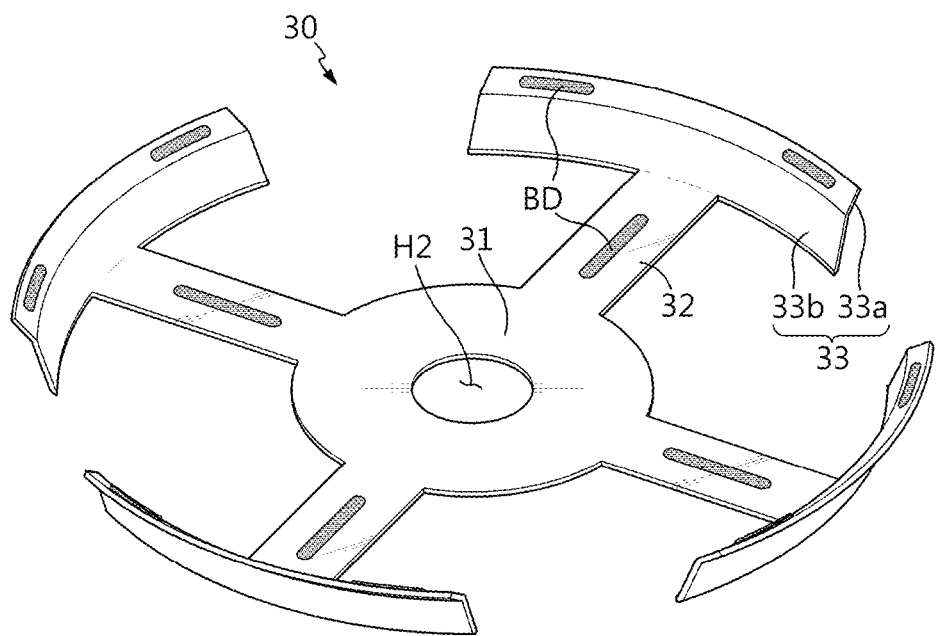
FIG. 10 is a view for describing a welding region between a current collector and a first uncoated portion and a welding region between the current collector and a beading portion of FIG. 6.

In another aspect, an extension direction of a welding pattern formed between the first uncoated portion 11 and the tab coupling portion 32 and an extension direction of a welding pattern formed between the beading portion 21 and the contact portion 33a may be different from each other. Preferably, an extension direction of a welding pattern formed between the first uncoated portion 11 and the tab coupling portion 32 and an extension direction of a welding pattern formed between the beading portion 21 and the contact portion 33a may be substantially perpendicular to each other. Referring to FIGS. 8a and 8b, a welding pattern formed between the first uncoated portion 11 and the tab coupling portion 32 may be formed in a radial direction. A welding pattern formed between the beading portion 21 and the contact portion 33a may be formed in a circumferential direction of the battery housing 20. That is, an extension direction of the welding pattern formed between the first uncoated portion 11 and the tab coupling portion 32 and an extension direction of the welding pattern formed between the beading portion 21 and the contact portion 33a may be substantially perpendicular to each other. According to this structure, coupling strength between the current collector 30 and the electrode assembly 10 may be increased. That is, according to this structure, because the current collector 30 is fixed by welding performed in various directions, even when the current collector 30 receives vibration or impact in a specific direction, the current collector 30 may be firmly fixed.

According to another embodiment of the present disclosure, a circumferential length of the contact portion 33a may be greater than a circumferential length of the tab coupling portion 32. Also, preferably, a circumferential length of the contact portion 33a may be greater than a circumferential length of the connecting portion 33b. For example, referring to FIGS. 5 and 6, it may be found that a circumferential length of the contact portion 33a is greater than a circumferential length of the tab coupling portion 32. Also, referring to FIG. 5, it may be found that a circumferential length of the contact portion 33a is greater than a circumferential length of the connecting portion 33b. As such, when a circumferential length of the contact portion 33a is large, a coupling force between the beading portion 21 and the current collector 30 may be improved. Furthermore, when a circumferential length of the contact portion 33a and/or the connecting portion 33b is large, the internal resistance of a battery may be reduced.

Referring to FIGS. 5 and 6, the contact portion 33a may have an arc shape extending in a circumferential direction along the beading portion 21 of the battery housing. In more detail, the contact portion 33a may have an arc shape extending in opposite directions along the circumferential direction, from an intersection between the connecting portion 33b and the contact portion 33a.

Referring to FIG. 6, the connecting portion 33b may have an arc shape extending in the circumferential direction along the contact portion 33a. Because the contact portion 33a has an arc shape extending in the circumferential direction along the beading portion 21 of the battery housing, a coupling force between the beading portion 21 and the current collector may be improved. More preferably, a sum of lengths of the contact portions 33a extending in the circumferential direction may correspond to a length of an inner circumference of the battery housing. That is, the current collector 30 may have an annular shape in which the contact portions 33a are connected to one another. According to this shape, a coupling force between the beading portion 21 and the current collector 30 may be further improved.

Figure 12:
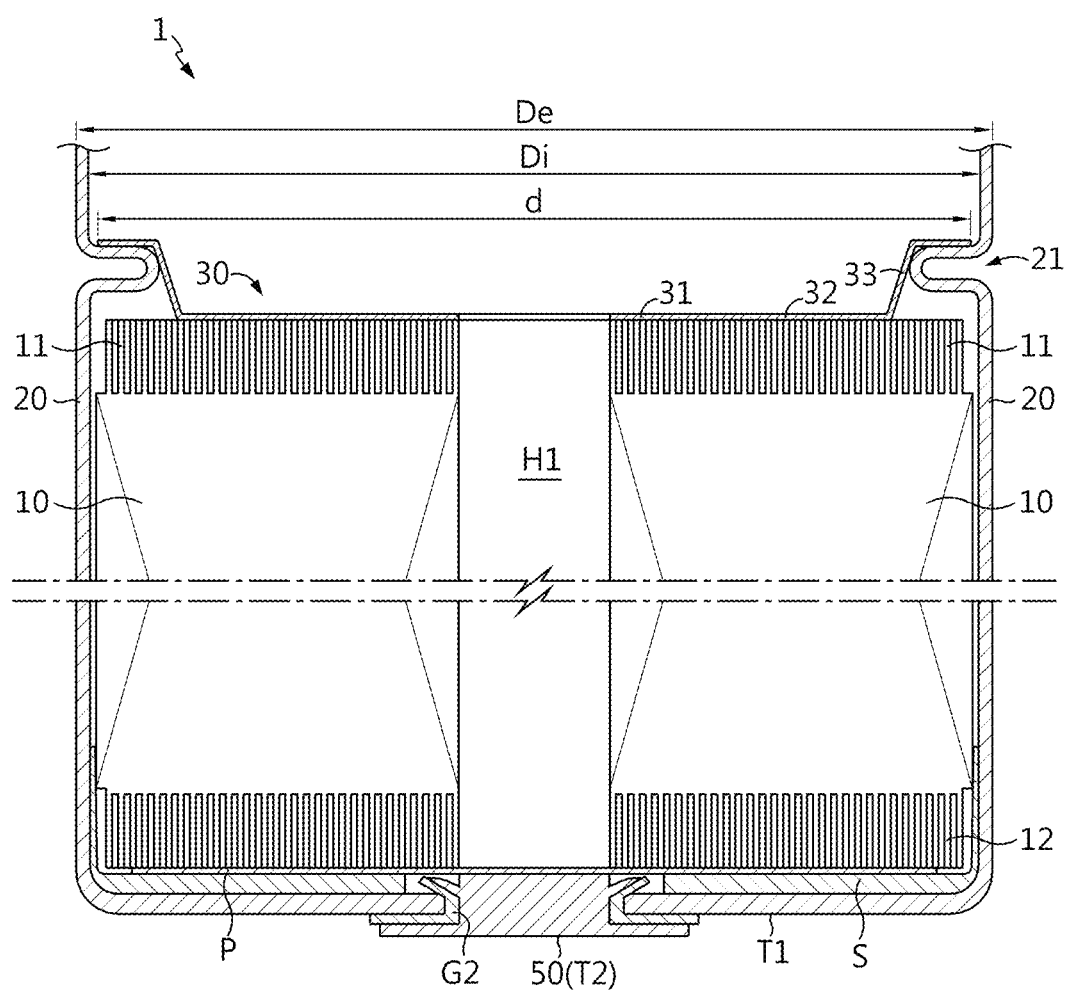
FIG. 12 is a view for describing a relationship between a diameter of an inner surface of a battery housing and a total diameter of a current collector.

FIG. 12 is a view for describing a relationship between a diameter of an inner surface of a battery housing and a total diameter of a current collector.

Referring to FIG. 12, when a diameter of an outer surface of the battery housing is De, a diameter of an inner surface of the battery housing 20 is Di, and a total diameter of the current collector 30 is d, a relationship of De>Di>d may be satisfied.

The cap 40 may include a venting portion 41 formed to prevent an increase in internal pressure due to gas generated inside the battery housing 20. The venting portion 41 is formed in a part of the cap 40, and corresponds to a region that is structurally weaker than a peripheral region to be easily ruptured when internal pressure is applied. The venting portion 41 may be a region having a smaller thickness than the peripheral region.

The terminal 50 passes through the battery housing 20 from the opposite side to the opening portion of the battery housing 20 and is electrically connected to the second uncoated portion 12 of the electrode assembly 10. The terminal 50 may pass through a substantially central portion of a bottom surface of the battery housing 20. The terminal 50 may be coupled to the current collector (second current collector) P coupled to the second uncoated portion 12 or may be coupled to a lead tab coupled to the second uncoated portion 12, to be electrically connected to the electrode assembly 10. Accordingly, the terminal 50 may have the same polarity as a second electrode of the electrode assembly 10, and may function as a second electrode terminal T2. When the second uncoated portion 12 is a positive electrode tab, the terminal 50 may function as a positive electrode terminal. Preferably, the terminal 50 has a riveted structure. A battery to which a riveting structure of the terminal 50 is applied may perform electrical wiring in one direction. Also, because the terminal 50 having the riveting structure has a large cross-sectional area and thus has low resistance, the terminal 50 is very suitable for rapid charging.

Figure 18A:
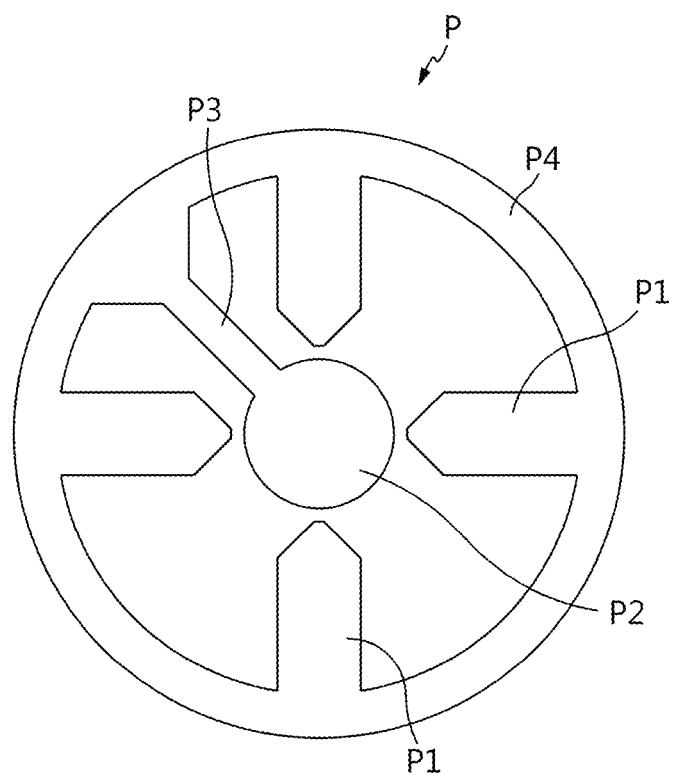
FIG. 18a is a view for describing a second current collector according to an embodiment of the present disclosure.
Figure 18B:
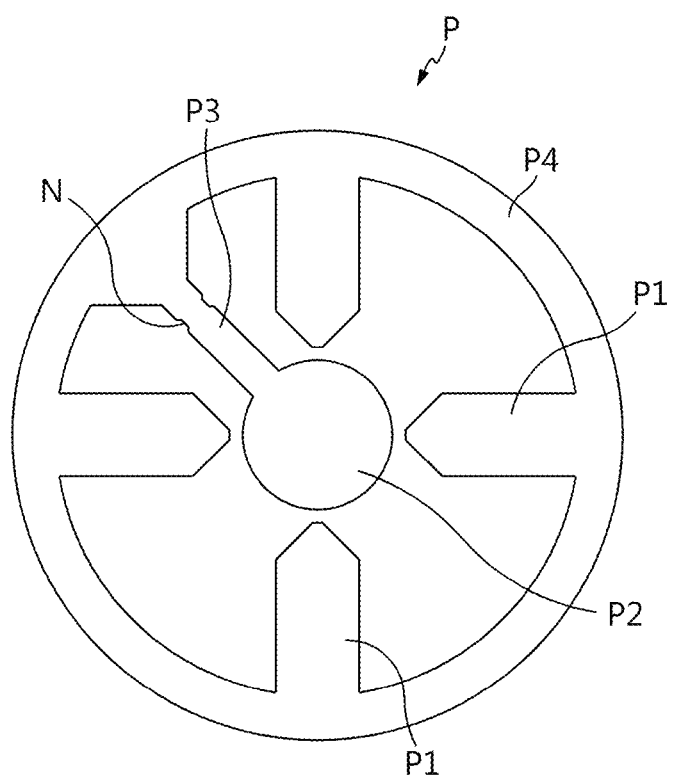
FIG. 18b is a view for describing a second current collector according to another embodiment of the present disclosure.

FIGS. 18a and 18b are views for describing the second current collector P, according to an embodiment of the present disclosure.

In another aspect of the present disclosure, referring to FIGS. 2 and 3, the second current collector P may be located between the second uncoated portion 12 and the terminal 50. Referring to FIGS. 18a and 18b, the second current collector P includes: a tab coupling portion P1 coupled to the second uncoated portion 12; and a terminal coupling portion P2 coupled to the terminal 50. The second current collector P may further include a connecting portion P3 and/or an edge portion P4.

In an aspect of the present disclosure, a plurality of tab coupling portions P1 may be provided. Preferably, the plurality of tab coupling portions P1 may be arranged at the same interval. Extending lengths of the plurality of tab coupling portions P1 may be the same. The terminal coupling portion P2 may be surrounded by the plurality of tab coupling portions P1.

Preferably, the terminal coupling portion P2 may be located at a position corresponding to the winding central hole H1 formed at a winding center of the electrode assembly 10. More preferably, the terminal coupling portion P2 may cover the winding central hole H1 of the electrode assembly 10. According to this structure, the terminal 50 and the terminal coupling portion P2 located over the winding central hole H1 of the electrode assembly 10 may be welded.

The tab coupling portion P1 and the terminal coupling portion P2 may be spaced apart from each other without being directly connected to each other. For example, the tab coupling portion P1 and the terminal coupling portion P2 may be indirectly connected by the edge portion P4. As such, in the second current collector P according to an embodiment of the present disclosure, because the tab coupling portion P1 and the terminal coupling portion P2 are connected through the edge portion P4 without being directly connected to each other, when impact and/or vibration occurs in the battery 1, impact applied to a coupling portion between the tab coupling portion P1 and the second uncoated portion 12 and a coupling portion between the terminal coupling portion P2 and the terminal 50 may be distributed. Accordingly, the second current collector P may minimize or prevent damage to a welding portion due to external impact. The second current collector P of the present disclosure has a structure in which stress may be concentrated on a connected portion between the edge portion P4 and the terminal coupling portion P2 when external impact is applied. Because the connected portion is not a region where a welding portion for coupling components is formed, product defects due to damage to the welding portion caused by external impact may be prevented.

The second current collector P may further include the connecting portion P3 connected to the terminal coupling portion P2. The connecting portion P3 may be narrower than the tab coupling portion P1. In this case, electrical resistance in the connecting portion P3 is increased and larger resistance is generated than in another portion when current flows through the connecting portion P3, and thus, when overcurrent occurs, a part of the connecting portion P3 is broken, thereby blocking the overcurrent. A width of the connecting portion P3 may be adjusted to an appropriate level by considering an overcurrent blocking function.

The second current collector P may further include the edge portion P4 having a substantially rim shape in which an empty space is formed. In this case, the tab coupling portion P1 may extend inward from the edge portion P4, and may be coupled to the second uncoated portion 12. Although the edge portion P4 has a substantially circular rim shape in FIG. 18a, the present disclosure is not limited thereto. The edge portion P4 may have a substantially quadrangular rim shape or another shape, unlike in FIG. 18a.

In another aspect of the present disclosure, referring to FIG. 18b, the connecting portion P3 may include a notch portion N formed to partially reduce a width of the connecting portion P3. When the notch portion N is provided, electrical resistance in a region where the notch portion N is formed is increased, and thus, when overcurrent occurs, the overcurrent may be rapidly blocked. Preferably, a position of the notch portion N may be included in a stack number uniform section (FIG. 1d). More preferably, a position of the notch portion N may be included in a portion of the stack number uniform section in which the number of overlapping layers is maintained at a maximum. Accordingly, a byproduct generated when the notch portion N is broken may be reliably prevented from being penetrated into the electrode assembly.

Referring to FIGS. 2 and 3 together with FIGS. 18a and 18b, in an aspect of the present disclosure, a longest radius from the center of the terminal coupling portion P2 of the second current collector P to an end of the tab coupling portion P1 may be greater than a longest radius from a central portion of the current collector 30 to an end of the tab coupling portion 32. For example, a radius of the edge portion P4 having a substantially rim shape may be greater than a longest radius from a central portion of the current collector 30 to an end of the tab coupling portion 32. This is because, when the beading portion 21 is press-fitted into the battery housing 20, a welding area between the tab coupling portion 32 of the current collector 30 and the first uncoated portion 11 is limited.

In another aspect of the present disclosure, the tab coupling portion P1 of the second current collector P may be coupled to a bent end portion of the second uncoated portion 12. That is, the tab coupling portion P1 of the second current collector P may be welded to a bent surface formed by a plurality of segments of the second uncoated portion 12. Preferably, a welding region may overlap a stack number uniform section (FIG. 1d) by at least 50% in a radial direction, and the larger the overlap ratio, the more preferable. More preferably, a welding region may overlap a portion of the stack number uniform section in which the number of overlapping layers is at a maximum in the radial direction by at least 50%, and the larger the overlap ratio, the more preferable. Substantially the same conditions as these welding conditions may be applied to the current collector 30.

In another aspect of the present disclosure, a welding region for coupling the tab coupling portion P1 of the second current collector P to the bent end portion of the second uncoated portion 12 may be further formed, and a distance from the center of the terminal coupling portion P2 of the second current collector P to the welding region may be the same as or may have a distance deviation of about 5% or less from a distance from a central portion of the current collector 30 to a welding region on the tab coupling portion 32. In another aspect of the present disclosure, the welding region of the second current collector P may have a length greater than that of the welding region on the tab coupling portion 32 of the current collector 30.

In an example, a flat portion (see FIG. 1a) of the terminal 50 and the second current collector P are welded by a laser and are welded in a continuous or discontinuous line to have an arc pattern, a diameter of the arc welding pattern may be equal to or greater than 2 mm, and more particularly may be equal to or greater than 4 mm. When the diameter of the arc welding pattern satisfies the condition, a tensile force of a welding portion may be increased to 2 kgf or more and thus sufficient welding strength may be secured.

In another example, when the flat portion of the terminal 50 and the second current collector P are welded by ultrasound and are welded in a circular pattern, it is preferable that a diameter of the circular welding pattern is equal to or greater than 2 mm. When the diameter of the circular welding pattern satisfies the condition, a tensile force of a welding portion may be increased to 2 kgf or more and thus sufficient welding strength may be secured.

A diameter of the flat portion of the terminal 50 corresponding to a weldable region may be adjusted in a range of 3 mm to 14 mm. When a radius of the flat portion of the terminal 50 is less than 3 mm, it is difficult to form a welding pattern having a diameter of 2 mm or more by using a laser welding tool, an ultrasonic welding tool, or the like. Also, when a radius of the flat portion of the terminal 50 exceeds 14 mm, a size of the terminal 50 may be excessively increased and the area occupied by an outer surface of the bottom of the battery housing 20 may be reduced, and thus, it is difficult to connect an electrical connection component (bus bar) through the outer surface.

Preferably, because a diameter of a welding pattern is equal to or greater than 2 mm and a diameter of a weldable region ranges from 3 mm to 14 mm to secure a tensile force of a welding portion of 2 kgf or more, a ratio of the area of the welding pattern to the area of the weldable region may range from 2.04 $(100*\pi 1^2/\pi 7^2)$% to 44.4 $(100*\pi 1^2/\pi 1.5^2)$%.

When the polarity and function of the terminal 50 are considered, the terminal 50 should maintain an insulated state from the battery housing 20 having the opposite polarity. To this end, the insulating gasket G2 may be applied between the terminal 50 and the battery housing 20. Alternatively, insulation may be achieved by coating an insulating material on a part of a surface of the terminal 50.

For the same reason, the second uncoated portion 12 and/or the current collector (second current collector) P should maintain an insulated state from the battery housing 20. To this end, the insulator S may be located between the second uncoated portion 12 and the battery housing 20 and/or between the current collector (second current collector) P and the battery housing 20. When the insulator S is applied, the terminal 50 may pass through the insulator S for electrical connection with the second uncoated portion 12.

Preferably, the insulator S and an inner surface of the bottom of the battery housing 20 may be in close contact with each other. 'Close contact' means that there is no space (gap) identified visually. In order to remove a space (gap), a distance from the inner surface of the bottom of the battery housing 20 to the flat portion of the terminal 50 may be equal to or slightly less than a thickness of the insulator S.

In the present disclosure, the entire surface of the battery housing 20 may function as a first electrode terminal T1. For example, when the first uncoated portion 11 is a negative electrode tab, the first electrode terminal T1 may be a negative electrode terminal. The battery 1 according to the present disclosure has a structure in which the terminal 50 exposed on a bottom surface of the battery housing 20 located opposite to an opening portion and a portion of the bottom surface of the battery housing 20 other than a portion occupied by the terminal 50 may be respectively used as the second electrode terminal T2 and the first electrode terminal T1. Accordingly, in the battery 1 according to the present disclosure, when a plurality of batteries 1 are electrically connected, both a positive electrode and a negative electrode may be connected, thereby simplifying an electrical connection structure. Also, because the battery 1 has a structure in which most of a bottom surface of the battery housing 20 located opposite to an opening portion may be used as an electrode terminal, a sufficient area for welding components for electrical connection may be secured.

In another aspect, an electrode of the electrode assembly 10 may have a segmentation structure for ease of bending the uncoated portion 11.

Figure 14:
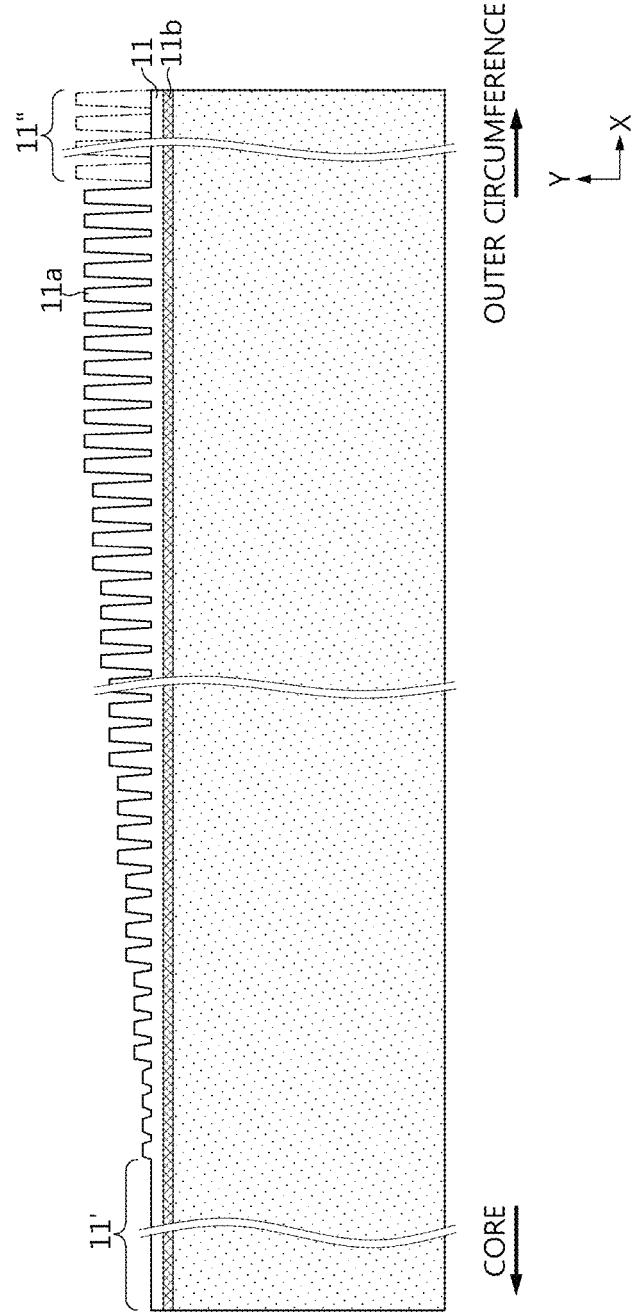
FIG. 14 is a plan view illustrating an electrode plate structure according to an embodiment of the present disclosure.

Referring to FIG. 14, an electrode plate includes a first electrode current collector having a sheet shape and formed of a conductive foil, an active material layer formed on at least one surface of the first electrode current collector, and the first uncoated portion 11 in which an active material is not coated on a long side end of a first electrode.

Preferably, the first uncoated portion 11 may include a plurality of segments 11a that are notched. The plurality of segments 11a may be divided into a plurality of groups, and the segments 11a included in each group may have the same height (length in a Y direction) and/or the same width (length in an X direction) and/or the same separation pitch. The number of segments 11a included in each group may be more or less than that illustrated. The segment 11a has a geometric shape in which at least one straight line and/or at least one curved line are combined. Preferably, the segment 11a may have a trapezoidal shape, but may be modified into any of shapes such as a quadrangular shape, a parallelogram shape, a semicircular shape, or a semi-elliptical shape.

Preferably, a height of the segment 11a may be increased stepwise in one direction parallel to a winding direction of the electrode assembly, for example, from a core side to an outer circumference side. Also, a core side-uncoated portion 11' adjacent to the core side may not include the segment 11a, and a height of the core-side uncoated portion 11' may be less than that of other uncoated regions. Also, an outer circumference-side uncoated portion 11" adjacent to the outer circumference side may not include the segment 11a, and a height of the outer circumference-side uncoated portion 11" may be less than that of other uncoated regions.

Optionally, an electrode plate may include an insulating coating layer 11b covering a boundary between the active material layer and the first uncoated portion 11. The insulating coating layer 11b may include an insulating polymer resin, and may optionally further include an inorganic filler. The insulating coating layer 11b may prevent an end portion of the active material layer from contacting a facing active material layer having the opposite polarity through a separator, and may structurally support bending of the segment 11a. To this end, when the electrode plate is wound for the electrode assembly 10, it is preferable that at least a part of the insulating coating layer 11b is exposed to the outside from the separator.

Figure 15:
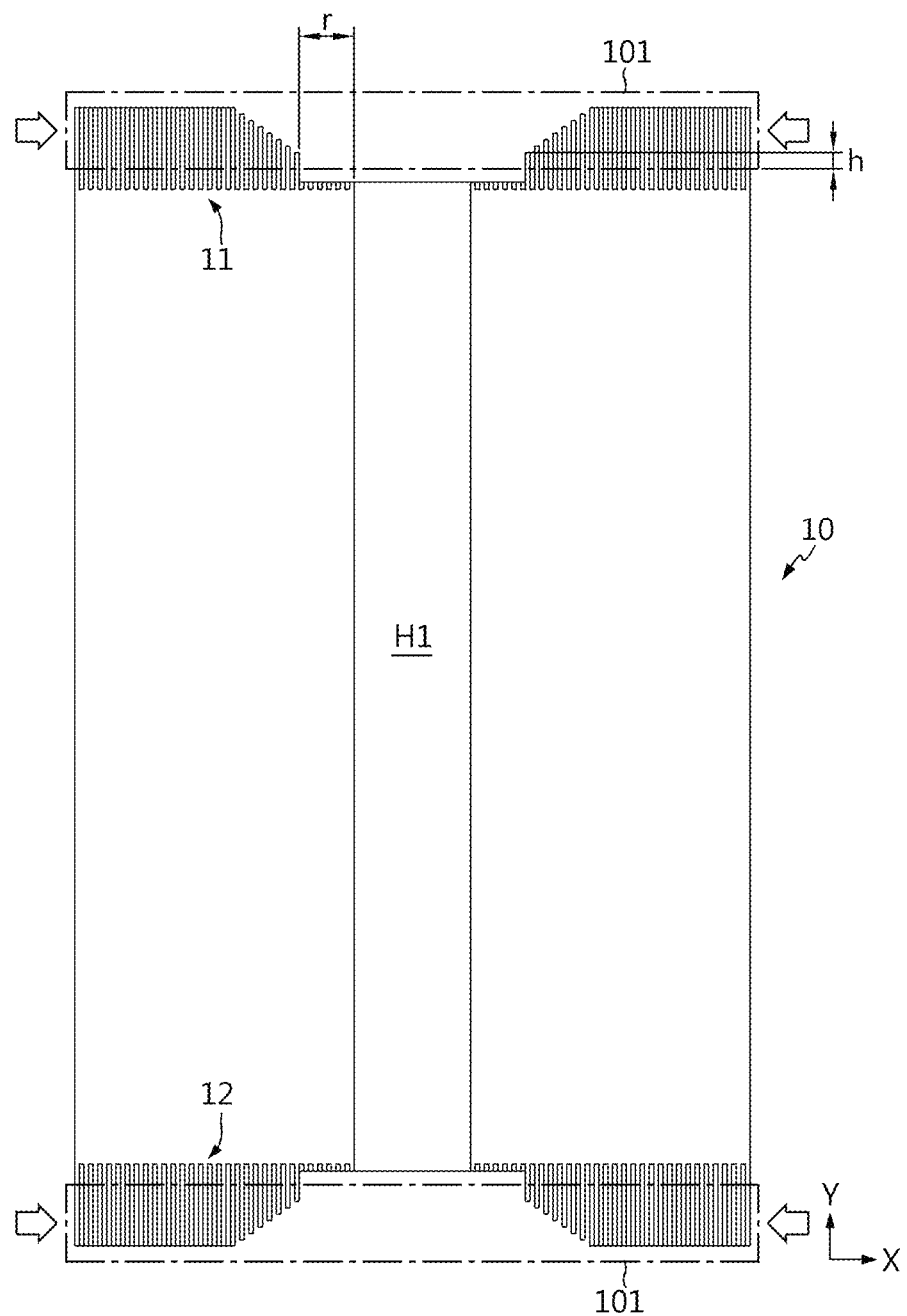
FIG. 15 is a cross-sectional view illustrating an electrode assembly in which an uncoated portion segmentation structure of an electrode plate is applied to a first electrode plate and a second electrode plate, taken along a longitudinal direction Y, according to an embodiment of the present disclosure.

FIG. 15 is a cross-sectional view illustrating the electrode assembly 10, in which an uncoated portion segmentation structure of an electrode plate is applied to a first electrode current collector and a second electrode current collector, taken along a longitudinal direction Y, according to an embodiment of the present disclosure.

Referring to FIG. 15, the electrode assembly 10 may be manufactured by using a winding method. The second uncoated portion 12 protruding downward extends from the second electrode current collector, and the first uncoated portion 11 protruding upward extends from the first electrode current collector.

A pattern in which heights of the first and second uncoated portions 11, 12 are changed is schematically illustrated. That is, heights of the uncoated portions 11, 12 may be irregularly changed according to cut positions. For example, when a side portion of the segment 11a having a trapezoidal shape is cut, a height of an uncoated portion in a cross-section is less than a height of the segment 11a. Accordingly, it should be understood that heights of the uncoated portions 11, 12 shown in a cross-sectional view of the electrode assembly 10 correspond to an average of uncoated portion heights included in each winding turn.

Figure 16A:
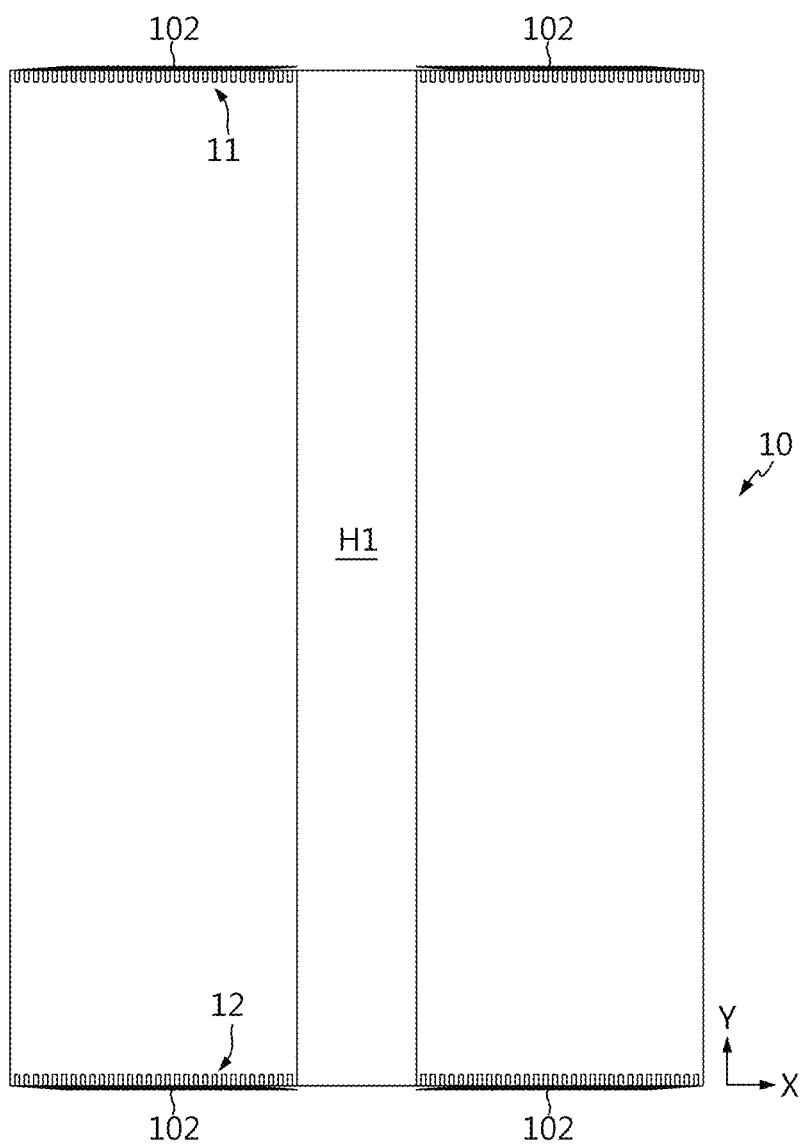
FIG. 16a is a cross-sectional view illustrating an electrode assembly in which an uncoated portion is bent, taken along the longitudinal direction Y, according to an embodiment of the present disclosure.
Figure 16B:
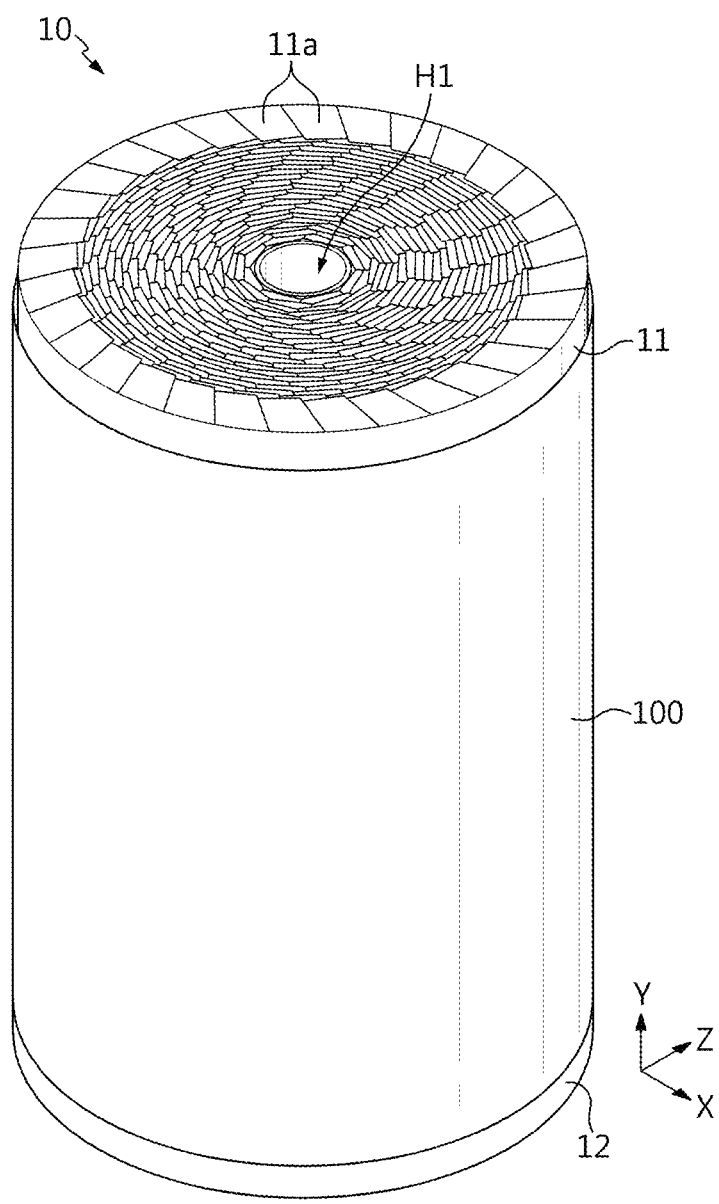
FIG. 16b is a perspective view illustrating an electrode assembly in which an uncoated portion is bent according to an embodiment of the present disclosure.

As shown in FIGS. 16a and 16b, the uncoated portions 11, 12 may be bent in a radial direction of the electrode assembly 10, for example, from an outer circumference side to a core side. In FIG. 15, a bent portion 101 is marked by a dashed line box. When the uncoated portions 11, 12 are bent, the segments 11a adjacent to one another in the radial direction overlap one another in multiple layers to form the bent surfaces 102 over and under the electrode assembly 10. In this case, the core-side uncoated portion 11' (see FIG. 14) has a low thickness and thus is not bent, and a height h of the segment 11a that is a bent innermost segment is equal to or less than a radial length r of a winding region formed by the core-side uncoated portion 11' with no segment structure. Accordingly, the winding central hole H1 at the core of the electrode assembly 10 is not closed by the bent segments 11a. When the winding central hole H1 is not closed, there is no difficulty in an electrolyte injection process, and electrolyte injection efficiency is improved. Also, the terminal 50 and the second current collector P may be easily welded by inserting a welding tool through the winding central hole H1.

Figure 17:
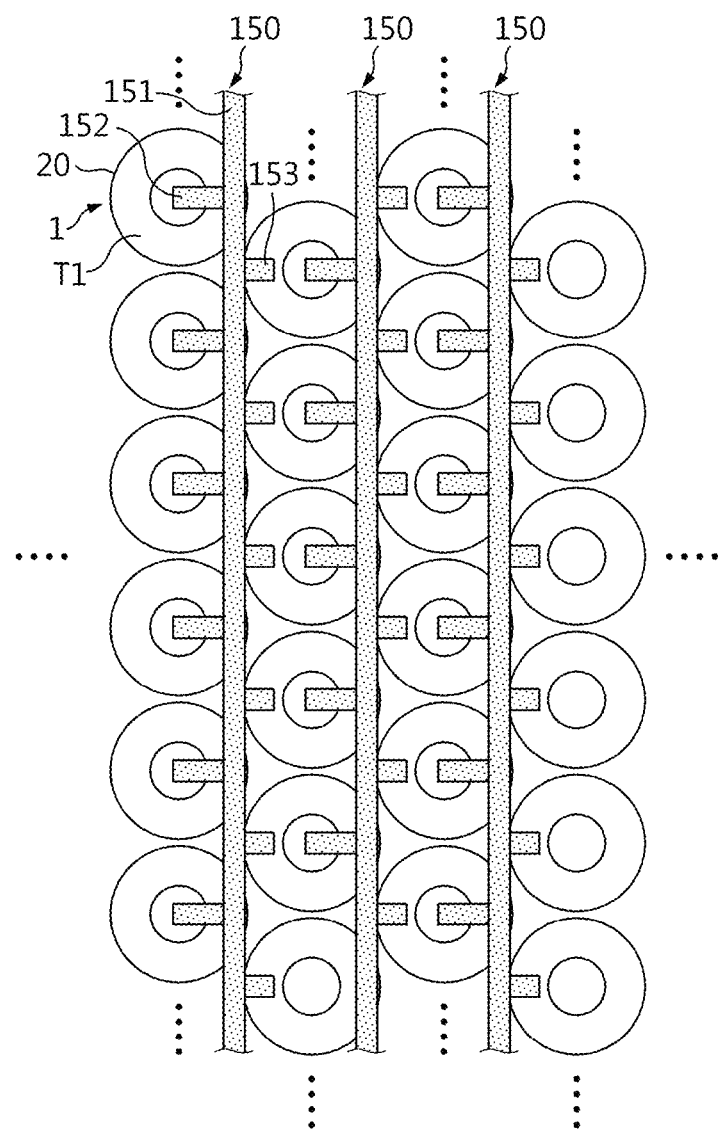
FIG. 17 is a top plan view illustrating a state where a plurality of batteries are connected in series and in parallel by using a bus bar according to an embodiment of the present disclosure.

FIG. 17 is a view illustrating a state where the batteries 1 are electrically connected by using a bus bar 150, according to an embodiment of the present disclosure.

Referring to FIG. 17, the plurality of batteries 1 may be connected in series and in parallel in an upper portion by using the bus bar 150. The number of batteries 1 may be increased or decreased by considering the capacity of a battery pack 3.

In each battery 1, the terminal 50 may have a positive polarity and an outer surface of the bottom of the battery housing 20 may have a negative polarity, or vice versa.

Preferably, the plurality of batteries 1 may be arranged in a plurality of columns and rows. Columns are provided in a vertical direction based on the FIG. 17, and rows are provided in a left and right direction based on the FIG. 17. Also, in order to maximize space efficiency, the batteries 1 may be arranged in a closest packing structure. The closest packing structure is formed when a regular triangle is formed by connecting the centers of the terminals 50.

Preferably, the bus bar 150 may be located on adjacent batteries 1, and preferably, between the terminals 50. In an example, the bus bar 150 may be located between adjacent columns. Alternatively, the bus bar 150 may be located between adjacent rows.

Preferably, the bus bar 150 connects batteries arranged in the same column in parallel, and connects batteries arranged in two adjacent columns in series.

Preferably, the bus bar 150 may include a body portion 151, a plurality of first bus bar terminals 152, and a plurality of second bus bar terminals 153 for serial and parallel connection.

The body portion 151 may extend along a column of the batteries 1. Alternatively, the body portion 151 may extend along a column of the batteries 1, and may be regularly bent like a zigzag shape.

The plurality of first bus bar terminals 152 may protrude from a side of the body portion 151 to the terminal 50 of each battery 1, and may be electrically coupled to the terminal 50. The electrical connection with the terminal 50 may be performed by using laser welding, ultrasonic welding, or the like. Also, the plurality of second bus bar terminals 153 may protrude from the other side of the body portion 151 to the outer surface of the bottom of the battery housing 20 of each battery 1, and may be electrically coupled to the outer surface. The electrical connection with the outer surface may be performed by using laser welding, ultrasonic welding, or the like.

Preferably, the body portion 151, the plurality of first bus bar terminals 152, and the plurality of second bus bar terminals 153 may be formed of one conductive metal plate. The metal plate may be, but is not limited to, an aluminum plate or a copper plate. In a modified example, the body portion 151, the plurality of first bus bar terminals 152, and the plurality of second bus bar terminals 153 may be manufactured as separate pieces and then may be coupled to one another through welding or the like.

In the battery 1, because the terminal 50 having a positive polarity and the outer surface of the bottom of the battery housing 20 having a negative polarity are located in the same direction, the batteries 1 may be easily electrically connected by using the bus bar 150.

Also, because the terminal 50 of the battery 1 and the outer surface have large areas, a sufficient coupling area of the bus bar 150 may be secured and the resistance of the battery pack including the battery 1 may be sufficiently reduced.

As described above, the battery 1 of the present disclosure has a structure in which resistance is minimized by increasing a contact area between components, multiplexing a current path, minimizing a current path length, and the like. After a product is finally manufactured, AC resistance of the battery 1 measured by using a resistance measuring instrument between a positive electrode and a negative electrode, that is, between a top surface of the terminal 50 and an outer surface of a closed portion of the battery housing 20, may be equal to or less than about 4 mohm, but greater than 0 mohm, such as 0.01 mohm.

In the present disclosure, a battery may be, for example, a battery in which a form factor ratio (defined as a value obtained by dividing a diameter of the battery by a height, that is, a ratio between a height H and a diameter (D) is greater than about 0.4.

The term "form factor" used herein refers to a value indicating a diameter and a height of a battery. The battery according to an embodiment of the present disclosure may be, for example, a 46110 battery, a 4875 battery, a 48110 battery, a 4880 battery, or a 4680 battery. In the numerical value indicating the form factor, first two numbers indicate a diameter of a battery, next two numbers indicate a height of the battery.

When a battery has recently been applied to an electric vehicle, a form factor of a battery has increased to be larger than 1865, 2170, or the like. The increase in the form factor leads to increased energy density, enhanced safety against thermal runaway, and improved cooling efficiency.

The energy density of a battery may be further increased when an unnecessary space inside a battery housing is minimized along with the increase of the form factor. A battery according to the present disclosure has an optimal structure in which a coupling force of a coupling portion between a current collector and a battery housing may be improved, the capacity of a battery may be increased, and resistance may be reduced.

A battery according to an embodiment of the present disclosure may be a battery having a substantially cylindrical shape, whose diameter is about 46 mm, height is about 110 mm, and form factor ratio is about 0.418.

A battery according to another embodiment may be a battery having a substantially cylindrical shape, whose diameter is about 48 mm, height is about 75 mm, and form factor ratio is about 0.640.

A battery according to another embodiment may be a battery having a substantially cylindrical shape, whose diameter is about 48 mm, height is about 110 mm, and form factor ratio is about 0.436.

A battery according to another embodiment may be a battery having a substantially cylindrical shape, whose diameter is about 48 mm, height is about 80 mm, and form factor ratio is about 0.600.

A battery according to another embodiment may be a battery having a substantially cylindrical shape, whose diameter is about 46 mm, height is about 80 mm, and form factor ratio is about 0.575.

In the related art, batteries having a form factor ratio of about 0.4 or less have been used. That is, in the related art, for example, a 1865 battery, a 2170 battery, etc. have been used. The 1865 battery has a diameter of about 18 mm, a height of about 65 mm, and a form factor ratio of about 0.277. The 2170 battery has a diameter of about 21 mm, a height of about 70 mm, and a form factor ratio of about 0.300.

Figure 19:
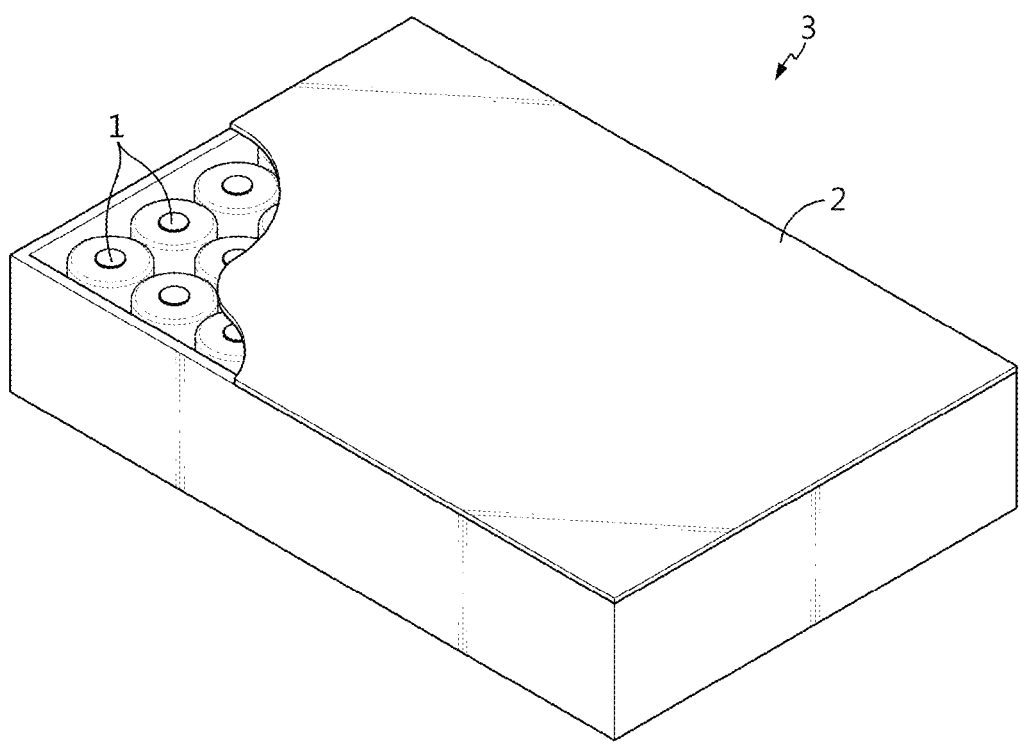
FIG. 19 is a view for describing a battery pack including a battery according to an embodiment of the present disclosure.

A battery according to an embodiment of the present disclosure may be included in a battery pack, and the battery pack may be mounted in a vehicle. Referring to FIG. 19, a battery pack 3 according to an embodiment of the present disclosure includes a battery assembly in which the plurality of batteries 1 according to an embodiment of the present disclosure are electrically connected, and a pack housing 2 in which the battery assembly is accommodated. In FIG. 19 of the present disclosure, for convenience of explanation, components for electrical connection such as a bus bar, a cooling unit, and a power terminal are not shown.

Figure 20:
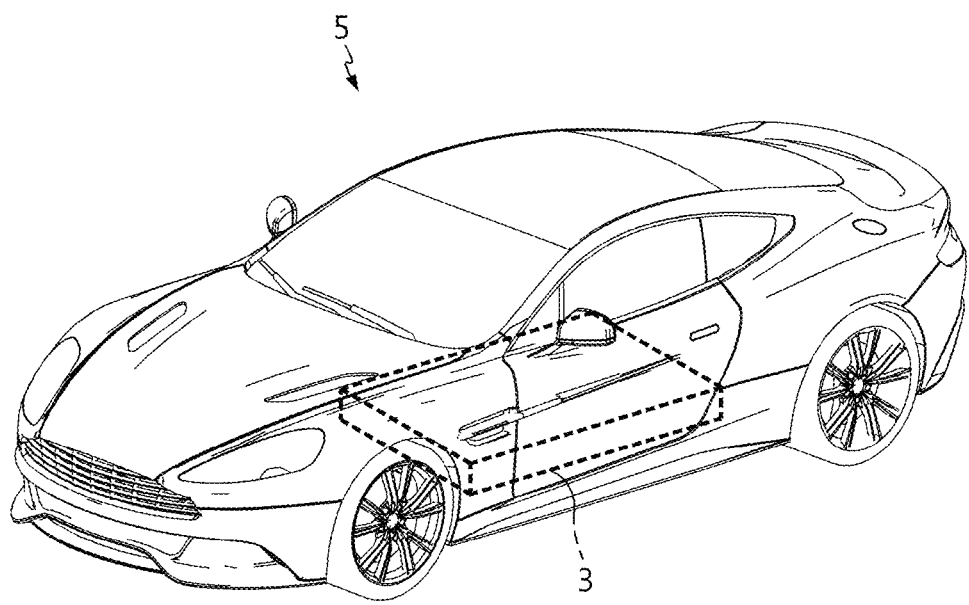
FIG. 20 is a view for describing a vehicle including the battery pack of FIG. 19.

Referring to FIG. 20, a vehicle 5 according to an embodiment of the present disclosure may be, for example, an electric vehicle, a hybrid vehicle, or a plug-in hybrid vehicle, and includes the battery pack 3 according to an embodiment of the present disclosure. The vehicle 5 operates by receiving power from the battery pack 3 according to an embodiment of the present disclosure.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

What is claimed is:

1. A battery comprising:
    an electrode assembly including a first electrode, a second electrode, and a separator between the first electrode and second electrode, wherein the first electrode, the second electrode, and the separator are wound about an axis, wherein the first electrode has a pair of first sides and a pair of second sides extending between the pair of first sides, a first portion including an active material extending between the pair of first sides, and a second portion extending between the pair of first sides and exposed beyond the separator, wherein at least a part of the second portion includes an electrode tab;
    a battery housing having a first end with a first opening, a second end with a second opening opposite the first end, and an inner surface, the battery housing accommodating the electrode assembly through the first opening formed at the first end;
    a first current collector comprising a tab coupling portion coupled to the second portion of the first electrode and a housing coupling portion extending from the tab coupling portion and electrically coupled to the inner surface of the battery housing; and
    a cap covering the first opening of the battery housing, the cap being separate from the first current collector,
    wherein the first current collector is located between the electrode assembly and the cap,
    wherein the second portion of the first electrode is connected to an inner surface of the first current collector so as to not extend through the first current collector,
    wherein the battery housing comprises a beading portion formed on an end portion adjacent to the first opening at the first end and press-fitted inward, and
    wherein the housing coupling portion comprises:
        a contact portion coupled to the beading portion of the battery housing; and
        a connecting portion to connect the tab coupling portion to the contact portion.

2. The battery of claim 1, wherein the battery housing comprises a crimping portion formed at a position between the first opening at the first end and the beading portion, and extending and bent toward the first opening.

3. The battery of claim 2, wherein the housing coupling portion is press-fixed by the crimping portion.

4. The battery of claim 1, wherein the connecting portion is upwardly convex based on an imaginary straight line that connects an end portion of the contact portion to an end portion of the tab coupling portion.

5. The battery of claim 1, wherein the connecting portion is lifted upward above the beading portion.

6. The battery of claim 1, wherein the connecting portion supports the cap.

7. The battery of claim 1, wherein the beading portion comprises:
    a beading portion top surface located over an innermost point that is press-fitted inward; and
    a beading portion bottom surface located under the innermost point that is press-fitted inward.

8. The battery of claim 7, wherein the contact portion is mounted on the beading portion top surface.

9. A battery comprising:
    an electrode assembly including a first electrode, a second electrode, and a separator between the first electrode and second electrode, wherein the first electrode, the second electrode, and the separator are wound about an axis, wherein the first electrode has a pair of first sides and a pair of second sides extending between the pair of first sides, a first portion including an active material extending between the pair of first sides, and a second portion extending between the pair of first sides and exposed beyond the separator, wherein at least a part of the second portion includes an electrode tab;

a battery housing having a first end with a first opening, a second end with a second opening opposite the first end, and an inner surface, the battery housing accommodating the electrode assembly through the first opening formed at the first end;

a first current collector comprising a tab coupling portion coupled to the second portion of the first electrode and a housing coupling portion extending from the tab coupling portion and electrically coupled to the inner surface of the battery housing; and a cap covering the first opening of the battery housing, the cap being separate from the first current collector, wherein the first current collector is located between the electrode assembly and the cap, wherein the second portion of the first electrode is connected to an inner surface of the first current collector so as to not extend through the first current collector, wherein the battery housing comprises a beading portion formed on an end portion adjacent to the first opening at the first end and press-fitted inward, wherein a press-fitting depth of the beading portion PD satisfies the following formula:

$$PD \geq R1,min + R2,min + Wbead,min$$

wherein $R1,min$ is a minimum value of a radius of curvature of the beading portion, $Wbead,min$ is a minimum value of a welding bead width, and $R2,min$ is a minimum value of a radius of curvature at a boundary region between the beading portion and the inner surface of the battery housing.

10. The battery of claim 1, wherein a press-fitting depth of the beading portion PD and a maximum value of the press-fitting depth PDmax satisfies the following formula:

$$(R1,min + Wbead,min)/PDmax \leq OV/PD \leq (PDmax - R2,min)/PDmax$$

wherein OV is an overlap length that is a shortest distance from an end portion of the contact portion to a vertical line that passes through an innermost point of the beading portion, $R1,min$ is a minimum value of a radius of curvature of the beading portion, $Wbead,min$ is a minimum value of a welding bead width, and $R2,min$ is a minimum value of a radius of curvature at a boundary region between the beading portion and the inner surface of the battery housing.

11. The battery of claim 1, wherein a press-fitting depth of the beading portion PD and a maximum value of the press-fitting depth PDmax satisfies the following formula:

$$(OVmin - 0.5*Wbead,min)/PDmax \leq W/PD \leq (OVmax - 0.5*Wbead,min)/PDmax$$

W is a distance from an innermost point of the beading portion to a central point of an outermost welding bead in a radial direction, OV is an overlap length that is a shortest distance from an end portion of the contact portion to a vertical line that passes through the innermost point of the beading portion, OVmin is a minimum value of the overlap length OV, OVmax is a maximum value of the overlap length OV, and Wbead,min is a minimum value of a welding bead width.

12. The battery of claim 1, further comprising a sealing gasket provided between the battery housing and the cap.

13. The battery of claim 12, wherein the contact portion is located between the sealing gasket and the beading portion.

14. The battery of claim 12, wherein a thickness of the sealing gasket varies in a circumferential direction.

15. The battery of claim 12, wherein a thickness of the sealing gasket is alternately increased and decreased in a circumferential direction.

16. The battery of claim 1, wherein a plurality of the housing coupling portions are provided, and wherein the plurality of housing coupling portions are connected to one another and integrally formed.

17. The battery of claim 1, wherein the connecting portion comprises at least one bending portion in which an extension direction is changed at least once.

18. The battery of claim 1, wherein the contact portion has an arc shape extending in a circumferential direction along the beading portion of the battery housing.

19. The battery of claim 1, wherein a connected portion between the contact portion and the connecting portion is coupled to the beading portion while having a shape matching an inner surface of the beading portion.

20. The battery of claim 1, wherein a boundary region between the tab coupling portion and the housing coupling portion is located farther inward than an innermost point of the beading portion formed on the battery housing.

21. The battery of claim 1, wherein one or more holes for injecting an electrolytic solution are formed in the tab coupling portion.

22. The battery of claim 1, wherein a form factor ratio obtained by dividing a diameter of the battery by a height is greater than 0.4.

23. The battery of claim 1, wherein at least a part of the second portion of the first electrode comprises a plurality of segments divided in a winding direction of the electrode assembly, and wherein the plurality of segments are bent in a radial direction of the electrode assembly to form a bent surface, and wherein a total radial length of the tab coupling portion T satisfies the following formula:

$$JR - 2*F \leq T \leq JR$$

wherein JR is an outer diameter of the electrode assembly, and

F is a height of an outermost segment of the electrode assembly.

24. The battery of claim 11, wherein a minimum value of a distance from the innermost point of the beading portion to the central point of the outermost welding bead in the radial direction W1 and a distance from the innermost point of the beading portion to the central point of an outermost welding bead in the radial direction W satisfy the following formula:

$$W1 = R1 + 0.5*Wbead,min, \text{ and}$$

$$W = OV - 0.5*Wbead,min$$

wherein OV is the overlap length, and

R1 is a radius of curvature of the beading portion.

25. The battery of claim 11, wherein the beading portion has a flat section parallel to a bottom surface of the battery housing in at least a region, and when the overlap length is OV and a radius of curvature of the beading portion is R1, a length of the flat section of the beading portion contacting the first current collector is OV−R1.

\* \* \* \* \*